(12) United States Patent
Wang et al.

(10) Patent No.: US 11,096,233 B2
(45) Date of Patent: Aug. 17, 2021

(54) METHOD AND DEVICE FOR NETWORK ACCESS

(71) Applicant: Samsung Electronics Co., Ltd., Suwon-si (KR)

(72) Inventors: Weiwei Wang, Beijing (CN); Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/835,985

(22) Filed: Mar. 31, 2020

(65) Prior Publication Data

US 2020/0229258 A1  Jul. 16, 2020

Related U.S. Application Data

(63) Continuation of application No. 16/652,227, filed as application No. PCT/KR2018/011560 on Sep. 28, 2018.

(30) Foreign Application Priority Data

Sep. 28, 2017 (CN) .......................... 201710898572.X
Sep. 28, 2017 (CN) .......................... 201710905999.8
(Continued)

(51) Int. Cl.
*H04W 76/11* (2018.01)
*H04W 76/18* (2018.01)
(Continued)

(52) U.S. Cl.
CPC .......... *H04W 76/18* (2018.02); *H04W 76/11* (2018.02); *H04W 76/19* (2018.02); *H04W 76/27* (2018.02);
(Continued)

(58) Field of Classification Search
CPC ..... H04W 76/18; H04W 76/11; H04W 80/02; H04W 88/085; H04W 92/12
See application file for complete search history.

(56) References Cited

U.S. PATENT DOCUMENTS 8,576,794 B1 * 11/2013 Dinan ................... H04L 5/0055
370/330
2013/0322270 A1   12/2013 Ko
(Continued)

FOREIGN PATENT DOCUMENTS

KR    10-2016-0135090 A    11/2016

OTHER PUBLICATIONS

CATT, "Stage 2 TP for RRC Message Transfer between CU and DU", 3GPP TSG-RAN WG3 Meeting #96, R3-171460, Hangzhou, China, May 15-19, 2017.
(Continued)

*Primary Examiner* — Huy D Vu
*Assistant Examiner* — Bailor C. Hsu
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The embodiments of the present invention provide methods and devices for network access. The method includes receiving a first request message forwarded by a distributed unit in a base station and indication information of the distributed unit with respect to the first request message, the first request message requesting to connect a user equipment to a network; determining a processing to be performed on the first request message based on the indication Information; and transmitting an indication of the determined processing to the distributed unit.

32 Claims, 19 Drawing Sheets

(30) Foreign Application Priority Data

| Oct. 9, 2017 | (CN) | 201710932365.1 |
|---|---|---|
| Nov. 13, 2017 | (CN) | 201711120988.5 |
| Jan. 11, 2018 | (CN) | 201810029454.X |

(51) Int. Cl.
   *H04W 76/19* (2018.01)
   *H04W 76/27* (2018.01)
   *H04W 80/02* (2009.01)
   *H04W 88/08* (2009.01)
   *H04W 92/12* (2009.01)

(52) U.S. Cl.
   CPC ......... *H04W 80/02* (2013.01); *H04W 88/085* (2013.01); *H04W 92/12* (2013.01)

(56) References Cited

U.S. PATENT DOCUMENTS

| | | | |
|---|---|---|---|
| 2017/0127362 A1* | 5/2017 | Tavildar | H04W 28/0278 |
| 2017/0331577 A1* | 11/2017 | Parkvall | H04W 4/00 |
| 2017/0332372 A1 | 11/2017 | Lee et al. | |
| 2018/0213579 A1 | 7/2018 | Hong et al. | |
| 2018/0270716 A1* | 9/2018 | Takahashi | H04W 76/28 |
| 2018/0279218 A1* | 9/2018 | Park | H04W 36/08 |
| 2018/0338277 A1* | 11/2018 | Byun | H04W 88/08 |
| 2018/0367273 A1 | 12/2018 | Park et al. | |
| 2018/0368109 A1 | 12/2018 | Kim | |
| 2019/0037631 A1* | 1/2019 | Byun | H04W 76/20 |
| 2019/0069333 A1* | 2/2019 | Kim | H04W 36/0033 |
| 2019/0082376 A1* | 3/2019 | Hong | H04W 48/02 |
| 2019/0150220 A1 | 5/2019 | Byun et al. | |
| 2019/0182743 A1 | 6/2019 | Wong et al. | |
| 2020/0196220 A1* | 6/2020 | Centonza | H04W 48/02 |

OTHER PUBLICATIONS

3GPP TS 38.401, "3rd Generation Partnership Project; Technical Specification Group Radio Access Network NG-RAN Architecture description", vol. 0.2.0, Jul. 2017.

China Telecom, "CU-DU Interface: On RRC Message Transport", 3GPP TSG-RAN3 Meeting #96, R3-171590, Hangzhou, P.R. China, May 15-19, 2017.

Huawei, "PDCP Duplication for CU-DU", 3GPP TSG RAN WG3 Meeting #97, R3-173128, Berlin, Germany, Aug. 21-25, 2017.

3GPP TS 36.331, "3rd Generation Partnership Project Technical Specification Group Radio Access Network Evolved Universal Terrestrial Radio Access (E-UTRA) Radio Resource Control (RRC) Protocol Specification", vol. 15.2.0, Jun. 2018.

3GPP TS 38.331, "3rd Generation Partnership Project: Technical Specification Group Radio Access Network: NR Radio Resource Control (RRC) Protocol Specification", vol. 15.2.0, Jun. 2018.

3GPP TS 36.423, 3rd Generation Partnership Project; Technical Specification Group Radio Access Network; Evolved Universal Terrestrial Radio Access Network (E-UTRAN); X2 application protocol (X2AP), vol. 15.2.0, Jun. 2018.

3GPP TS 38.423, 3rd Generation Partnership Project; Technical Specification Group Radio Access Network; NG-RAN; Xn application protocol (XnAP), vol. 15.0.0, Jun. 2018.

3GPP TS 38.473, 3rd Generation Partnership Project; Technical Specification Group Radio Access Network; NG-RAN; F1 application protocol (F1AP), vol. 15.2.0, Jun. 2018.

Samsung, "Discussions on initial access procedure within high-layer split", 3GPP TSG-RAN WG3 Meeting #97bis, R3-173847, Prague, Czech, Oct. 9-13, 2017.

Samsung, KT, "Initial access procedure considering CU-DU split", 3GPP TSG-RAN WG3 Meeting #98, R3-174606, Reno, USA, Nov. 27-Dec. 1, 2017.

Ericsson, "Initial UE Access Full Procedure", 3GPP TSG RAN WG3 Meeting #98 Tdoc, R3-175017, Reno, Nevada, USA, Nov. 27-Dec. 1, 2017.

Ericsson, "DU admission results in Initial UL RRC Message Transfer", 3GPP TSG RAN WG3 Meeting #98 Tdoc, R3-175018, Reno, Nevada, USA, Nov. 27-Dec. 1, 2017.

Samsung, "TP for NSA BL CR on EN-DC X2 parameters over F1", 3GPP TSG-RAN WG3 #99, R3-181400, Athens, Greece, Feb. 26-Mar. 2, 2018.

3GPP TSG-RAN WG3 #99, R3-181873, Sanya, China, Apr. 16-20, 2018.

3GPP TSG-RAN WG3 Meeting #99bis, R3-182195, Sanya, China, Apr. 16-20, 2018.

3GPP TS 38.425, "3rd Generation Partnership Project; Technical Specification Group Radio Access Network; NG-RAN; NR user plane protocol", vol. 15.2.0, Jun. 2018.

3GPP TR 21.905, "3rd Generation Partnership Project; Technical Specification Group Services and System Aspects; Vocabulary for 3GPP Specifications", vol. 15.1.0, Dec. 2018.

3GPP TS 37.340,"3rd Generation Partnership Project; Technical Specification Group Radio Access Network; Evolved Universal Terrestrial Radio Access (E-UTRA) and NR; Multi-connectivity; Stage 2", vol. 15.2.0, Jun. 2018.

3GPP TS 38.300, "3rd Generation Partnership Project; Technical Specification Group Radio Access Network; NR; NR and NG-RAN Overall Description; Stage 2", vol. 15.2.0, Jun. 2018.

Huawei: "FIAP procedures for RRC Connection Setup", 3GPP Draft; R3-172176 FIAP Procedures for RRC Connection Setup, 3rd Generation Partnership Project (3GPP), Mobile Competence Centre ; 650, Route Des Lucioles ; F-06921 Sophia-Antipolis Cedex, France, vol. RAN WG3, No. Qingdao, China; Jun. 27-29, 2017, Jun. 26, 2017 (Jun. 26, 2017), XP051302122, Retrieved from the Internet: URL:http://www.3gpp.org/ftp/Meetings 3GPPSYNC/RAN3/Docs/.

LG Electronics Inc: "Discussion on C-RNTI management in gNB-DU", 3GPP Draft; R3-173004 Discussion on C-RNTI Management in GNB-DU, 3rd Generation Partnership Project (3GPP), Mobile Competence Centre ; 650, Route Des Lucioles ; F-06921 Sophia-Antipolis Cedex, France, vol. RAN WG3, No. Berlin, Germany; Aug. 21-25, 2017, Aug. 21, 2017 (Aug. 21, 2017), XP051319844, Retrieved from the Internet: URL:http://www.3gpp.org/flp/Meetings_3GPPSYNC/RAN3/Docs/.

LG Electronics Inc: "Consideration on C-RNTI during initial UE access", 3GPP Draft; R3-172342 Consideration on C-RNTI During Initial UE Access, 3rd Generation Partnership Project (3GPP), Mobile Competence Centre ; 650, Route Des Lucioles ; F-06921 Sophia-Antipolis Cedex vol. RAN WG3, No. Qingdao, China; Jun. 27-29, 2017, Jun. 26, 2017 (Jun. 26, 2017), XP051302288, Retrieved from the Internet: URL:http://www.3gpp.org/flp/Meetings 3GPPSYNC/RAN3/Docs/.

CATT: "Discussion on RRC message transfer", 3GPP Draft; R3-172807 Discussion on Rrcmessage Transfer, 3rd Generation Partnership Project (3GPP), Mobile Competence Centre ; 650, Route Des Lucioles ; F-06921 Sophia-Antipolis Cedex, France vol. RAN WG3, No. Berlin, Germany; Aug. 21-25, 2017, Aug. 21, 2017 (Aug. 21, 2017), XP051319650, Retrieved from the Internet: URL:http://www.3gpp.org/ftp/Meetings_3GPP//SYNC/RAN3/Docs/.

Extended European Search Report dated Nov. 5, 2020, issued in European Application No. 18862848.1.

U.S. Office Action dated Jul. 10, 2020, issued in U.S. Appl. No. 16/652,227.

"Technical Specification." (D1)3rd Generation Partnership Project;Technical Specification Group Radio Access Network; NG-RAN;Architecture description,(Release 15), Aug. 2017.

CATT, "TP for 38.473 on UE Context. " (D2), 3GPP TSG-RAN WG2 #97, R3-172816, Aug. 21-25, 2017.

CATT, Discussion on UE Context Management function, 3GPP TSG-RAN WG2 #97, Berlin, Germany, Aug. 21-25, 2017.

U.S. Final Office Action dated May 19, 2021, issued in U.S. Appl. No. 16/652,227.

European Search Report dated May 18, 2021, issued in European Application No. 21154971.2.

European Office Action dated May 21, 2021, issued in European Application No. 18862848.1.

\* cited by examiner

[Fig. 1]
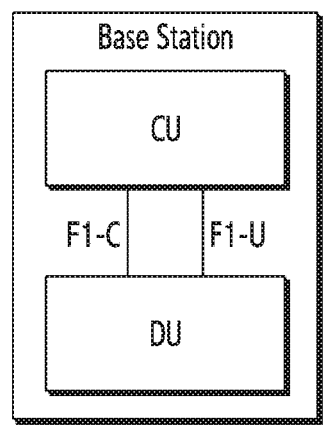
[Fig. 2]
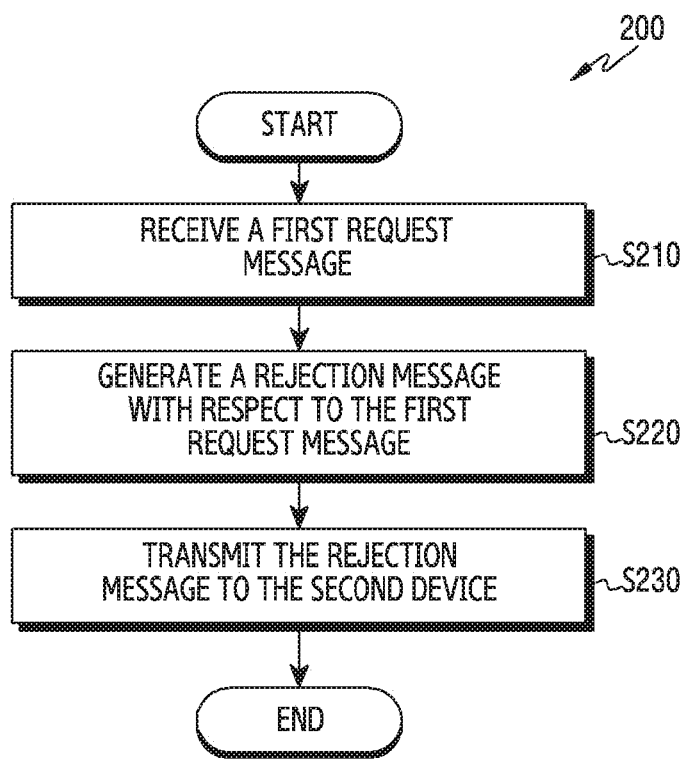

[Fig. 3]
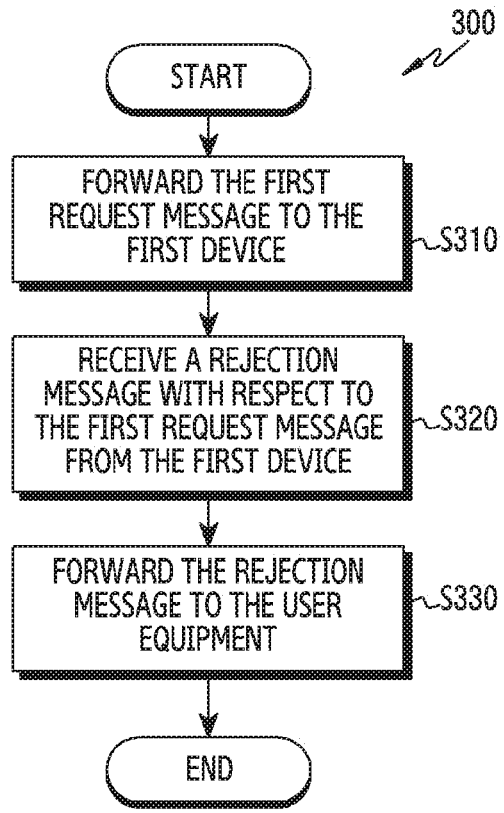
[Fig. 4]
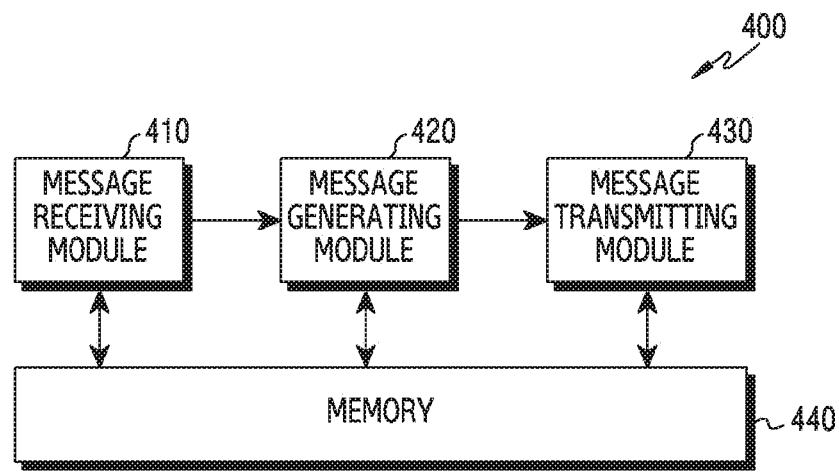

[Fig. 5]
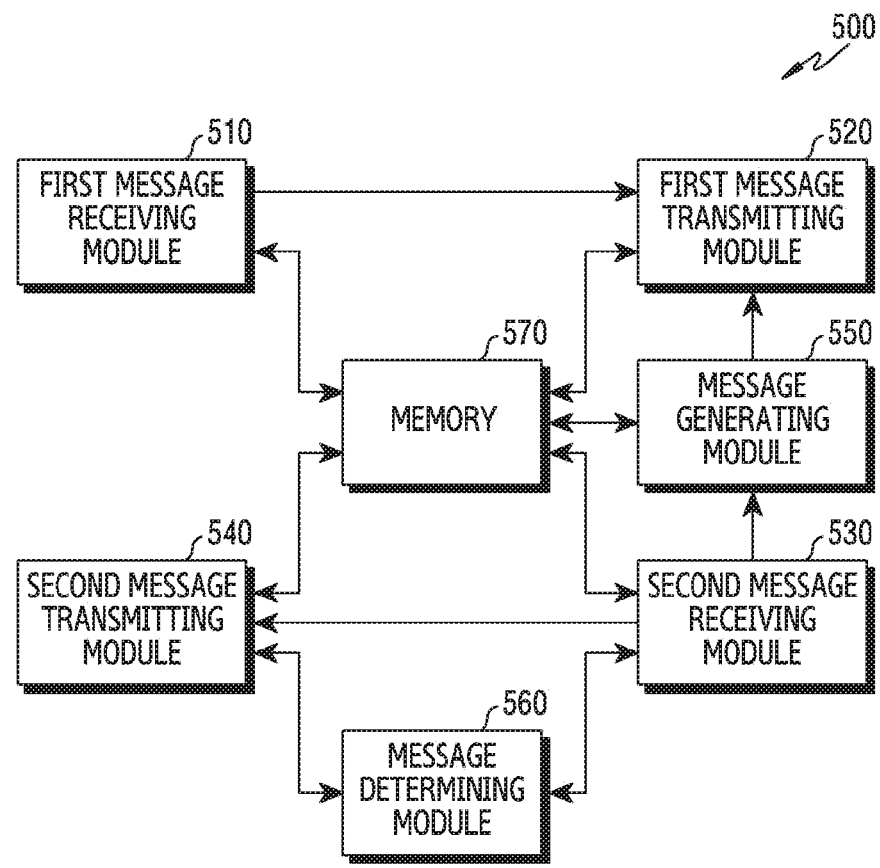
[Fig. 6]
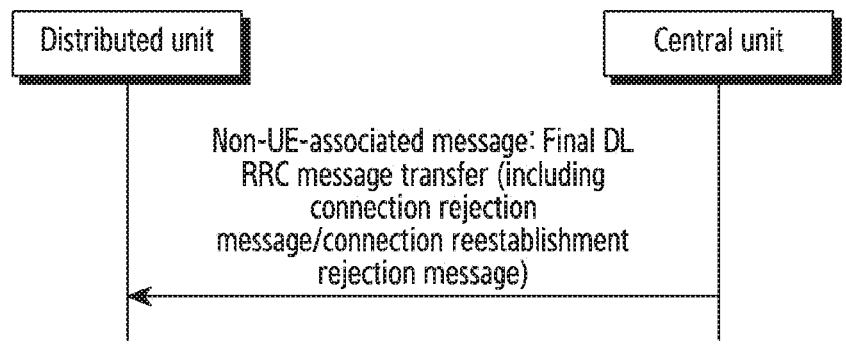

[Fig. 7]
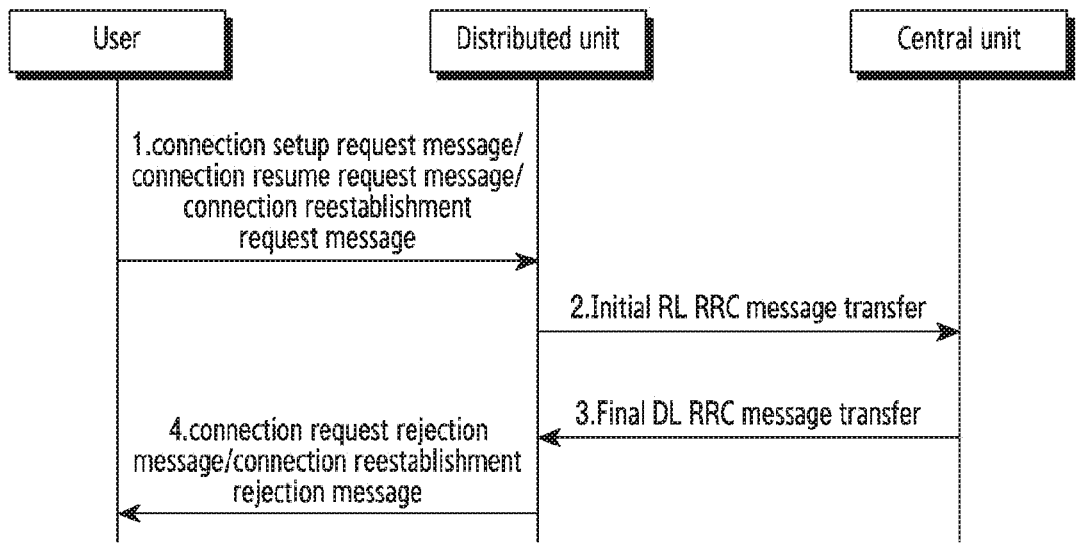
[Fig. 8]
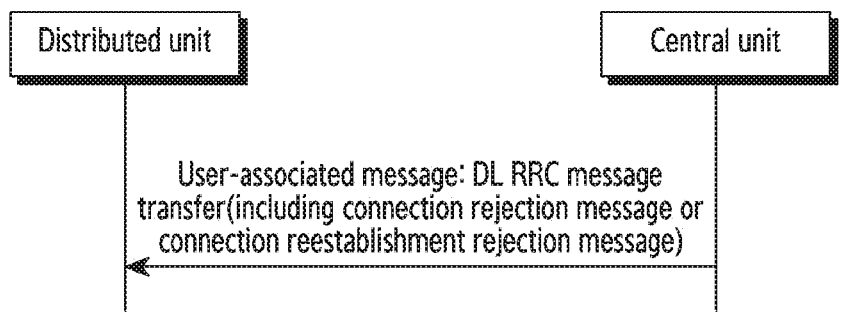
[Fig. 9]
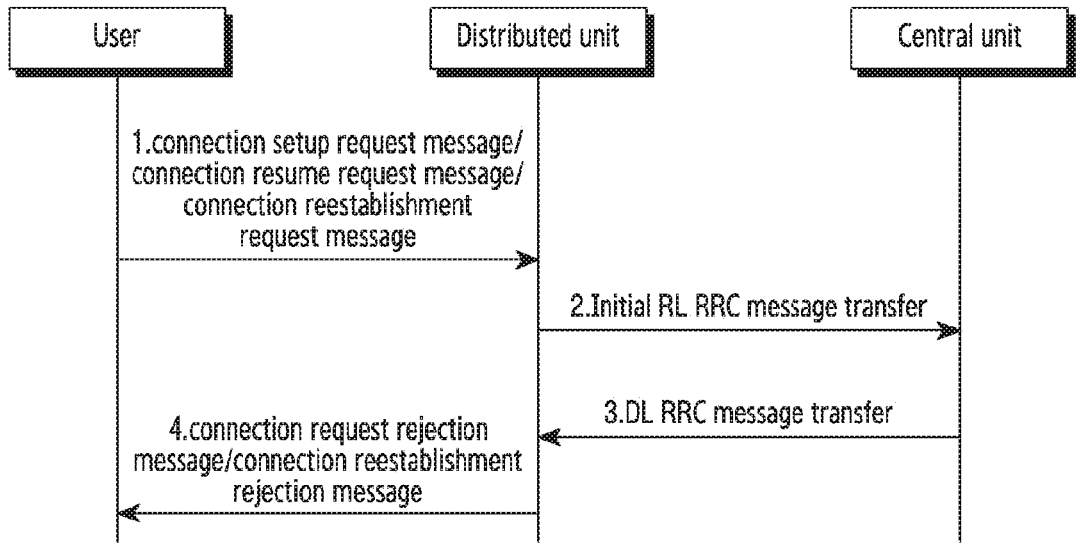

[Fig. 10]
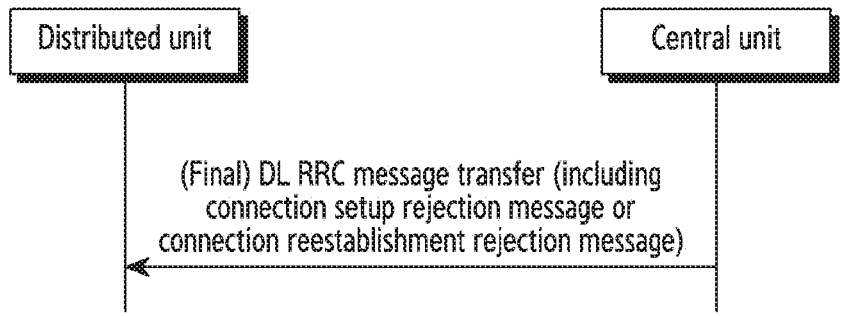
[Fig. 11]
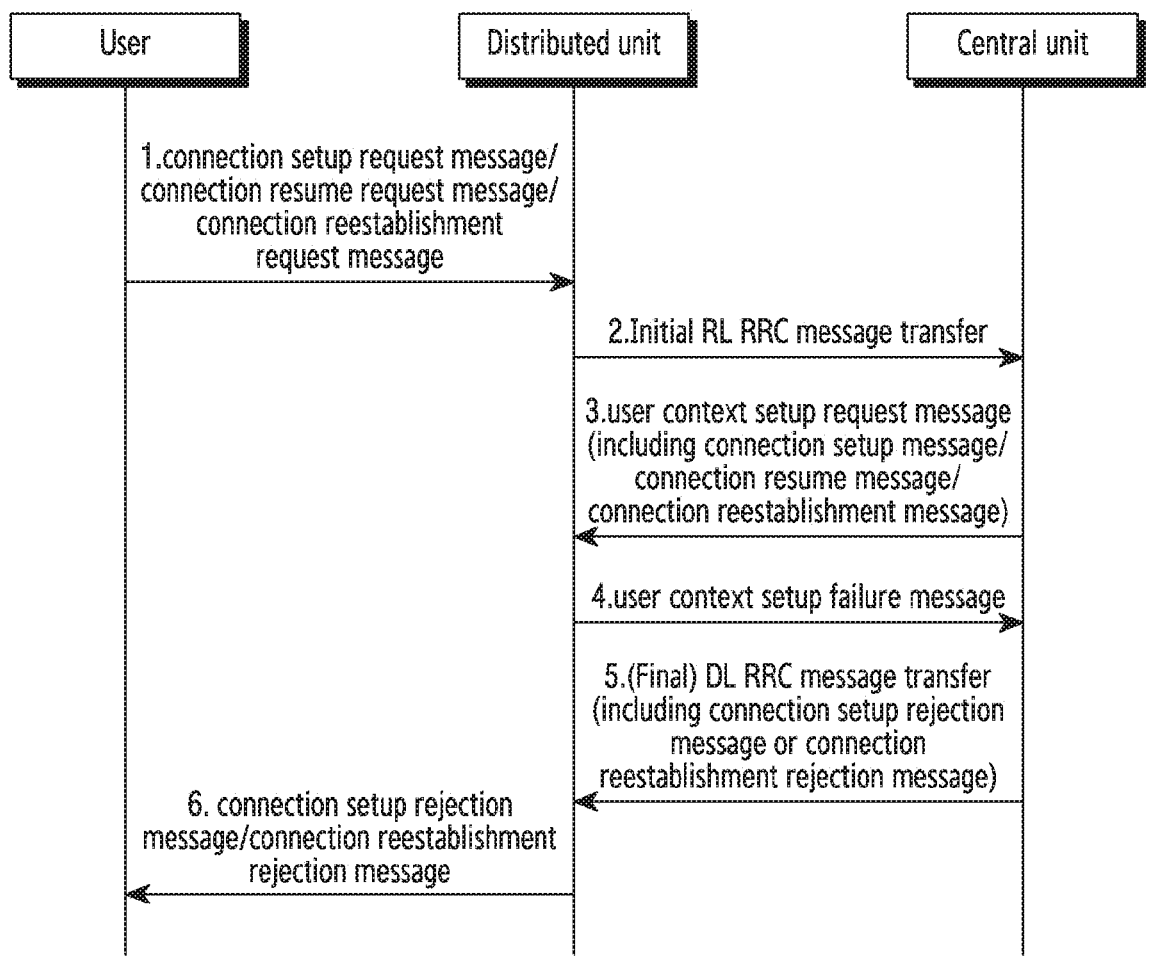

[Fig. 12]
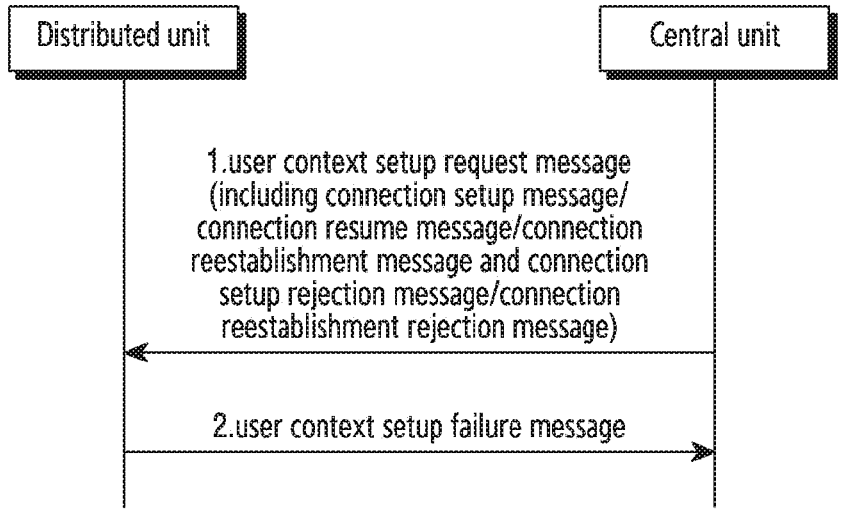
[Fig. 13]
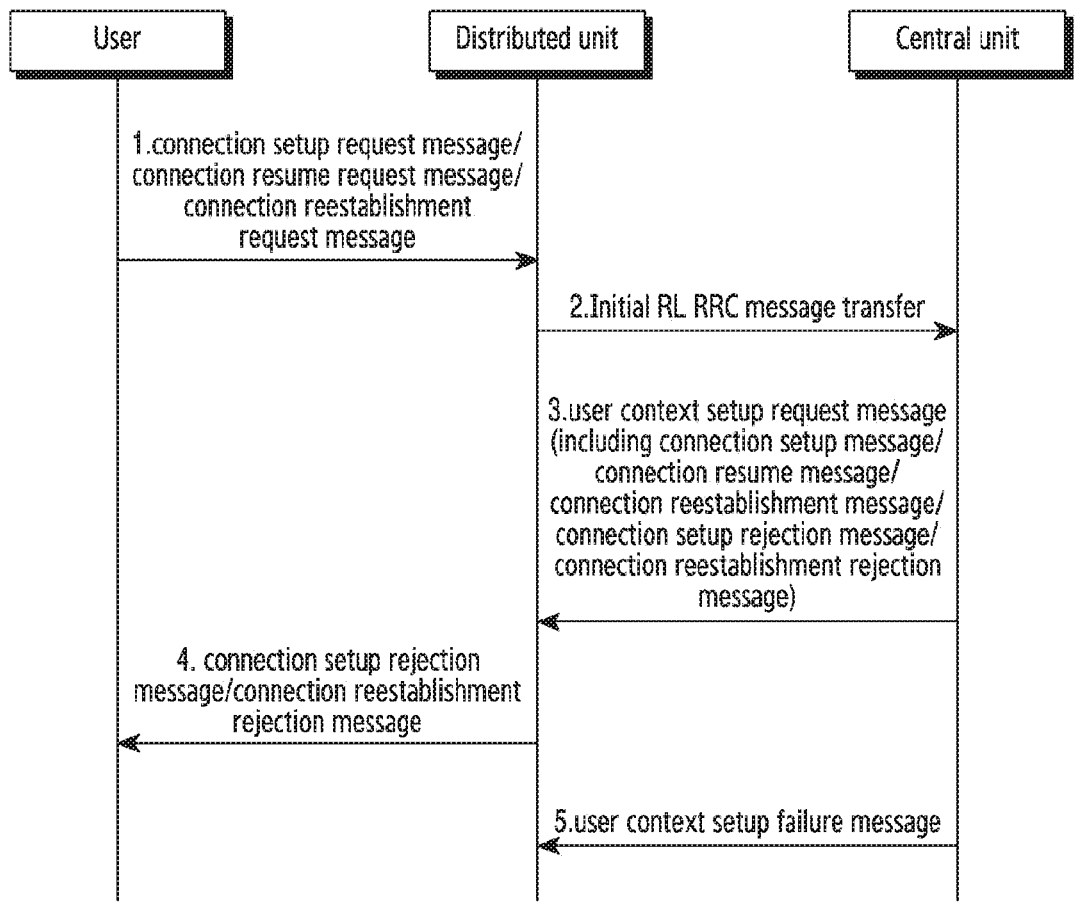

[Fig. 14]
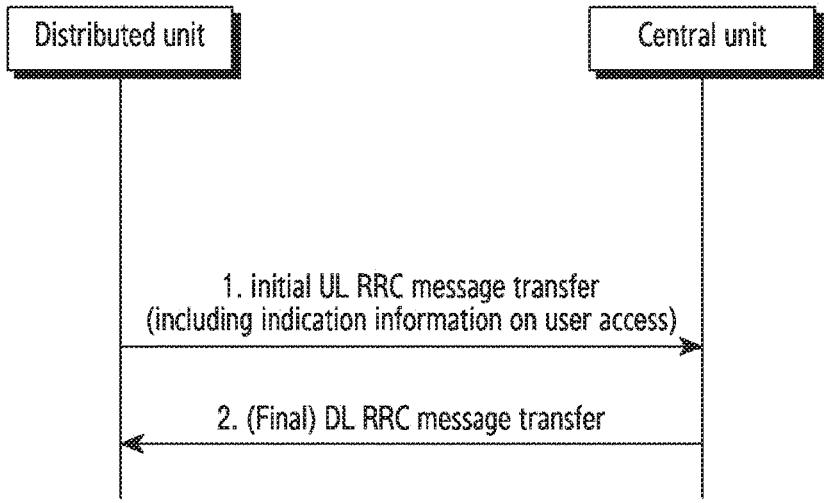
[Fig. 15]
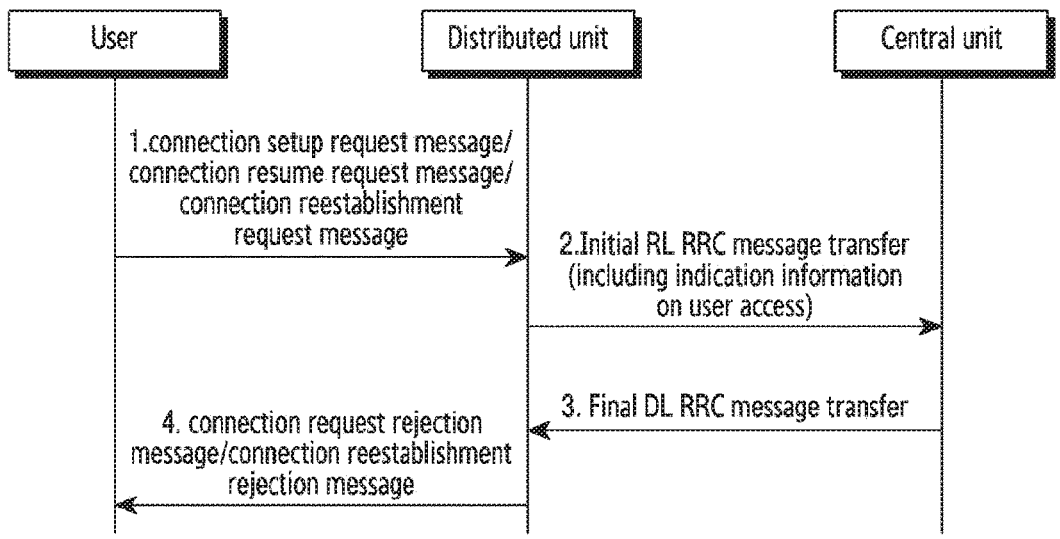
[Fig. 16A]
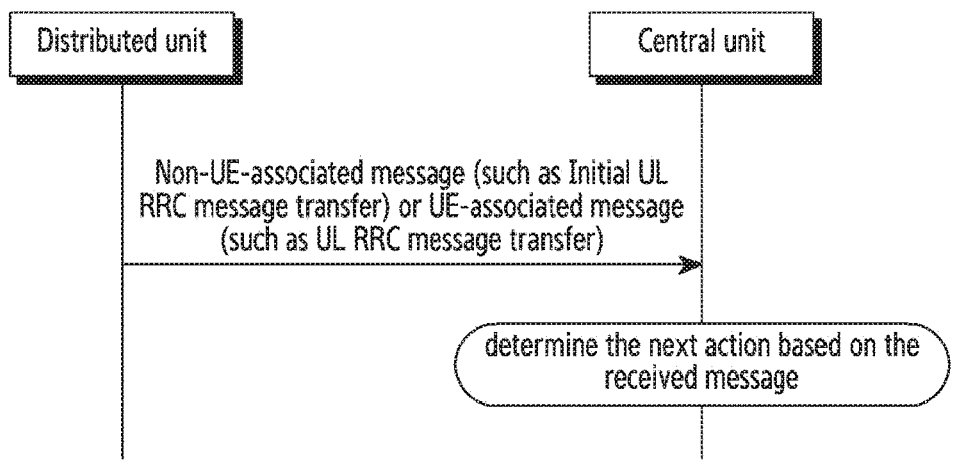

[Fig. 16B]
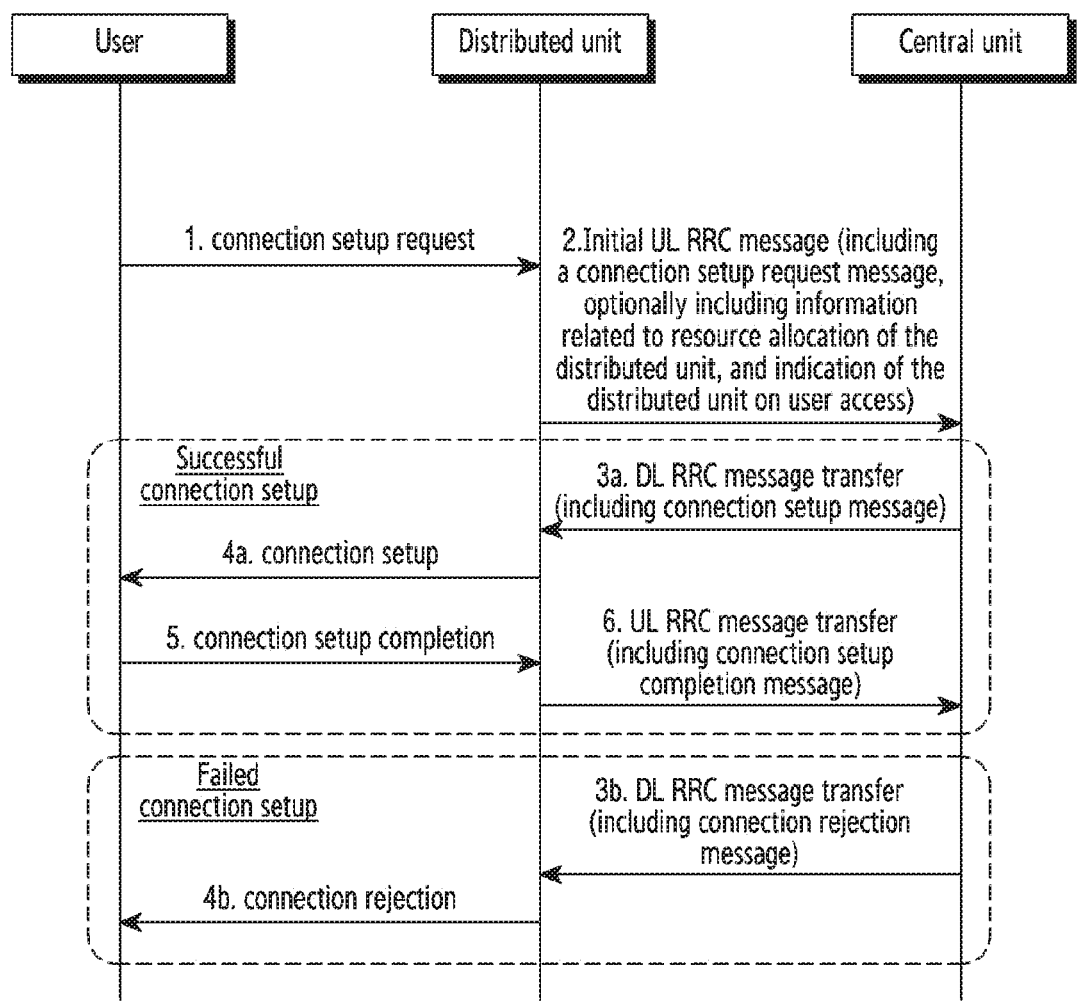

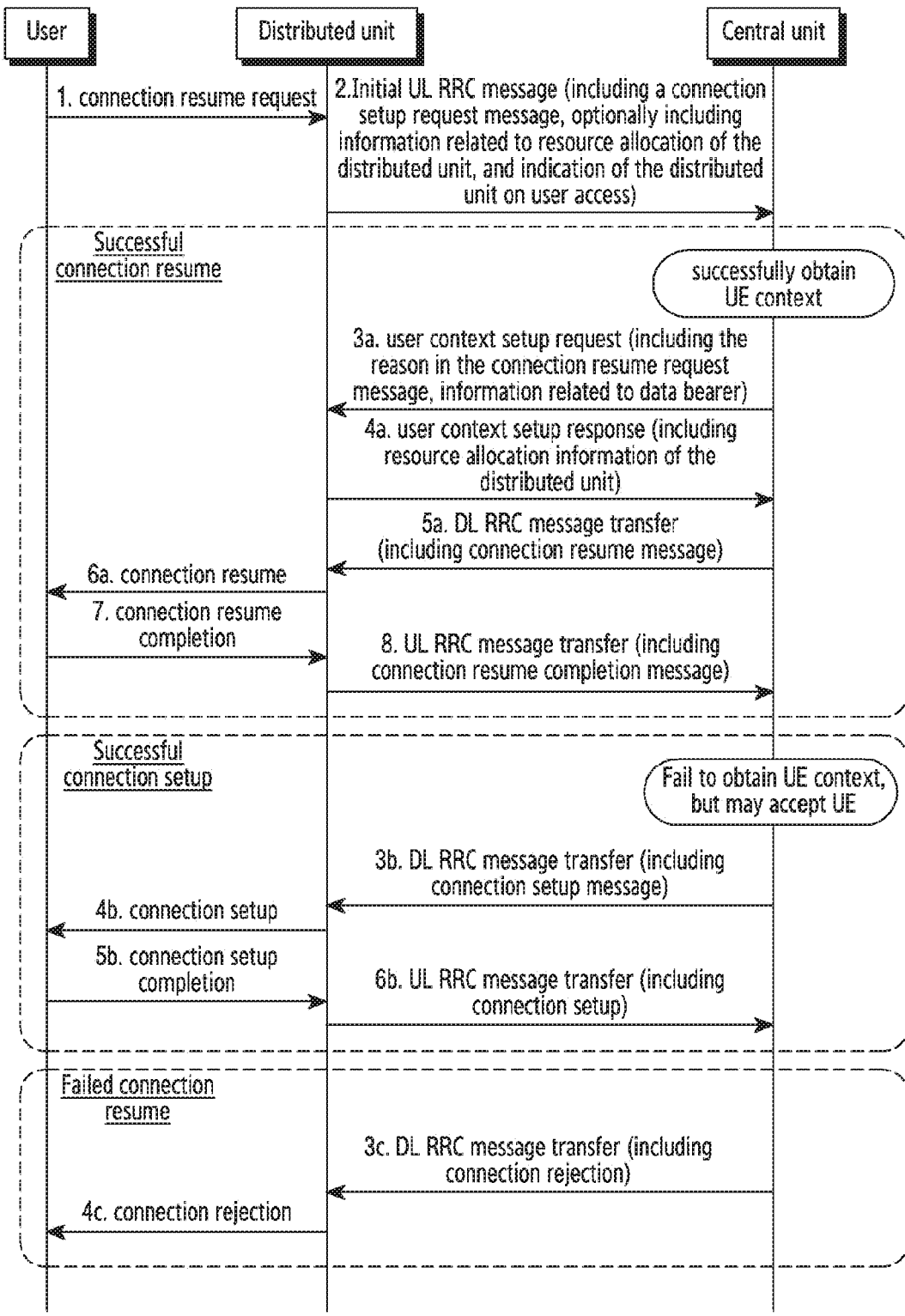

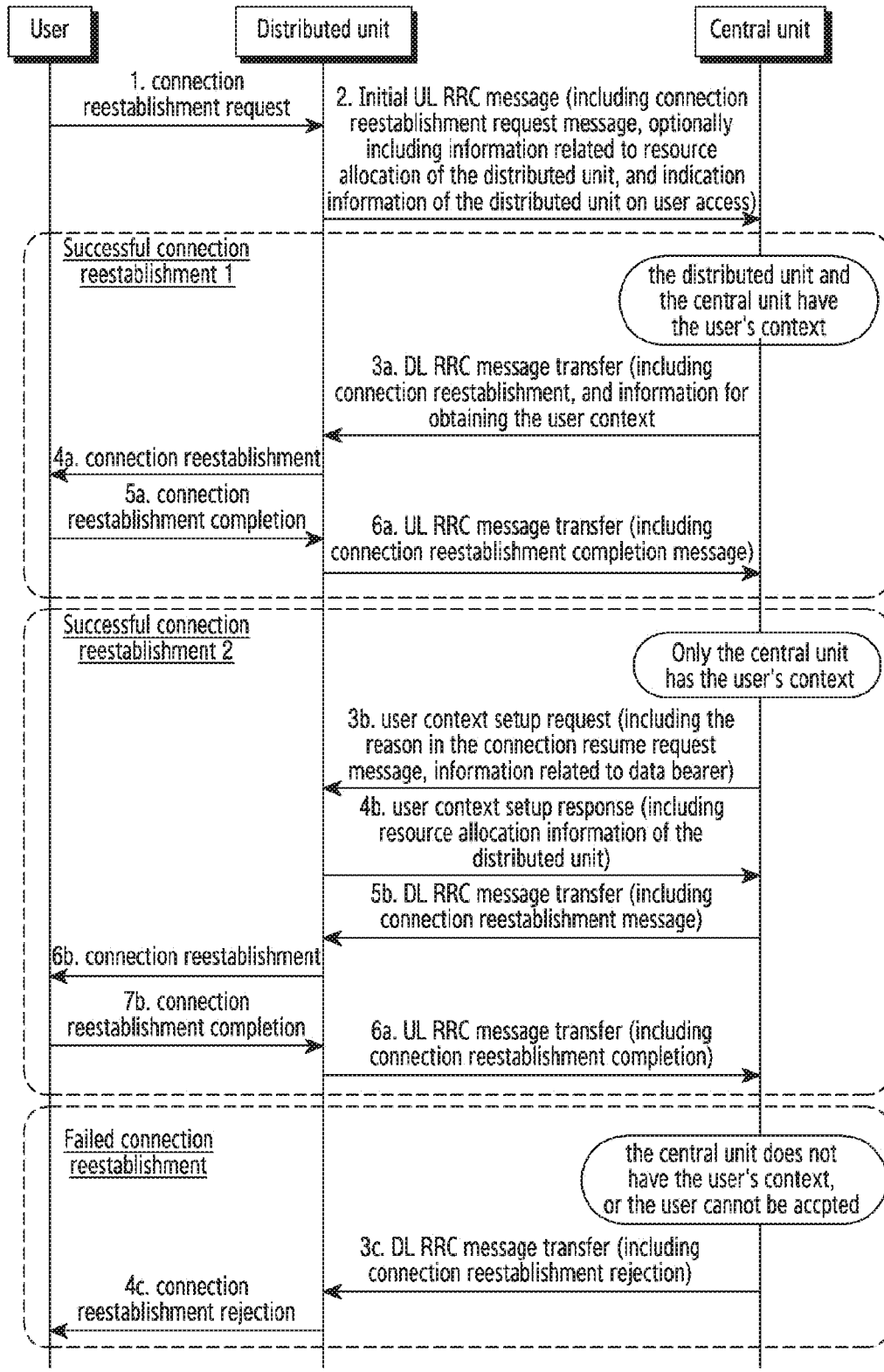
[Fig. 16D]

[Fig. 16E]
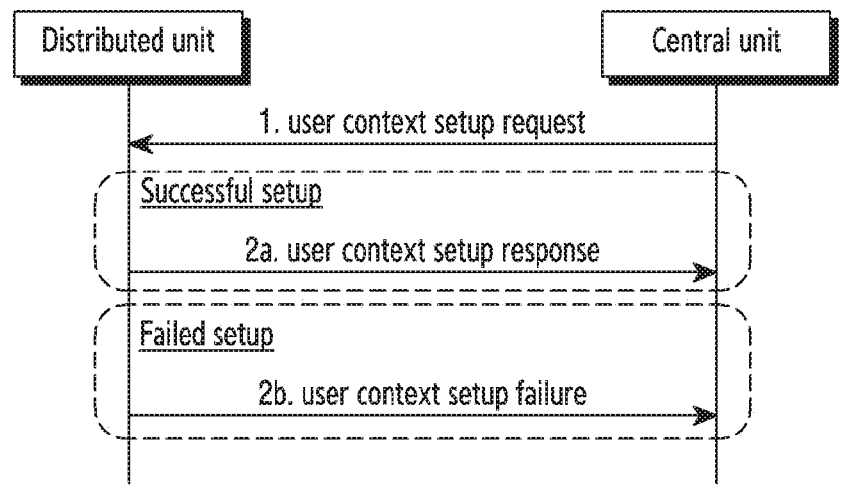

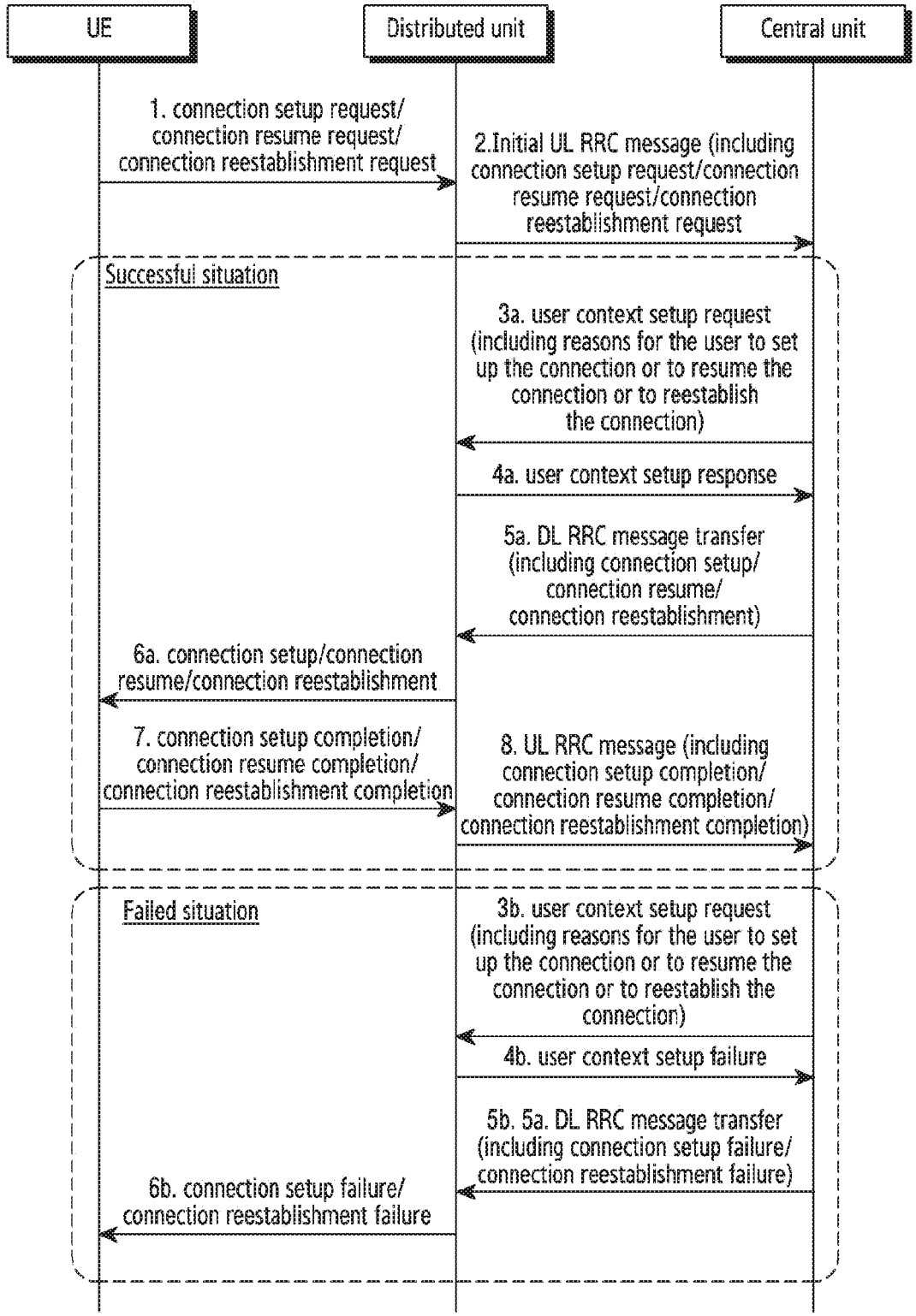
[Fig. 16F]

[Fig. 17]
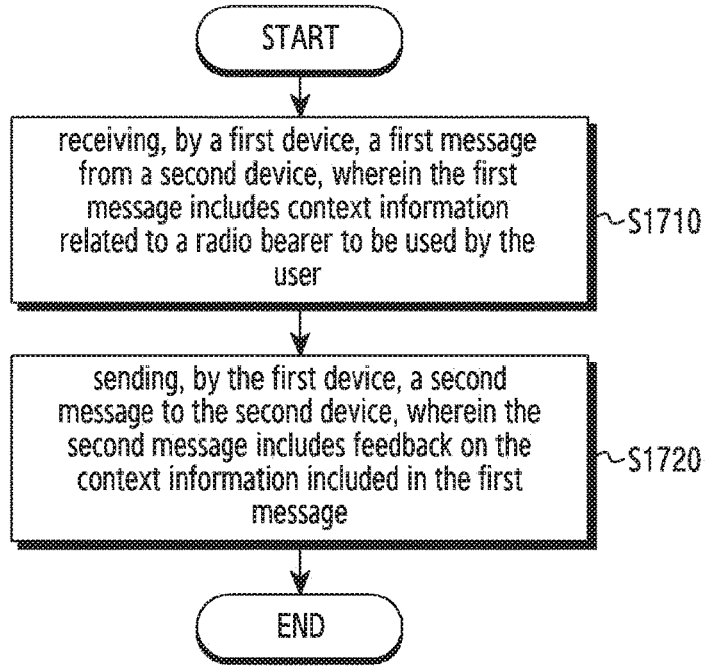
[Fig. 18]
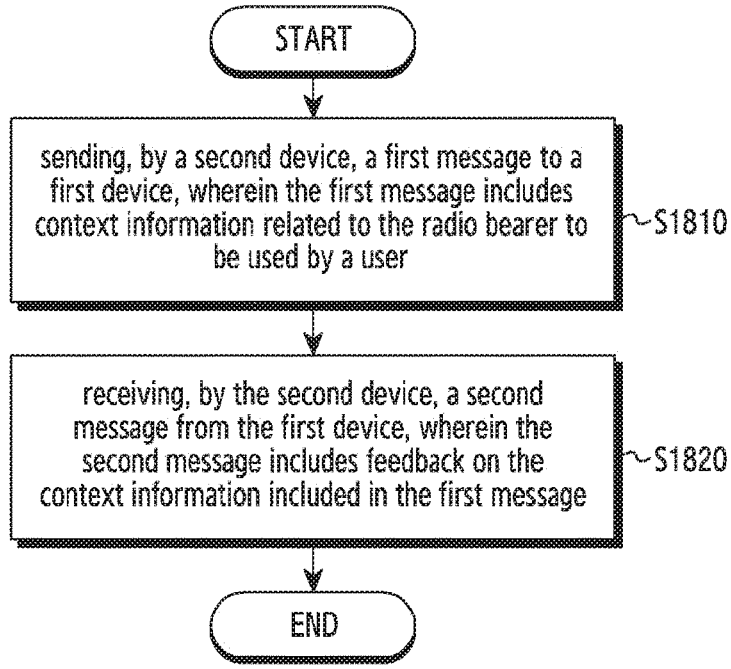
[Fig. 19]
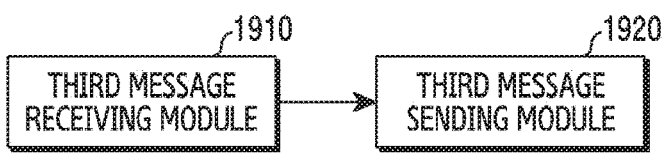

[Fig. 20]
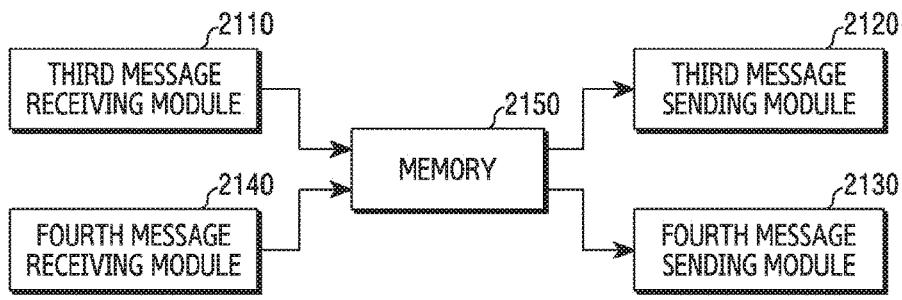
[Fig. 21]
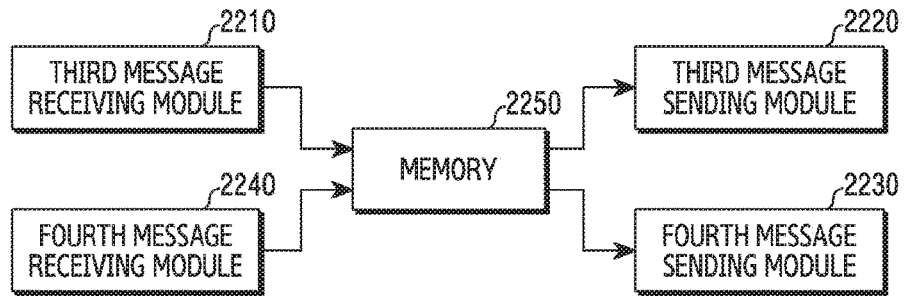
[Fig. 22]
[Fig. 23]
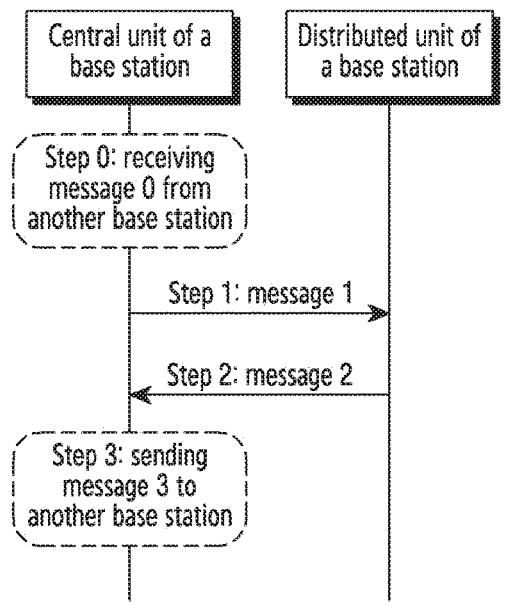

[Fig. 24]
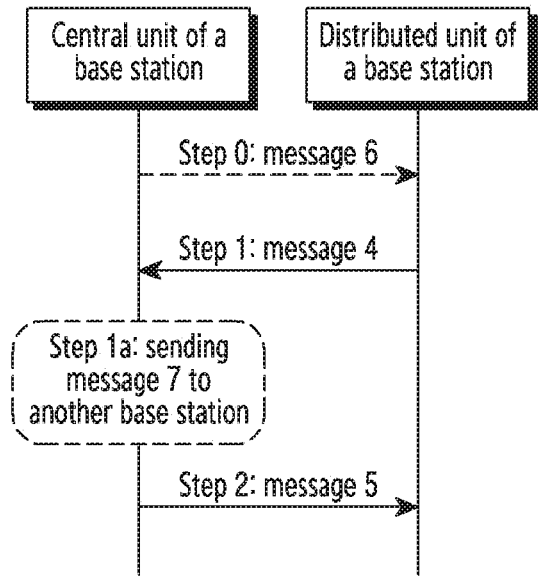
[Fig. 25]
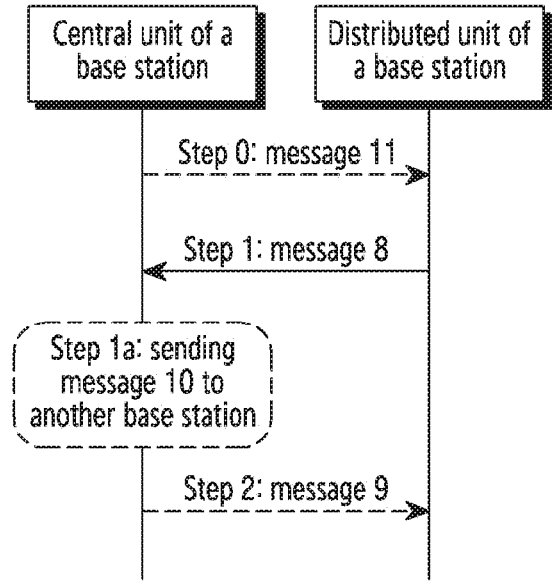

[Fig. 26]
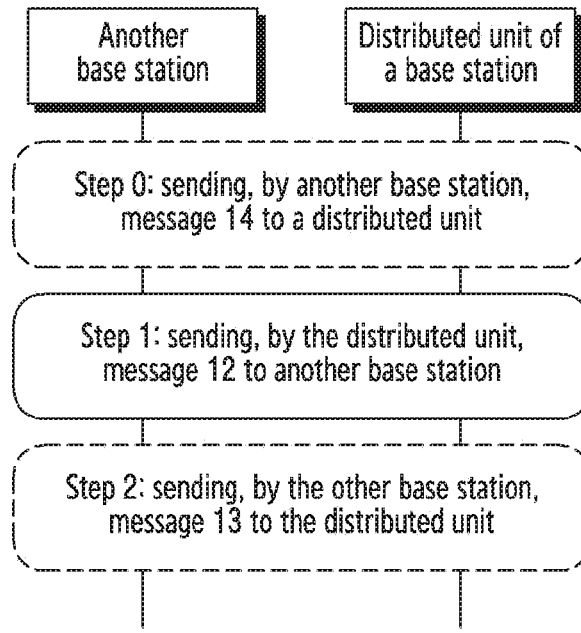
[Fig. 27]
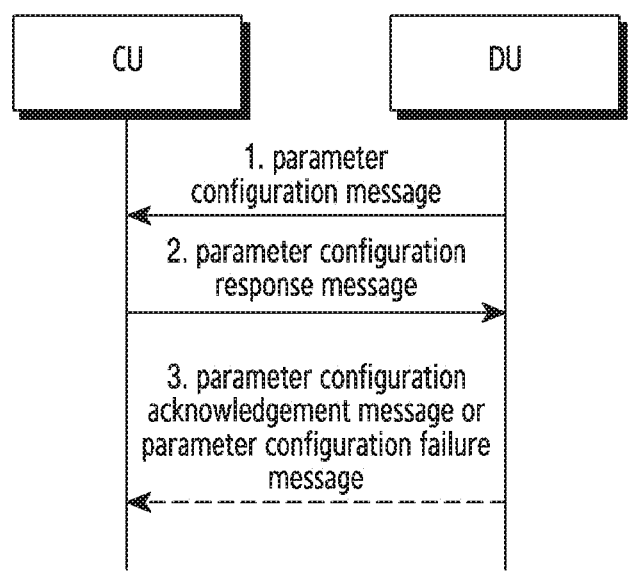

[Fig. 28]
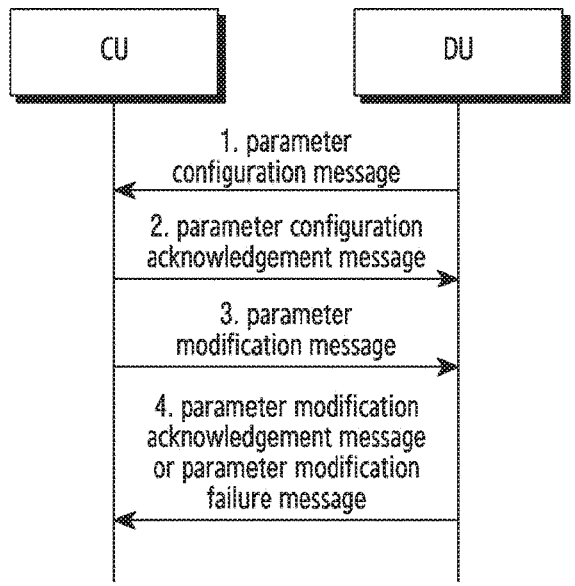
[Fig. 29]
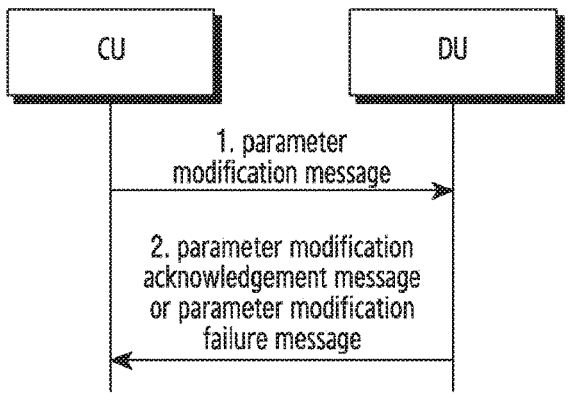
[Fig. 30]
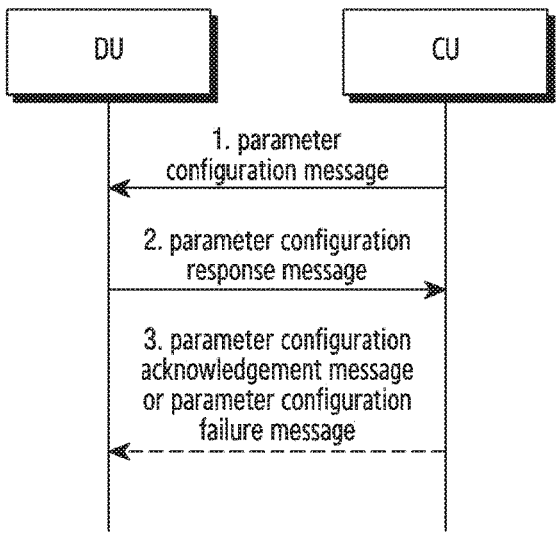

[Fig. 31]
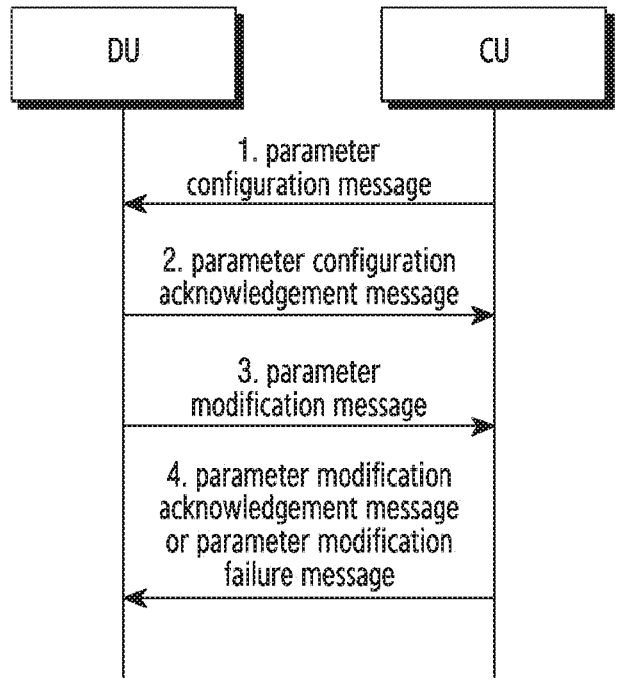
[Fig. 32]
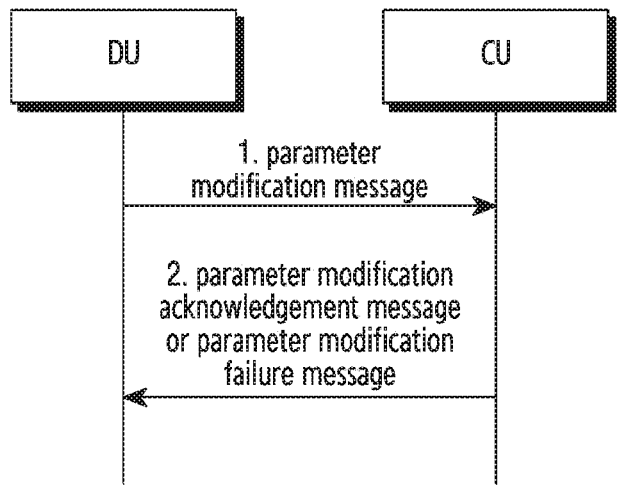

[Fig. 33]
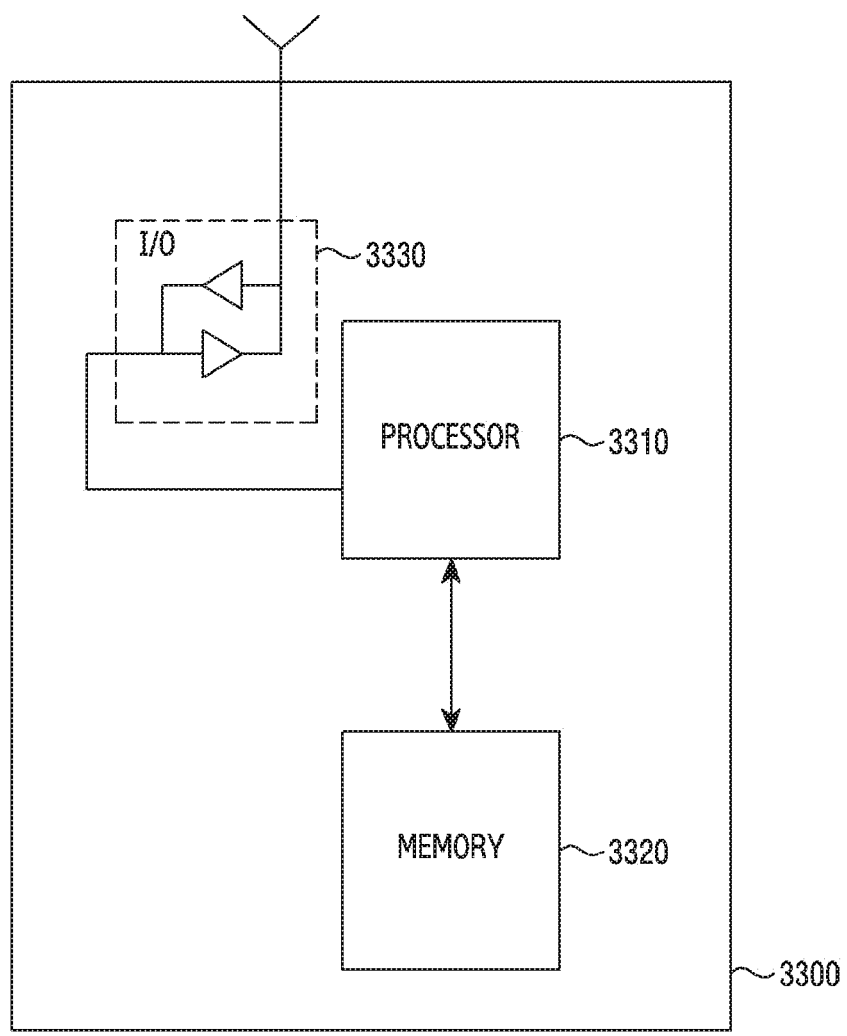

METHOD AND DEVICE FOR NETWORK ACCESS

CROSS-REFERENCE TO RELATED APPLICATION(S)

This application is a continuation application of prior application Ser. No. 16/652,227, filed on Mar. 30, 2020, which is a National Stage of PCT/KR2018/011560, filed Sep. 28, 2018, was based on and claimed priority under 35 U.S.C § 119(a) of a Chinese patent application number 201710898572.X, filed Sep. 28, 2017, of a Chinese patent application number 201710905999.8, filed Sep. 28, 2017, of a Chinese patent application number 201710932365.1, filed Oct. 9, 2017, of a Chinese patent application number 201711120988.5, filed Nov. 13, 2017 and of a Chinese patent application number 201810029454.X, filed on Jan. 11, 2018, in the Chinese Intellectual Property Office, the disclosures of each of which are incorporated by reference herein in their entireties

TECHNICAL FIELD

The present disclosure relates to the field of wireless communications technology, and in particular, to methods and devices for network access.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, in order to support network function virtualization, more efficient resource management and scheduling, a base station (For example, gNB) that provides a wireless network interface to a user equipment (UE) may be further divided into a central unit (CU) and a distributed unit (DU). The CU has at least a Radio Resource Control (RRC) and Packet Data Convergence Protocol (PDCP) protocol layer, and may also include a Service Data Adaptation Protocol (SDAP). The DU has a radio link control protocol (RLC), a medium access control (MAC), a physical layer, and the like. Between the CU and DU is a standardized public interface F1. The F1 interface is divided into control plane F1-C and user plane F1-U. The transmission network layer of F1-C is based on IP transmission. In order to transmit signaling more reliably, the SCTP protocol is added above the IP. The application layer protocol is F1AP. SCTP may provide reliable application layer messaging. The transport layer of F1-U is UDP/IP. GTP-U is used above UDP/IP to carry user plane protocol data unit PDUs.

In the existing system, a user needs to access a base station. Possible processes include an RRC connection setup procedure, an RRC connection resume procedure, and an RRC connection reestablishment procedure. These processes may result in that users cannot successfully connect to the network due to insufficient resources on the base station side or other reasons. However, the prior art does not consider the handling of a situation in which the user cannot successfully connect to the network if the base station includes a central unit and a distributed unit.

Therefore, a technical solution is needed to deal with such situation.

DISCLOSURE OF INVENTION

Solution to Problem

According to an aspect of an embodiment of the present application, there is provided a method for network access, the method comprising:

receiving a first request message forwarded by the distributed unit in a base station and indication information of a distributed unit with respect to the first request message, the first request message requesting to connect a user equipment to a network;

determining the processing to be performed on the first request message based on the indication information; and transmitting an indication of the determined processing to the distributed unit.

As an example, the processing to be performed on the first request message comprises at least one of: generating a connection setup message or a connection resume message or a connection reestablishment message; initiating a user context setup procedure to trigger an allocation of resources to the user equipment at the distributed unit; and generating a rejection message for the first request message.

As an example, the rejection message indicates that the user equipment is rejected to connect to the network, and the generating the rejection message comprises: generating the rejection message based on a request of rejecting to connect the user equipment to the network; or generating the rejection message for the first request message based on a response message transmitted from the distributed unit indicating that the user context setup procedure fails, wherein the response message is a response message with respect to a second request message transmitted to the distributed unit to establish the user context.

As an example, the determining the processing to be performed on the first request message further comprises generating a permission message with respect to the first request message, the permission message indicating that the user equipment is allowed to connect to the network. In such an example, the method further comprises transmitting the permission message to the distributed unit except the rejection message.

As an example, the indication information further includes a reason for the user to access the network that is acceptable to the distributed unit. The method further comprises: receiving a reason for the user to access the network forwarded by the distributed unit; and determining the processing to be performed on the first request message based on the forwarded reason for the user to access the network and the reason for the user to access the network that is included in the indication information and is acceptable to the distributed unit.

As an example, the method further comprising: receiving a first message from the central unit and sending a second message to the central unit, by the distributed unit, or sending the first message to the central unit and receiving the second message from the central unit, by the distributed unit, wherein the first message includes context information related to a radio bearer to be used by a user, and wherein the second message includes feedback on the context information included in the first message.

As an example, the method further comprising: receiving, by the central unit, a third message from another base station, wherein the third message includes context information provided by the other base station for a radio bearer served by the base station; and/or sending, by the central unit, a fourth message to another base station, wherein the fourth message containing context information related to the radio bearer served by the base station.

As an example, the context information includes at least one of the following: radio bearer type information; Radio Link Control (RLC) mode information; indication information for reporting RLC mode; uplink configuration information; indication information for reporting uplink configuration information; Information related to Quality of Service (QoS).

As an example, the method further comprising: receiving, by a central unit (CU), a tenth message sent from a distributed unit (DU), wherein the tenth message comprises update configuration information of a configuration parameter of the CU, which indicates an updated configuration value of the configuration parameter of the CU; and updating, by the CU, a configuration value of the corresponding configuration parameter in the CU according to the update configuration information of the configuration parameter of the CU in the tenth message; wherein the updated configuration value of the configuration parameter of the CU is within a value range of the configuration parameter determined by the DU.

As an example, the method further comprising: determining, by a central unit (CU), a value range of a configuration parameter of a distributed unit (DU); sending, by the CU, a sixth message to the DU, wherein the sixth message comprises update configuration information of the configuration parameter of the DU, which indicates an updated configuration value of the configuration parameter of the DU, and the updated configuration value of the configuration parameter of the DU is within the value range of the configuration parameter.

As an example, the determining, by the CU, the value range of the configuration parameter of the DU comprises: receiving, by the CU, a seventh message sent from the DU, wherein the seventh message comprises the value range of the configuration parameter of the DU.

As an example, the determining, by the CU, the value range of the configuration parameter of the DU comprises: receiving, by the CU, predetermined setting or system configuration; and determining the value range of the configuration parameter of the DU.

As an example, the seventh message further comprises one or more combinations of the following information: identity information of the DU, identity information of at least one cell supported by the DU, information of a neighbor cell of the at least one cell supported by the DU, and current configuration information of the configuration parameter of the DU.

As an example, when the seventh message comprises the identity information of the at least one cell supported by the DU and the identity information of at least one cell is used to update the identity information of the corresponding cell within the CU, cell indication information indicating that the update is successful or cell indication information indicating that the update is not successful is comprised in the sixth message; or the CU sends a eighth message to the DU before the CU sends the sixth message to the DU, wherein the eighth message comprises the cell indication information indicating that the update is successful or the cell indication information indicating that the update is not successful;

and/or, when the seventh message comprises the information of the neighbor cell of the at least one cell supported by the DU and the information of the neighbor cell of the at least one cell updates the neighbor cell of the corresponding cell within the CU, cell indication information indicating that the update of the neighbor cell is successful or cell indication information indicating that the update of the neighbor cell is not successful is comprised in the sixth message; or, the CU sends the eighth message to the DU before the CU sends the sixth message to the DU, wherein the eighth message comprises the cell indication information indicating that the update of the neighbor cell is successful or the cell indication information indicating that the update of the neighbor cell is not successful.

As an example, the seventh message comprises one or more configuration parameters of the DU;

a value range of each configuration parameter of the DU comprised in the seventh message is an independent information element in the seventh message; or, value ranges of all of configuration parameters of the DU comprised in the seventh message are encapsulated in a RRC container;

and/or, current configuration information of each configuration parameter of the DU comprised in the seventh message is an independent information element in the seventh message; or, current configuration information of all of configuration parameters of the DU comprised in the seventh message is encapsulated in a RRC container;

and/or, the value range and current configuration information of each configuration parameter of the DU comprised in the seventh message is an independent information element in the seventh message; or, value ranges and current configuration information of all of configuration parameters of the DU comprised in the seventh message are encapsulated in a RRC container.

As an example, the sixth message further comprises one or more combinations of the following information: identity information of the CU, update identity information of at least one cell on the DU, update information of a neighbor cell of the at least one cell on the DU, and an updated value range of the configuration parameter of the DU.

As an example, the sixth message comprises one or more configuration parameters of the DU;

update configuration information of each configuration parameter of the DU comprised in the sixth message is an independent information element in the sixth message; or, update configuration information of all of configuration parameters of the DU comprised in the sixth message is encapsulated in a RRC container;

and/or, an updated value range of each configuration parameter of the DU comprised in the sixth message is an independent information element in the sixth message; or, updated value ranges of all of configuration parameters of the DU comprised in the sixth message are encapsulated in a RRC container;

and/or, the updated value range and update configuration information of each configuration parameter comprised in the sixth message is an independent information element in the sixth message; or, updated value ranges and update configuration information of all of configuration parameters of the DU comprised in the sixth message are encapsulated in a RRC container.

According to an aspect of an embodiment of the present application, there is provided a method for network access, the method comprising: forwarding a first request message received from the user equipment and indication information with respect to the first request message to a central unit in a base station, the first request message requesting to connect the user equipment to a network; receiving an indication of the processing to be performed on the first request message from the central unit; and processing the first request message based on the indication.

As an example, the indication of the processing to be performed on the first request message comprises an indication of at least one of: receiving and forwarding a connection setup message or a connection resume message or a connection reestablishment message; triggering an allocation of resources to the user equipment based on a user context setup procedure; and receiving and forwarding a rejection message for the first request message.

As an example, the method may further comprise receiving a second request message for establishing a user context from the central unit in the base station after forwarding the first request message to the central unit, generating a response message indicating that the user context setup procedure fails based on a request of rejecting to connect the user equipment to the network, and transmitting the response message to the central unit in the base station. Alternatively, the method may further comprise receiving a permission message indicating that the user equipment is allowed to connect to the network from the central unit, and selecting one of the rejection message and the permission message to be transmitted to the user equipment based on whether the user equipment can be connected to the network.

As an example, the indication information further includes a reason for the user to access the network that is acceptable to the distributed unit. The method further comprises: forwarding a reason for the user to access the network to the central unit, so that the central unit determines the processing to be performed on the first request message based on the forwarded reason for the user to access the network and a reason for the user to access the network that is included in the indication information and is acceptable to the distributed unit.

As an example, the method further comprising: receiving a first message from the central unit or sending the first message to the central unit by the distributed unit, wherein the first message includes context information related to a radio bearer to be used by a user; and sending a second message to the central unit or receiving the second message from the central unit by the distributed unit, wherein the second message includes feedback on the context information included in the first message.

As an example, the method further comprising at least one of the following: reporting, by the distributed unit, wireless link state related information to the central unit; receiving, by the distributed unit, radio link configuration related information from the central unit; sending, by the distributed unit, wireless link state related information to another base station; receiving, by the distributed unit, radio link configuration related information from another base station; sending, by the distributed unit, wireless link state related information to another base station through the central unit; receiving, by the distributed unit, radio link configuration related information from another base station through the central unit.

As an example, the radio link state related information includes uplink outage or resume indication information and/or downlink outage or resume indication information; and/or wherein the radio link configuration related information includes indication information of using uplink resources and/or downlink resources of the distributed unit.

As an example, the method further comprising at least one of the following: receiving, by the distributed unit, a request for reporting radio link state related information from the central unit; receiving, by the distributed unit, a request for reporting radio link state related information from another base station; receiving, by the distributed unit, a request for reporting radio link state related information sent from another base station and forwarded by the central unit.

As an example, the context information includes at least one of the following: radio bearer type information; Radio Link Control (RLC) mode information; indication information for reporting RLC mode; uplink configuration information; indication information for reporting uplink configuration information; Information related to Quality of Service (QoS).

As an example, the method further comprising: receiving, by a distributed unit (DU), a sixth message sent from a central unit (CU), wherein the sixth message comprises update configuration information of a configuration parameter of the DU, which indicates an updated configuration value of the configuration parameter of the DU; updating, by the DU, a configuration value of the corresponding configuration parameter in the DU according to the update configuration information of the configuration parameter of the DU in the sixth message; wherein the updated configuration value of the configuration parameter of the DU is within a value range of the configuration parameter determined by the CU.

As an example, the method further comprising: determining, by a distributed unit (DU), a value range of a configuration parameter of a central unit (CU); sending, by the DU, a tenth message to the CU, wherein the tenth message comprises update configuration information of the configuration parameter of the CU, which indicates an updated configuration value of the configuration parameter of the CU, and the updated configuration value of the configuration parameter of the CU is within the value range of the configuration parameter.

As an example, the determining, by the DU, the value range of the configuration parameter of the CU comprises: receiving, by the DU, a eleventh message sent from the CU, wherein the eleventh message comprises the value range of the configuration parameter of the CU.

As an example, the determining, by the DU, the value range of the configuration parameter of the CU comprises: receiving, by the DU, predetermined setting or system configuration; and determining the value range of the configuration parameter of the CU.

As an example, the eleventh message further comprises one or more combinations of the following information: identity information of the CU, update identity information of at least one cell supported by the DU, update information of a neighbor cell of the at least one cell supported by the DU, and current configuration information of the configuration parameter of the CU.

As an example, the eleventh message comprises the update identity information of the at least one cell supported by the DU, cell indication information indicating that the update is successful or cell indication information indicating that the update is not successful is comprised in the tenth message; or, the DU sends a twelfth message to the CU before the DU sends the tenth message to the CU, wherein the twelfth message comprises the cell indication information indicating that the update is successful or the cell indication information indicating that the update is not successful;

and/or, when the eleventh message comprises the update information of the neighbor cell of the at least one cell supported by the DU, cell indication information indicating that the update of the neighbor cell is successful or cell indication information indicating that the update of the neighbor cell is not successful is comprised in the tenth message; or, the DU sends the twelfth message to the CU before the DU sends the tenth message to the CU, wherein the twelfth message comprises the cell indication information indicating that the update of the neighbor cell is successful or the cell indication information indicating that the update of the neighbor cell is not successful.

As an example, the eleventh message comprises one or more configuration parameters of the CU;

the value range of each configuration parameter of the CU comprised in the eleventh message is an independent information element in the eleventh message; or, value ranges of all of configuration parameters of the CU comprised in the eleventh message are encapsulated in a RRC container;

and/or, current configuration information of each configuration parameter of the CU comprised in the eleventh message is an independent information element in the eleventh message; or, current configuration information of all of configuration parameters of the CU comprised in the eleventh message is encapsulated in a RRC container;

and/or, the value range and current configuration information of each configuration parameter of the CU comprised in the eleventh message is an independent information element in the eleventh message; or, value ranges and current configuration information of all of configuration parameters of the CU comprised in the eleventh message are encapsulated in a RRC container.

As an example, the tenth message further comprises one or more combinations of the following information: identity information of the DU, identity information of the at least one cell supported by the DU, information of the neighbor cell of the at least one cell supported by the DU, and an updated value range of the configuration parameter of the CU.

As an example, wherein the tenth message comprises one or more configuration parameters of the CU;

update configuration information of each configuration parameter of the CU comprised in the tenth message is an independent information element in the tenth message; or, update configuration information of all of configuration parameters of the CU comprised in the tenth message is encapsulated in a RRC container;

and/or, an updated value range of each configuration parameter of the CU comprised in the tenth message is an independent information element in the tenth message; or, updated value ranges of all of configuration parameters of the CU comprised in the tenth message are encapsulated in a RRC container;

and/or, the updated value range and update configuration information of each configuration parameter of the CU comprised in the tenth message is an independent information element in the tenth message; or, updated value ranges and update configuration information of all of configuration parameters of the CU comprised in the tenth message are encapsulated in a RRC container.

According to an aspect of an embodiment of the present application, there is provided a central unit device in a base station for network access, comprising:

a message receiving module configured to receive a first request message forwarded by the distributed unit in a base station and indication information of a distributed unit with respect to the first request message, wherein the first request message requests to connect a user equipment to a network;

a message processing module configure to determine the processing to be performed on the first request message based on the indication information; and a message transmitting module configured to transmit an indication of the determined processing to the distributed unit.

As an example, the processing to be performed on the first request message comprises at least one of: generating a connection setup message or a connection resume message or a connection reestablishment message; initiating a user context setup procedure to trigger an allocation of resources to the user equipment by the distributed unit; and generating a rejection message for the first request message.

As an example, the rejection message indicates that the user equipment is rejected to connect to the network, and the message processing module may be configured to: generate the rejection message based on a request of rejecting to connect the user equipment to the network; or generate the rejection message for the first request message based on a response message transmitted from the distributed unit indicating that the user context setup procedure fails, wherein the response message is a response message with respect to a second request message transmitted to the distributed unit to establish the user context.

As an example, the message processing module may be configured to generate a permission message with respect to the first request message, the permission message indicating that the user equipment is allowed to connect to the network. In such an example, the message transmitting module is configured to transmit the permission message to the distributed unit except the rejection message.

As an example, the indication information further includes a reason for the user to access the network that is acceptable to the distributed unit. The message receiving module is configured to: receive a reason for the user to access the network forwarded by the distributed unit. The message receiving module is configured to determine the processing to be performed on the first request message based on the forwarded reason for the user to access the network and the reason for the user to access the network that is included in the indication information and is acceptable to the distributed unit.

According to an aspect of an embodiment of the present application, there is provided a distributed unit device in a base station for network access, comprising:

a first message receiving module configured to receive a first request message from a user equipment, the first request message requesting to connect the user equipment to a network;

a first message transmitting module configured to forward the first request message and indication information with respect to the first request message to a central unit in the base station;

a second message receiving module configured to receive an indication of the process to be performed on the first request message from the central unit; and a message processing module configured to process the first request message based on the indication.

As an example, the indication of the processing to be performed on the first request message comprises an indication of at least one of: receiving and forwarding a connection setup message or a connection resume message or a connection reestablishment message; triggering an allocation of resources to the user equipment based on a user context setup procedure; and receiving and forwarding a rejection message for the first request message.

As an example, the second message receiving module is configured to receive a second request message for establishing a user context from the central unit in the base station after forwarding the first request message to the central unit. The message processing module is configured to generate a response message indicating that the user context setup procedure fails based on a request of rejecting to connect the user equipment to the network. The first message transmitting module is configured to transmit the response message to the central unit in the base station. Alternatively, the second message receiving module is configured to receive a permission message indicating that the user equipment is allowed to connect to the network from the central unit. The message determining module is configured to select one of the rejection message and the permission message to be transmitted to the user equipment based on whether the user equipment can be connected to the network.

As an example, the indication information further includes a reason for the user to access the network that is acceptable to the distributed unit. The first message transmitting module is further configured to forward a reason for the user to access the network to the central unit, so that the central unit determines the processing to be performed on the first request message based on the forwarded reason for the user to access the network and a reason for the user to access the network that is included in the indication information and is acceptable to the distributed unit.

According to an aspect of an embodiment of the present application, there is provided a device for network access, comprising:

at least one processor; and a memory in communication connection with the at least one processor; wherein, the memory stores instructions that are executable to the at least one processor, the instructions, when executed by the at least one processor, causing the at least one processor to perform the method according to embodiments of the present disclosure.

According to a specific embodiment, the device may be a central unit in a base station or a distributed unit in the base station.

According to an aspect of an embodiment of the present application, there is provided a computer-readable storage medium having stored thereon executable instructions that, when executed by a processor, cause a processor to perform the method according to embodiments of the present disclosure.

According to the technical solutions of the embodiments of the present invention, when the resources on the base station side are insufficient to enable the user to successfully connect to the network, the central unit or the distributed unit rejects the user connection request through message interaction between the central unit and the distributed unit.

BRIEF DESCRIPTION OF DRAWINGS

FIG. 1 shows a schematic diagram of a connection relationship between a CU and a DU according to an embodiment of the present invention;

FIG. 2 shows a flowchart of a method for network access implemented in a central unit according to an embodiment of the present invention;

FIG. 3 shows a flowchart of a method for network access implemented in a distributed unit according to an embodiment of the present invention;

FIG. 4 shows a schematic block diagram of a device for network access corresponding to the method of FIG. 2;

FIG. 5 shows a schematic block diagram of a device for network access corresponding to the method of FIG. 3;

FIG. 6 shows a schematic diagram of an example of a central unit rejecting a user connection request according to an embodiment of the present invention;

FIG. 7 shows a sequence diagram of a method of rejecting a user connection request in the situation shown in FIG. 6 according to an embodiment of the present invention;

FIG. 8 shows a schematic diagram of another example of a central unit rejecting a user connection request according to an embodiment of the present invention;

FIG. 9 shows a sequence diagram of a method of rejecting a user connection request in the situation shown in FIG. 8 according to an embodiment of the present invention;

FIG. 10 shows a schematic diagram of an example of a distributed unit rejecting a user connection request according to an embodiment of the present invention;

FIG. 11 shows a sequence diagram of a method of rejecting a user connection request in the situation shown in FIG. 10 according to an embodiment of the present invention;

FIG. 12 shows a schematic diagram of another example of a distributed unit rejecting a user connection request according to an embodiment of the present invention;

FIG. 13 shows a sequence diagram of a method of rejecting a user connection request in the situation shown in FIG. 12 according to an embodiment of the present invention;

FIG. 14 shows a schematic diagram of another example of a distributed unit rejecting a user connection request according to an embodiment of the present invention;

FIG. 15 shows a sequence diagram of a method of rejecting a user connection request in the situation shown in FIG. 14 according to an embodiment of the present invention;

FIGS. 16A to 16F illustrate schematic flow charts for processing a connection request message based on an indication from a central unit according to an embodiment of the present invention;

FIG. 17 shows a schematic flow chart of a method for context interaction according to an embodiment of the present disclosure;

FIG. 18 shows a schematic flow chart of another method for context interaction according to an embodiment of the present disclosure;

FIG. 19 shows a schematic block diagram of an example of a device for context interaction according to an embodiment of the present disclosure;

FIG. 20 shows a schematic block diagram of another example of a device for context interaction according to an embodiment of the present disclosure;

FIG. 21 shows a schematic block diagram of a central unit for context interaction according to an embodiment of the present disclosure;

FIG. 22 shows a schematic block diagram of a distributed unit for context interaction according to an embodiment of the present disclosure;

FIG. 23 shows a flowchart of a flow of context interaction initiated by a central unit according to an embodiment of the present disclosure;

FIG. 24 shows a flowchart of a flow of context interaction initiated by a distributed unit according to an embodiment of the present disclosure;

FIG. 25 shows a flowchart of a flow example of reporting a state of a radio link according to an embodiment of the present disclosure;

FIG. 26 shows a flowchart of another flow example of reporting a state of a radio link according to an embodiment of the present disclosure;

FIG. 27 is a schematic diagram illustrating a mode 1 for modifying a configuration parameter of the DU by the CU, according to an embodiment of the present disclosure;

FIG. 28 is a schematic diagram illustrating a mode 2 for modifying a configuration parameter of the DU by the CU, according to an embodiment of the present disclosure;

FIG. 29 is a schematic diagram illustrating a mode 3 for modifying a configuration parameter of the DU by the CU, according to an embodiment of the present disclosure;

FIG. 30 is a schematic diagram illustrating a mode 1 for modifying a configuration parameter of the CU by the DU, according to an embodiment of the present disclosure;

FIG. 31 is a schematic diagram illustrating a mode 2 for modifying a configuration parameter of the CU by the DU, according to an embodiment of the present disclosure;

FIG. 32 is a schematic diagram illustrating a mode 3 for modifying a configuration parameter of the CU by the DU, according to an embodiment of the present disclosure;

FIG. 33 schematically shows a block diagram of a base station according to an embodiment of the present disclosure.

BEST MODE FOR CARRYING OUT THE INVENTION

In order to make the purpose, technical solutions, and advantages of the present application clearer, the present application is described below in detail with reference to the accompanying drawings. It should be noted that the following description is only for the purpose of illustration and not for limiting the present disclosure. In the following description, numerous specific details are set forth in order to provide a thorough understanding of the present disclosure. However, it will be apparent to one skilled in the art that the present disclosure need not be practiced with these specific details. In other instances, well-known circuits, materials, or methods have not been described in detail in order to avoid obscuring the present disclosure.

Throughout the specification, reference to "one embodiment," "an embodiment," "one example" or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout the specification are not necessarily referring to the same embodiment or example. In addition, the particular features, structures, or characteristics may be combined in any suitable combination and/or sub-combination in one or more embodiments or examples. Moreover, one skilled in the art will understand that the drawings provided herein are for illustration purposes only and the drawings are not necessarily drawn to scale. As used herein, the term "and/or" includes any and all combinations of one or more of the associated listed items.

The names of the messages involved in the present invention are only an example, and other names may be used.

FIG. 1 shows a schematic diagram of a connection relationship between a CU and a DU according to an embodiment of the present invention. As shown in FIG. 1, a CU and a DU communicate via a control plane interface F1-C and a user plane interface F1-U.

It should be noted that the connection relationship shown in FIG. 1 is only an example. In some other examples, one CU may also be connected to multiple DUs. In some examples, CUs and DUs may be physically co-located, such as in the same machine room, on the same rack, or even on the same circuit board. However, in some other examples, the CU and the DU may also be away from each other. The embodiment of the present invention is not limited to the connection shown in FIG. 1.

When the base station includes the central unit and the distributed unit as shown in FIG. 1, the RRC connection setup procedure, the RRC connection resume procedure, the RRC connection reestablishment procedure, and the like need to be completed by the central unit and the distributed unit together. If the user cannot successfully connect to the network, the reason may be that the central unit cannot accept the user, or the distributed unit cannot accept the user. The prior art does not consider the case where the base station includes a central unit and a distributed unit. The reason that the central unit described herein cannot accept the user (or cannot connect the user equipment to the network) may be that the resources of the central unit are not enough to accept the user, the congestion occurs at the central unit, the central unit cannot obtain the user context, or any other reason of the central unit that cannot connect the user's user equipment to the network. The reason that the distributed unit cannot accept the user (or cannot connect the user equipment to the network) may be that the resources of the distributed unit are not enough to accept the user, the congestion occurs at the distributed unit, or any other reason of the distributed unit that cannot connect the user's user equipment to the network. In addition, the central unit and the distributed unit may also be able to accept the user, but are unwilling to connect the user's user equipment to the network for some reason (such as the respective load policies of the central unit and the distributed unit, etc.). The technical solutions of the embodiments of the present invention also apply to this case. Therefore, unless explicitly stated otherwise, in the following description of the technical solutions of the embodiments of the present invention, for example, the conditions of "cannot accept", "unable to connect" and "unable to access" may also include "unwilling to accept" and "unwilling to connect", and "unwilling to access" situation.

For this reason, the technical solutions shown in FIGS. 2 and 3 have been made. FIG. 2 shows a method 200 for network access implemented in a central unit according to an embodiment of the present invention. As shown in FIG. 2, in step S210, a first request message forwarded by the distributed unit in a base station and indication information of a distributed unit with respect to the first request message are received. The first request message requests to connect a user equipment to the network.

According to a specific embodiment of the present invention, the first request message may be one of a connection setup request message, a connection resume request message, and a connection reestablishment request message. Of course, the first request message may also be any message currently used in the field or used in the future to request to connect the user equipment to the network.

In step S220, the processing to be performed on the first request message is determined based on the indication information.

The processing to be performed on the first request message may comprise one of:

generating a connection setup message or a connection resume message or a connection reestablishment message;

initiating a user context setup procedure to trigger an allocation of resources to the user equipment by the distributed unit; and generating a rejection message for the first request message.

Corresponding to the specific form of the first request message, the rejection message may be a connection rejection message or a connection reestablishment rejection message or any other message having a corresponding form. For example, if the first request message is a connection setup request message/connection resume request message, the rejection message is a connection rejection message. If the first request message is a connection reestablishment request message, the rejection message is a connection reestablishment rejection message. Of course, in some embodiments, it may also be a message containing the above rejection message.

As described above, the user connection request may be rejected due to a reason of the central unit, or the user connection request may be rejected due to a reason of the distributed unit. In the former case, a rejection message may be generated based on that the central unit does not accept the request of connecting the user equipment to the network. In the latter case, the rejection message may be generated based on the feedback of the distributed unit, or a rejection message may be directly generated and transmitted to the distributed unit, and the distributed unit itself decides whether to adopt the rejection message or not. For example, a second request message for establishing a user context may be transmitted to the distributed unit, a response message transmitted by the distributed unit indicating that the user context setup fails may be received, and a rejection message with respect to the first request message may be generated based on the response message. For example, information indicating that the distributed unit rejects the request of connecting the user equipment to the network may be received from the distributed unit, and a rejection message is generated based on the information.

The indication information also includes a reason for accepting the user to access the network by the distributed unit. In this case, the method shown in FIG. 2 may further include: receiving a reason for the user to access network forwarded by the distributed unit (the reason may be included in the first request message, and may also be obtained by the distributed unit from the first request message); determining the processing to be performed on the first request message based on the reason for the user to access the network forwarded by the distributed unit, and the reason for accepting the user to access the network by the distributed unit, which is included in the indication information.

Then, in step S230, an indication for the determined processing is transmitted to the distributed unit.

FIG. 3 shows a method 300 for network access implemented in a distributed unit according to an embodiment of the present invention. As shown in FIG. 3, in step S310, a first request message received from the user equipment and indication information with respect to the first request message are forwarded to the central unit. The first request message requests to connect the user equipment to the network.

According to a specific embodiment of the present invention, the first request message may be one of a connection setup request message, a connection resume request message, and a connection reestablishment request message. Of course, the first request message may also be any message currently used in the field or used in the future to request to connect the user equipment to the network.

In step S320, an indication of the processing to be performed on the first request message is received from the central unit.

The indication of the processing to be performed on the first request message comprises an indication of one of:

receiving and forwarding a connection setup message or a connection resume message or a connection reestablishment message;

triggering an allocation of resources to the user equipment based on a user context setup procedure; and receiving and forwarding a rejection message with respect to the first request message.

Corresponding to the specific form of the first request message, the rejection message may be a connection rejection message or a connection reestablishment rejection message or any other message having a corresponding form. For example, if the first request message is a connection setup request message/connection resume request message, the rejection message is a connection rejection message. If the first request message is a connection reestablishment request message, the rejection message is a connection reestablishment rejection message. Of course, in some embodiments, it may also be a message containing the above rejection message.

In a specific embodiment, for example, after receiving a second request message for establishing a user context from the central unit, a response message indicating that the user context setup fails is generated based on that the distributed unit does not accept the request of connecting the user equipment to the network, the response message is transmitted to the central unit, and the central unit generates a rejection message based on the response message. For example, based on that the distributed unit does not accept the request of connecting the user equipment to the network, information indicating that the distributed unit rejects to connect the user equipment to the network may be generated and the information may be transmitted to the central unit so that the central unit can generate a rejection message based on the information. For example, the distributed unit may not feed back to the central unit whether it can connect the user equipment to the network, but receives both the rejection message and the permission message indicating that the user equipment is allowed to connect to the network from the central unit, and select one from the rejection message and the permission message based on whether the distributed unit can connect the user equipment to the network or not. The permission message described here also takes the form corresponding to the first request message. For example, if the first request message is a connection setup request message, the permission message is a connection setup message. If the first request message is a connection resume request message, the allow message is a connection resume message or a connection setup message. If the first request message is a connection reestablishment request message, the allow message is a connection reestablishment message.

The above indication information may also include the reason for accepting the user to access the network by the distributed unit. The method shown in FIG. 3 may further include: forwarding the reason for the user to access the network to the central unit (the reason information may be included in the first request message, and may be obtained by the distributed unit from the first request message). The central unit determines the processing to be performed on the first request message based on the reason for the user to access network forwarded by the distributed unit, and the reason for accepting the user to access the network by the distributed unit, which is included in the indication information.

Then, in step S330, the first request message is processed based on the indication.

FIGS. 4 and 5 also show device block diagrams corresponding to the methods shown in FIGS. 2 and 3. FIG. 4 shows a schematic block diagram of a device 400 for network access corresponding to the method of FIG. 2. As shown in FIG. 4, the device 400 includes a message receiving module 410, a message processing module 420, and a message transmitting module 430. According to various embodiments of the present disclosure, the device 400 may include a communication unit and at least one processor. The receiving module 410, the message processing module 420, and the message transmitting module 430 may be included in the at least one processor. The message receiving module 410 is configured to receive a first request message and indication information with respect to the first request message forwarded by the distributed unit, where the first request message requests to connect the user equipment to a network. The message processing module 420 is configured to determine the processing to be performed on the first request message based on the indication information. The message transmitting module is configured to transmit an indication of the determined processing to the distributed unit.

As an example, the processing to be performed on the first request message comprises one of: generating a connection setup message or a connection resume message or a connection reestablishment message; initiating a user context setup procedure to trigger an allocation of resources to the user equipment by the distributed unit; and generating a rejection message for the first request message.

For example, the rejection message indicates that the user equipment is rejected to connect to the network. The message processing module 420 is further configured to generate a rejection message based on that the device 400 does not accept the request of connecting the user equipment to the network.

For example, the message transmitting module 430 is further configured to transmit a second request message for establishing a user context to the distributed unit. The message receiving module 410 is further configured to receive a response message transmitted by the distributed unit indicating that the user context setup fails. The message processing module 420 is further configured to generate a rejection message for the first request message based on the response message.

For example, the message processing module 420 is further configured to generate a permission message with respect to the first request message indicating that the user equipment is allowed to connect to the network. The message transmitting module 430 is further configured to transmit the permission message to the distributed unit except the rejection message.

As described above, the response message and the permission message may respectively take a form corresponding to the first request message.

For example, the indication information also includes a reason for accepting the user to access the network by the distributed unit. The message receiving module 410 is further configured to receive a reason for the user to access the network forwarded by the distributed unit (the reason information may be included in the first request message, and may also be obtained by the distributed unit from the first request message). In this case, the message processing module 420 is further configured to determine the processing to be performed on the first request message based on the reason for the user to access the network forwarded by the distributed unit, and the reason for accepting the user to access the network by the distributed unit, which is included in the indication information.

The device 400 shown in FIG. 4 may also comprise a memory 440 for storing data used in the process of rejecting a user access. The data may include, for example, UE-associated information, such as user's identification information, and/or user's cell identification information, and/or user's RRC message, and the like. The UE-associated information may be deleted from memory 440 before (e.g., after it has determined to transmit a rejection message) or after the rejection message is transmitted to the distributed unit. The memory 440 may be implemented in any commonly used form in the art, and will not be described here.

FIG. 5 shows a schematic block diagram of a device 500 for network access corresponding to the method of FIG. 3. The device 500 shown in FIG. 5 includes a first message receiving module 510, a first message transmitting module 520, a second message receiving module 530, and a message processing module 550. According to various embodiments of the present disclosure, the device 500 may include a communication unit and at least one processor. The first message receiving module 510, the first message transmitting module 520, the second message receiving module 530, and the message processing module 550 may be included in the at least one processor. The first message receiving module 510 is configured to receive a first request message from the user equipment, the first request message requesting to connect the user equipment to the network. The first message transmitting module 520 is configured to forward the first request message and the indication information with respect to the first request message to the central unit. The second message receiving module 530 is configured to receive an indication of the processing to be performed on the first request message from the central unit. The message processing module 550 is configured to process the first request message based on the indication.

The indication of the processing to be performed on the first request message comprises an indication of one of: receiving and forwarding a connection setup message or a connection resume message or a connection reestablishment message; triggering an allocation of resources to the user equipment based on a user context setup procedure; and receiving and forwarding a rejection message with respect to the first request message.

For example, the second message receiving module 530 is further configured to receive a second request message for establishing a user context from the central unit after transmitting the first request message to the central unit. The message processing module 550 is configured to generate a response message indicating that the user context setup fails based on that the device 500 does not accept the request of connecting the user equipment to the network. The first message transmitting module 520 is further configured to transmit the response message to the central unit.

For example, the second message receiving module 530 is further configured to receive a permission message indicating that the user equipment is allowed to connect to the network from the central unit. The device 500 shown in FIG. 5 may also comprise a message determining module 560 for selecting one from the rejection message and the permission message to transmit to the user equipment based on whether the device 500 can connect the user equipment to the network.

For example, the indication information also includes the reason for accepting the user to access the network by the distributed unit. The first message transmitting module 520 is further configured to forward the reason for the user to access the network to the central unit (the reason information may be included in the first request message, and may also be obtained by the distributed unit from the first request message). The central unit determines the processing to be performed on the first request message based on the reason for the user to access the network forwarded by distributed unit, and the reason for accepting the user to access the network by the distributed unit, which is included in the indication information.

The apparatus shown in FIG. 5 may further include a second message transmitting module 540 for transmitting to the user a rejection message or other information received from the central unit.

Similar to the device shown in FIG. 4, the device 500 shown in FIG. 5 may also comprise a memory 570 for storing data used in the process of rejecting a user access. The data may include, for example, UE-associated information, such as user's identification information, and/or user's cell identification information, and/or user's RRC message, and the like. The UE-associated information may be deleted from memory 570 before (e.g., after it has determined to transmit a rejection message) or after transmitting a rejection message to the user equipment. The memory 570 may be implemented in any commonly used form in the art, and will not be described here.

With the above technical solution, it is possible for the central unit or the distributed unit to reject the user connection request.

Various implementation details according to embodiments of the present invention will be explained below with reference to FIGS. 6 to 15. It should be noted that the following description is made with the base station including a central unit and a distributed unit. The base station may be a base station (gNB) of the NR, a base station (eNB) of the LTE, or any other base station that includes a central unit and a distributed unit, or any device that can implement the function of a base station. In addition, the following messages are involved in the following description. However, the names of the messages are just examples, and any other name may be used:

connection rejection message (e.g., RRCConnectionReject)

connection reestablishment rejection message (e.g., RRCConnectionReestablishmentReject)

connection setup request message (e.g., RRCConnectionRequest)

connection resume request message (e.g., RRCConnectionResumeRequest)

connection reestablishment request message (e.g., RRCConnectionReestablishmentRequest)

connection setup message (e.g., RRCConnectionSetup)

connection resume message (e.g., RRCConnectionResume)

connection reestablishment message (e.g., RRCConnectionReestablishment)

In addition, the names of the messages mentioned below are just an example, and any other name may be used.

According to a specific situation, the user's connection request may be rejected due to a reason of the central unit, or the user's connection request may be rejected due to a reason of the distributed unit. In the following description, the technical solutions of the embodiments of the present invention will be specifically described for these two situations.

First case: The central unit rejects the user's connection setup request/connection resume request/connection reestablishment request In this case, the central unit may transmit a connection setup rejection message/connection reestablishment rejection message to the distributed unit. There are two ways to transmit the message:

Method 1: The central unit transmits a non-UE associated F1AP message to the distributed unit, such as Final DL RRC message transfer. FIG. 6 shows a schematic diagram of this situation. The message may include at least one of the following:

- an RRC message generated by the central unit, such as a connection rejection message or a connection reestablishment rejection message
- User's identification information, such as C-RNTI
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- Cell identification information, such as PCI (physical cell identity), NCI (NR cell identity), NCGI (NR Cell Global Identity), etc. The cell identity information is the identity of the cell where the user is located.

After receiving the above-mentioned non-UE-associated message, the distributed unit may consider that the RRC message (such as a connection rejection message or a connection reestablishment rejection message) contained in the message indicates to reject the user's connection request and transmit it to the user. Before or after transmitting the RRC message to the user, the UE-associated information, such as the user's identification information, and/or user's cell identification information, and/or user's RRC message, may be deleted.

Similarly, before or after transmitting the above-mentioned non-UE associated message to the distributed unit, the central unit may delete UEUE-associated information, such as user's identification information, and/or user's cell identification information, and/or user's RRC message, etc.

FIG. 7 shows a sequence diagram of a method of rejecting a user connection request in the situation shown in FIG. 6 according to an embodiment of the present invention. As shown in FIG. 7, the method comprises:

Step 1: The user transmits a connection setup request message/connection resume request message/connection reestablishment request message to the distributed unit;

Step 2: The distributed unit transmits a non-UE-associated F1AP message to the central unit, such as an Initial UL RRC message transfer. The message may include at least one of the following:
- a connection setup request message/connection resume request message/connection reestablishment request message received in step 1
- User's identification information, such as C-RNTI
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- Cell identification information, such as PCI (physical cell identity), NCI (NR cell identity), NCGI (NR Cell Global Identity), etc. The information indicates the cell in which the user transmits the message in step 1

Step 3: The central unit transmits a non-UE associated FAP message to the distributed unit, such as a Final DL RRC message transfer. The message may include at least one of the following:
- a connection rejection message or connection reestablishment rejection message generated by the central unit. For example, if the connection setup request message/connection resume request message is received, the message transmitted in step 3 is a connection rejection message, and if the connection reestablishment request message is received, the message transmitted in step 3 is a connection reestablishment rejection message;
- User's identification information, such as C-RNTI
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- Cell identification information, such as PCI (physical cell identity), NCI (NR cell identity), NCGI (NR Cell Global Identity), etc. The cell identity information is the same as the cell identity information received by the central unit Step 4: The distributed unit transmits the message received in step 3 (i.e., the connection rejection message or connection reestablishment rejection message) to the user.

In the above process, the central unit may release UE-associated information before or after step 3, such as user identification information (such as CU UE F1AP ID) allocated by the central unit to be used on the interface between the central unit and the distributed unit, and/or user identification information (such as DU UE F1AP ID) allocated by the distributed unit to be used on the interface between the central unit and the distributed unit, and/or the user's identity (such as C-RNTI), and/or the cell identity of the cell where the user is located, and/or UE-associated messages (such as connection setup request message/connection resume request message/connection reestablishment request message/connection rejection message/connection reestablishment rejection message, etc.). After step 3, the distributed unit may release UEUE-associated information before or after transmitting the connection rejection message/connection reestablishment rejection message to the user, such as user identification information (such as CU UE F1AP ID) allocated by the central unit to be used on the interface between the central unit and the distributed unit, and/or user identification information (such as DU UE F1AP ID) allocated by the distributed unit to be used on the interface between the central unit and the distributed unit, and/or the user's identity (such as C-RNTI), and/or the cell where the user is located, and/or UE-associated messages (such as a connection setup request message/connection resume request message/connection reestablishment request message/connection rejection message/connection reestablishment rejection message, etc.).

Method 2: The UE-associated message (e.g., UE-associated F1AP message) is transmitted to the user, such as DL RRC message transfer. FIG. 8 shows a schematic diagram of this situation. The message may include at least one of the following:
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- a connection rejection message or connection reestablishment rejection message generated by the central unit
- User's identification information, such as C-RNTI
- Cell identification information, such as PCI (physical cell identity), NCI (NR cell identity), NCGI (NR Cell Global Identity), etc. The cell identity information is the identity of the cell where the user is located
- Signaling Radio Bearer (SRB) configuration information (such as an identity of a signaling radio bearer, and/or configuration information of an RLC layer, and/or configuration information of a logical channel, and the like). The signaling radio bearer may be the first signaling radio bearer (SRB1 in TS36.331 or TS38.331)

After receiving the UE-associated message, the distributed unit transmits an RRC message (such as a connection rejection message or a connection reestablishment rejection message) included in the message to the user, and deletes the UE-associated information before or after transmitting the RRC message to the user, such as user identification information (e.g., CU UE F1AP ID) allocated by the central unit to be used on the interface between the central unit and the distributed unit, user identification information (e.g., DU UE F1AP ID) allocated by the distributed unit to be used on the interface between the central unit and the distributed unit, and/or user identification information (such as C-RNTI), and/or user's cell identification information, and/or user's RRC message, and/or signaling radio bearer configuration information, etc. The distributed unit may determine whether to delete the UE-associated information before or after transmitting the RRC message to the user according to the content in the above-mentioned UE-associated message. If the UE-associated message satisfies one of the following conditions, the distributed unit may determine that the UE-associated message includes a connection rejection message or a connection reestablishment rejection message:

Case 1: The UE-associated message does not include the user identification information, such as CU UE F1AP ID, allocated by the central unit to be used on the interface between the central unit and the distributed unit Case 2: The UE-associated message does not include the user identification information, such as DU UE F1AP ID, allocated by the distributed unit to be used on the interface between the central unit and the distributed unit Case 3: The UE-associated message does not include the signaling radio bearer configuration information Case 4: any combination of the above three conditions The distributed unit may delete the UE-associated information before or after transmitting the RRC message to the user.

The central unit may delete the UE-associated information before or after transmitting the above-mentioned UE-associated message to the distributed unit, such as user identification information (e.g., CU UE F1AP ID) allocated by the central unit to be used on the interface between the central unit and the distributed unit, user identification information (e.g., DU UE F1AP ID) allocated by the distributed unit to be used on the interface between the central unit and the distributed unit, and/or user identification information (such as C-RNTI), and/or user's cell identification information, and/or user's RRC message, and/or signaling radio bearer configuration information, etc.

FIG. 9 shows a sequence diagram of a method of rejecting a user connection request in the situation shown in FIG. 8 according to an embodiment of the present invention. As shown in FIG. 9, the method comprises:

Step 1: The user transmits a connection setup request message/connection resume request message/connection reestablishment request message to the distributed unit;

Step 2: The distributed unit transmits a non-UE-associated F1AP message to the central unit. The message may include at least one of the following:

a connection setup request message/connection resume request message/connection reestablishment request message received by the distributed unit User's identification information, such as C-RNTI User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit Cell identification information, such as PCI (physical cell identity), NCI (NR cell identity), NCGI (NR Cell Global Identity), etc. The information indicates the cell in which the user transmits the message in step 1

Step 3: The central unit transmits a non-UE associated FAP message to the distributed unit. The message may include at least one of the following:

User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit a connection rejection message or connection reestablishment rejection message generated by the central unit. For example, if the connection setup request message/connection resume request message is received, the message transmitted in step 3 is a connection rejection message, and if the connection reestablishment request message is received, the message transmitted in step 3 is a connection reestablishment rejection message;

User's identification information, such as C-RNTI

Cell identification information, such as PCI (physical cell identity), NCI (NR cell identity), NCGI (NR Cell Global Identity), etc. The cell identity information is the same as the cell identity information received by the central unit Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Step 4: The distributed unit transmits the message received by distributed unit (i.e., the connection rejection message or connection reestablishment rejection message) to the user.

In the above process, the central unit may release UE-associated information before or after step 3, such as user identification information (such as CU UE F1AP ID) allocated by the central unit to be used on the interface between the central unit and the distributed unit, and/or user identification information (such as DU UE F1AP ID) allocated by the distributed unit to be used on the interface between the central unit and the distributed unit, and/or the user's identity (such as C-RNTI), and/or the cell identity of the cell where the user is located, and/or UE-associated messages (such as connection setup request message/connection resume request message/connection reestablishment request message/connection rejection message/connection reestablishment rejection message, etc.). After receiving the UE-associated message in step 3, the distributed unit determines whether to release the UE-associated information according to the content in the UE-associated message. If it decides to release the message, the distributed unit may release the UE-associated information before or after transmitting the RRC message included in step 3 to the user, such as user identification information (such as CU UE F1AP ID) allocated by the central unit to be used on the interface between the central unit and the distributed unit, and/or user identification information (such as DU UE F1AP ID) allocated by the distributed unit to be used on the interface between the central unit and the distributed unit, and/or the user's identity (such as C-RNTI), and/or the cell where the user is located, and/or UE-associated messages (such as a connection setup request message/connection resume request message/connection reestablishment request message/connection rejection message/connection reestablishment rejection message, etc.), and/or Signaling Radio Bearer configuration information.

In some examples, the above-mentioned UE-associated message or non-UE-associated message may have no corresponding message fed back from the receiving node. Such messages are referred to as Class 2 messages in protocols such as TS 36.423, TS 38.423, TS 38.473. In other examples, there may also be feedback messages for UE-associated messages or non-UE-associated messages.

Second case: The distributed unit rejects the user's connection setup request/connection resume request/connection reestablishment request In this case, the user's connection setup request/connection resume request/connection reestablishment request may be rejected using one of the following three methods:

Method 1: transmitting a connection setup rejection/reconnection rejection after the user context setup fails FIG. 10 shows a schematic diagram of this situation. As shown in FIG. 10, the method defines non-UE-associated messages or UE-associated messages transmitted by the central unit to the distributed unit. If it is a non-UE-associated message (such as Final DL RRC message transfer), the content of the message, the transmission of the message, and the operation of the central unit and the distributed unit may refer to method 1 in the above first case. If it is a UE-associated message (such as DL RRC message transfer), the content of the message, the transmission of the message, and operations of the central unit and the distributed unit can refer to the method 2 in the first case above.

FIG. 11 shows a sequence diagram of a method of rejecting a user connection request in the situation shown in FIG. 10 according to an embodiment of the present invention. As shown in FIG. 11, the method comprises:

Step 1: The user transmits a connection setup request message/connection resume request message/connection reestablishment request message to the distributed unit;

Step 2: The distributed unit transmits a non-UE-associated F1AP message to the central unit. The message may include at least one of the following:

- a connection setup request message/connection resume request message/connection reestablishment request message received in step 1
- User's identification information, such as C-RNTI
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- Cell identification information, such as PCI (physical cell identity), NCI (NR cell identity), NCGI (NR Cell Global Identity), etc. The information indicates the cell in which the user transmits the message in step 1
- Information related to resource allocation of the distributed unit, which includes at least one of the following:
- Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331
- parameter configuration information related to MAC layer and physical layer The Information related to resource allocation of the distributed unit may be within an information element (such as radioResourceConfigDedicated in 36.331) or multiple information elements Step 3: The central unit transmits UE context setup request message to the distributed unit. The message may include at least one of the following:

- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- an RRC message generated by the central unit. For example, if the connection setup request message/connection resume request message is received in step 2, the message transmitted in step 3 is a connection rejection message, and if the connection reestablishment request message is received in step 2, the message transmitted in step 3 is a connection reestablishment rejection message;
- User's identification information, such as C-RNTI
- Cell identification information, such as PCI (physical cell identity), NCI (NR cell identity), NCGI (NR Cell Global Identity), etc. The cell identity information is the same as the cell identity information received by the central unit in step 2
- the reason for the user to establish a connection or resume the connection or reestablish the connection, such as the reason included in the connection setup request message transmitted by the user in step 1 (such as emergency, high priority Access (highpriorityAccess), data to be transmitted to the user (mt-data: mobile terminating data), user-initiated signaling (mo-signaling: mobile originating signaling), user-initiated data transmission (mo-data: mobile originating data), delay tolerable access (delayToTolerantAccess), user-initiated voice (mo-VoiceCall: mobile originating voice call), etc.), or reason included in the connection resume request message transmitted by the user in step 1 (such as emergency, high priority Access (highpriorityAccess), data to be transmitted to the user (mo-data: mobile originating data), user-initiated signaling (mo-signaling: mobile originating signaling), user-initiated data transmission (mo-data: mobile originating data), delay tolerable access (delayToTolerantAccess), user-initiated voice (mo-VoiceCall: mobile originating voice call), etc.), or the reason included in the connection reestablishment request message transmitted by the user in step 1 (such as reconfiguration failure (reconfigurationFailure), handover failure (handoverFailure), other failures (otherFailure), etc.). For the above reason information, please refer to TS36.331 and TS38.331.
- Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Step 4: The distributed unit transmits a user context setup failure message to the central unit. The message indicates that the distributed unit does not (cannot or is unwilling to) accept the user connection request. The message may include at least one of the following:

- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- User's identification information, such as C-RNTI
- Cell identification information, such as PCI (physical cell identity), NCI (NR cell identity), NCGI (NR Cell Global Identity), etc. The cell identity information is the same as the cell identity information received by the central unit in step 2
- indication message that indicates the distributed unit does not (cannot or is unwilling to) accept the user who transmits the message to the distributed unit in step 1, such as a rejection indication message, a congestion indication message, etc.
- Reasons of rejecting to establish user context, such as insufficient resources, resource congestion, etc.

Step 5: The central unit transmits a non-UE-associated message (such as a Final DL RRC message transmission message) or a UE-associated message (such as a DL RRC message transmission message) to the distributed unit. If a final DL RRC message transfer is transmitted, the content of the message, the transmission of the message, and operations of the central unit and the distributed unit may refer to the method 1 in the first case above, and the message includes a connection setup rejection message/connection reestablishment rejection message. If a DL RRC message transmission message is transmitted, the content of the message, the transmission of the message, and operations of the central unit and the distributed unit may refer to method 2 in the first case above, and the message includes a connection setup. rejection message/connection reestablishment rejection message;

Step 6: The distributed unit transmits the connection setup rejection message/connection reestablishment rejection message to the user The user context setup request message and the user context setup failure message in the above step 3 and step 4 are just examples, and may also be messages with different names. The messages with different names may be a message that does not need to be replied to by the receiving node (referred to as Class 2 Message in the protocol (e.g., TS36.423, TS38.423, TS38.473, etc.)), and may also be a message that needs to be relied to by the receiving node (referred to as Class 1 message in the protocol (e.g., TS36.423, TS38.423, TS38.473). For example, the above-mentioned user context setup request message is a Class1 message because it needs to receive a user context setup response message or a user context setup failure message fed back by the distributed unit. If the message in step 3 is a message that does not need to be replied to by the distributed unit, the message in step 4 may not be feedback on the message transmitted by the central unit, but may be any other message. Alternatively, if the message in step 3 is a message that needs to be replied to by the distributed unit, the distributed unit replies to the message received in step 3 in step 4.

In this embodiment, for the case that the context is established successfully, after step 3, if the distributed unit considers that the user context setup request of the central unit can be accepted, the distributed unit may transmit an RRC message (if a connection setup request message is received in step 2, a connection setup message is included in step 3; if a connection resume request message is received in step 2, includes: a connection resume message or connection setup message is included in step 3; if a connection reestablishment request message is received in step 2, a connection reestablishment message is included in step 3) included in the user context setup request to the user before feeding back a user context setup response message to the central unit, and then transmits the user context setup response message to the central unit.

Method 2: including a Connection Setup Rejection Message/Connection Reestablishment Rejection Message in a User context setup Request Message FIG. 12 shows a schematic diagram of this situation. The method defines a process for establishing the user context between the central unit and the distributed unit as follows:

Step 1: The central unit transmits a user context setup request message to the distributed unit. The message may include at least one of the following:

User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit an RRC message generated by the central unit, such as a connection setup message and/or a connection setup rejection message, a connection resume request message and/or a connection setup rejection message, a connection reestablishment message, and/or a connection reestablishment rejection message User's identification information, such as C-RNTI Cell identification information, such as PCI (physical cell identity), NCI (NR cell identity), NCGI (NR Cell Global Identity), etc. The cell identity information is the same as the cell identity information received by the central unit in its step 2

Signaling Radio Bearer (SRB) configuration information (such as an identity of a signaling radio bearer, and/or configuration information of an RLC layer, and/or configuration information of a logical channel, and the like). The signaling radio bearer may be SRB1 in TS36.331 or TS38.331

Step 2: The distributed unit transmits a user context setup failure message to the central unit. The message indicates that the distributed unit does not (cannot or is unwilling to) accept the user connection request. The message may include at least one of the following:

User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit User's identification information, such as C-RNTI Cell identification information, such as PCI (physical cell identity), NCI (NR cell identity), NCGI (NR Cell Global Identity), etc. The cell identity information is the same as the cell identity information received by the central unit in step 2 indication message that indicates the distributed unit does not (cannot or is unwilling to) accept the user who transmits the message to the distributed unit in step 1, such as a rejection indication message, a congestion indication message, etc.

Reasons of rejecting to establish user context, such as insufficient resources, resource congestion, etc.

The user context setup request message and the user context setup failure message in the above step 1 and step 2 are just examples, and may also be messages with different names. The messages with different names may be a message that does not need to be replied to by the receiving node (referred to as Class 2 Message in the protocol (e.g., TS36.423, TS38.423, TS38.473, etc.)), and may also be a message that needs to be relied to by the receiving node (referred to as Class 1 message in the protocol (e.g., TS36.423, TS38.423, TS38.473). If the message in step 1 is a message that does not need to be replied to by the distributed unit, the message in step 2 may not be feedback on the message transmitted by the central unit, but may be any other message. Alternatively, if the message in step 1 is a message that needs to be replied to by the distributed unit, the distributed unit replies to the message received in step 1 in step 2.

FIG. 13 shows a sequence diagram of a method of rejecting a user connection request in the situation shown in FIG. 12 according to an embodiment of the present invention. As shown in FIG. 13, the method comprises:

Step 1: The user transmits a connection setup request message/connection resume request message/connection reestablishment request message to the distributed unit;

Step 2: The distributed unit transmits a non-UE-associated F1AP message to the central unit. The message may include at least one of the following:
- a connection setup request message/connection resume request message/connection reestablishment request message received in step 1
- User's identification information, such as C-RNTI
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- Cell identification information, such as PCI (physical cell identity), NCI (NR cell identity), NCGI (NR Cell Global Identity), etc. The information indicates the cell in which the user transmits the message in step 1

Step 3: The central unit transmits UE context setup request message to the distributed unit. The message may include at least one of the following:
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- an RRC message generated by the central unit. If a connection setup request message is received in step 2, a connection setup message and/or a connection setup rejection message is included in step 3. If a connection resume request message is received in step 2, a connection resume message (or a connection setup message) and/or a connection setup rejection message is included in step 3. If a connection reestablishment request message is received in step 2, a connection reestablishment message and/or a connection reestablishment rejection message is included in step 3. Optionally, the type of the RRC message is indicated in the user context setup request message (e.g., a connection setup message, a connection setup rejection message, a connection resume message, a connection reestablishment message, a connection reestablishment rejection message, etc.)
- User's identification information, such as C-RNTI
- Cell identification information, such as PCI (physical cell identity), NCI (NR cell identity), NCGI (NR Cell Global Identity), etc. The cell identity information is the same as the cell identity information received by the central unit in step 2
- Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Step 4: If the distributed unit does not (cannot or is unwilling to) accept the user connection request, it transmits the connection setup rejection message or connection reestablishment rejection message received in step 3 to the user.

Step 5: The distributed unit transmits a user context setup failure message to the central unit. The message indicates that the distributed unit does not (cannot or is unwilling to) accept the user connection request. The message may include at least one of the following:
- User identification information, such as CU UE F1AP ID, allocated by the central unit to be used on the interface between the central unit and the distributed unit
- User identification information, such as DU UE F1AP ID, allocated by the distributed unit to be used on the interface between the central unit and the distributed unit
- indication message that indicates the distributed unit does not (cannot or is unwilling to) accept the user who transmits the message to the distributed unit, such as a rejection indication message, a congestion indication message, etc.
- User's identification information, such as C-RNTI
- Cell identification information, such as PCI (physical cell identity), NCI (NR cell identity), NCGI (NR Cell Global Identity), etc. The cell identity information is the same as the cell identity information received by the central unit in step 2
- reasons of rejecting to establish user context, such as insufficient resources, resource congestion, etc.

The user context setup request message and the user context setup failure message in the above step 3 and step 5 are just examples, and may also be messages with different names. The messages with different names may be a message that does not need to be replied to by the receiving node (referred to as Class 2 Message in the protocol (e.g., TS36.423, TS38.423, TS38.473, etc.)), and may also be a message that needs to be relied to by the receiving node (referred to as Class 1 message in the protocol (e.g., TS36.423, TS38.423, TS38.473). If the message in step 3 is a message that does not need to be replied to by the distributed unit, the message in step 5 may not be feedback on the message transmitted by the central unit, but may be any other message. Alternatively, if the message in step 3 is a message that needs to be replied to by the distributed unit, the distributed unit replies to the message received in step 3 in step 5.

Method 3: Rejecting to establish a user connection by transmitting a rejection indication message by the distributed unit FIG. 14 shows a schematic diagram of this situation. The method defines a method for transmitting an RRC message between a distributed unit and a central unit as follows:

Step 1: The distributed unit transmits a non-UE-associated message (such as an initial UL RRC message transfer) or a UE-associated message (such as a UL RRC message transfer) to the central unit. The message may include at least of the following:
- a connection setup request message/connection resume request message/connection reestablishment request message received from the user
- User's identification information, such as C-RNTI
- User identification information, such as CU UE F1AP ID, allocated by the central unit to be used on the interface between the central unit and the distributed unit
- User identification information, such as DU UE FAP ID, allocated by the distributed unit to be used on the interface between the central unit and the distributed unit
- Cell identification information, such as PCI (physical cell identity), NCI (NR cell identity), NCGI (NR Cell Global Identity), etc. The information indicates the cell in which the user transmits the message in step 1
- Information related to resource allocation of the distributed unit, which includes at least one of the following:
  Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331 parameter configuration information related to MAC layer and physical layer

The Information related to resource allocation of the distributed unit may be within an information element (such as radioResourceConfigDedicated in 36.331) or multiple information elements indication information about user access of the distributed unit. Using the indication information, the central unit may determine whether the distributed unit can accept the user or not. It may be one of the following forms:

Form 1: it indicates user access at the distributed unit by whether including the Information related to resource allocation of the distributed unit or not:

If the Information related to resource allocation of the distributed unit is included, it means that the distributed unit can accept the user access, or that the distributed unit can accept the user access due to some reasons, for example, the user access is caused due to the emergency, and/or highpriorityAccess, and/or mo-signaling: mobile originating signaling, or reasons that are predefined or default or indicated by indication information (the indication information indicates the reasons triggering the user access which can be accepted by the distributed unit), or the reasons may be one or more of the reasons included in any one or two or three of the connection setup request/connection resume request/ connection reestablishment request;

If the information related to the resource allocation of the distributed unit is not included, it means that the distributed unit does not accept the user access, or that the distributed unit does not accept the user access due to some reasons, for example, the user access is due to mt-Access or mo-data: mobile originating data or delayTolerantAccess or mo-VoiceCall: mobile originating voice call or reconfigurationFailure or handoverFailure or otherFailure, or reasons that are predefined or default or indicated by indication information (the indication information indicates the reasons triggering the user access which cannot be accepted by the distributed unit), or the reasons may be one or more of the reasons included in any one or two or three of the connection setup request/connection resume request/ connection reestablishment request.

Form 2: it indicates user access at the distributed unit by whether including the Information related to resource allocation of the distributed unit and the indication information of rejecting the user access (such as the rejection indication information and the congestion indication information) or not:

If the Information related to resource allocation of the distributed unit is included, it means that the distributed unit can accept the user access If the above information related to resource allocation of the distributed unit and the indication information of rejecting the user access are included, it means that the distributed unit can accept user access due to some reasons. The reasons may be predefined, or one or more of the reasons included in any one or two or three of the connection setup request/connection resume request/ connection reestablishment request message. For the above reasons, please refer to TS36.331 and TS38.331. For example, if the Information related to resource allocation of the distributed unit and the indication information of rejecting the user access are included, the distributed unit may accept the user access due to emergency, highpriorityaccess, and mo-signaling: mobile originating signaling, while not accept the user access which is caused by any other reason. There is another implementation where the indication information of rejecting the user access indicates the reason triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If neither the Information related to resource allocation of the distributed unit nor the indication information of rejecting the user access is included, it indicates that the distributed unit cannot accept the user access Form 3: It Indicates user access at the distributed unit by whether including the Information related to resource allocation of the distributed unit and the indication information of accepting the user access or not:

If the Information related to resource allocation of the distributed unit is included, it means that the distributed unit can accept the user access If the Information related to resource allocation of the distributed unit and the indication information of accepting the user access are included, it means that the distributed unit can accept the user access due to some reasons. The reasons may be predefined, or one or more of the reasons included in any one or two or three of the connection setup request/connection resume request/ connection reestablishment request message. For the above reasons, please refer to TS36.331 and TS38.331. For example, if the Information related to resource allocation of the distributed unit and the indication information of accepting the user access are included, the distributed unit may accept the user access due to emergency, highpriorityaccess, and mo-signaling: mobile originating signaling, while not accept the user access which is caused by any other reason. There is another implementation where the indication information of accepting the user access indicates the reasons triggering the UE access which can be accepted by the distributed unit. The central unit receives the connection setup request/connection resume request/connection reestablishment request message. If the reason included in the message is the reason indicated in the indication information of accepting the user access, it indicates that the distributed unit can accept the user. For example, the reasons included in the connection setup request/connection resume request/connection reestablishment request include: emergency, highPriorityAccess, mt-Access, mo-Signalling, mo-data:

mobile originating data, delayTolerantAccess, mo-VoiceCall: mobile originating voice call, reconfigurationFailure, handoverFailure, otherFailure. The indication information of accepting the user access indicates that the distributed unit can accept the user access if the reason for the user access is mt-Access or mo-data: mobile originating data or delayTolerantAccess or mo-VoiceCall: mobile originating voice call or reconfigurationFailure or handoverFailure or otherFailure. If neither the Information related to resource allocation of the distributed unit nor the indication information of accepting the user access is included, it indicates that the distributed unit cannot accept the user access Form 4: It indicates user access at the distributed unit by whether including the indication information of rejecting the user access or not:

If the indication information of rejecting the user access is included, it means that the distributed unit does not accept the user. There is another implementation where if the indication information of rejecting the user access is included, it means that the distributed unit cannot accept the user access due to some reasons (such as the reasons included in any one or two or three of the connection setup request/connection resume request/connection reestablishment request message) that are predefined. There is another implementation where the indication information of rejecting the user access indicates the reasons triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of rejecting the user access is not included, it indicates that the distributed unit can accept the user access Form 5: It indicates user access at the distributed unit by whether including the indication information of accepting the user access or not:

If the indication information of accepting the user access is included, it means that the distributed unit accepts the user. There is another implementation where if the indication information of accepting the user access is included, it means that the distributed unit may accept the user access due to some reasons (such as the reasons included in any one or two or three of the connection setup request/connection resume request/connection reestablishment request message) that are predefined. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit may accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of accepting the user access indicates that the distributed unit may accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of accepting the user access is not included, it indicates that the distributed unit cannot accept the user access Form 6: It indicates user access at the distributed unit by using whether or not the distributed unit allocates the user identification information (such as DU UE F1AP ID) being used on the interface between the central unit and the distributed unit:

If the user identification information is included, it means that the distributed unit accepts the user access If the user identification information is not included, it means that the distributed unit cannot accept the user access Step 2: The central unit transmits a non-UE-associated message (such as a Final DL RRC message transmission message) or a UE-associated message (such as a DL RRC message transmission message) to the distributed unit. If a final DL RRC message transfer is transmitted, the content of the message, the transmission of the message, and operations of the central unit and the distributed unit may refer to the method 1 in the first case above, and the message includes a connection setup rejection message/connection reestablishment rejection message. If a downlink RRC message transmission message is transmitted, the content of the message, the transmission of the message, and operations of the central unit and the distributed unit may refer to method 2 in the first case above, and the message includes a connection setup. rejection message/connection reestablishment rejection message;

The messages in step 1 and step 2 may be messages that do not need to be replied to by the receiving node, so step 1 and step 2 may be referred to as independent steps, i.e., step 1 may be an independent step as follows:

The distributed unit transmits a non-UE-associated message (such as an Initial UL RRC message transfer) or a UE-associated message (such as a UL RRC message transfer) to the central unit, and the message may include at least one of the following:

a connection setup request message/connection resume request message/connection reestablishment request message received from the user User's identification information, such as C-RNTI, and/or user identification information, such as CU UE F1AP ID, allocated by the central unit to be used on the interface between the central unit and the distributed unit, and/or user identification information, such as DU UE F1AP ID, allocated by the distributed unit to be used on the interface between the central unit and the distributed unit Cell identification information, such as PCI (physical cell identity), NCI (NR cell identity), NCGI (NR Cell Global Identity), etc. The information indicates the cell in which the user transmits the message in step 1

Information related to resource allocation of the distributed unit, which includes at least one of the following:

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331 parameter configuration information related to MAC layer and physical layer

The Information related to resource allocation of the distributed unit may be within an information element (such as radioResourceConfigDedicated in 36.331) or multiple information elements indication information about user access of the distributed unit. Using the indication information, the central unit may determine whether the distributed unit can accept the user or not. It may be one of the following forms:

Form 1: it indicates user access at the distributed unit by whether including the Information related to resource allocation of the distributed unit or not:

If the Information related to resource allocation of the distributed unit is included, it means that the distributed unit can accept the user access, or that the distributed unit can accept the user access due to some reasons, for example, the user access is caused due to the emergency, and/or highpriorityAccess, and/or mo-signaling, or reasons that are predefined or default or indicated by indication information (the indication information indicates the reasons triggering the user access which can be accepted by the distributed unit), or the reasons may be one or more of the reasons included in any one or two or three of the connection setup request/connection resume request/connection reestablishment request;

If the information related to the resource allocation of the distributed unit is not included, it means that the distributed unit does not accept the user access, or that the distributed unit does not accept the user access due to some reasons, for example, the user access is caused due to mt-Access or mo-data or delayTolerantAccess or mo-VoiceCall or reconfigurationFailure or handoverFailure or otherFailure, or reasons that are predefined or default or indicated by indication information (the indication information indicates the reasons triggering the user access which cannot be accepted by the distributed unit), or the reasons may be one or more of the reasons included in any one or two or three of the connection setup request/connection resume request/connection reestablishment request.

Form 2: it indicates user access at the distributed unit by whether including the Information related to resource allocation of the distributed unit and the indication information of rejecting the user access (such as the rejection indication information and the congestion indication information) or not:

If the Information related to resource allocation of the distributed unit is included, it means that the distributed unit can accept the user access If the above information related to resource allocation of the distributed unit and the indication information of rejecting the user access are included, it means that the distributed unit can accept user access due to some reasons. The reasons may be predefined, or one or more of the reasons included in any one or two or three of the connection setup request/connection resume request/connection reestablishment request message. For the above reasons, please refer to TS36.331 and TS38.331. For example, if the Information related to resource allocation of the distributed unit and the indication information of rejecting the user access are included, the distributed unit may accept the user access due to emergency, highpriorityaccess, and mo-signaling, while not accept the user access which is caused by any other reason. There is another implementation where the indication information of rejecting the user access indicates the reasons triggering the user access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data, delayTolerantAccess, mo-VoiceCall, reconfigurationFailure, handoverFailure, otherFailure. The indication information of rejecting the user access indicates that the distributed unit cannot accept the user access if the reason for the user access is mt-Access or mo-data or delayTolerantAccess or mo-VoiceCall or reconfigurationFailure or handoverFailure or otherFailure.

If neither the Information related to resource allocation of the distributed unit nor the indication information of rejecting the user access is included, it indicates that the distributed unit cannot accept the user access Form 3: It Indicates user access at the distributed unit by whether including the Information related to resource allocation of the distributed unit and the indication information of accepting the user access or not:

If the Information related to resource allocation of the distributed unit is included, it means that the distributed unit can accept the user access If the Information related to resource allocation of the distributed unit and the indication information of accepting the user access are included, it means that the distributed unit can accept the user access due to some reasons. The reasons may be predefined, or one or more of the reasons included in any one or two or three of the connection setup request/connection resume request/connection reestablishment request message. For the above reasons, please refer to TS36.331 and TS38.331. For example, if the Information related to resource allocation of the distributed unit and the indication information of accepting the user access are included, the distributed unit may accept the user access due to emergency, highpriorityaccess, and mo-signaling, while not accept the user access which is caused by any other reason. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit can accept the user. For example, the reasons included in the connection setup request/connection resume request/connection reestablishment request include: emergency, highPriorityAccess, mt-Access, mo-Signalling, mo-data, delayTolerantAccess, mo-VoiceCall, reconfigurationFailure, handoverFailure, otherFailure. The indication information of accepting the user access indicates that the distributed unit can accept the user access if the reason for the user access is mt-Access or mo-data or delayTolerantAccess or mo-VoiceCall or reconfigurationFailure or handoverFailure or otherFailure. If neither the Information related to resource allocation of the distributed unit nor the indication information of accepting the user access is included, it indicates that the distributed unit cannot accept the user access Form 4: It indicates user access at the distributed unit by whether including the indication information of rejecting the user access or not:

If the indication information of rejecting the user access is included, it means that the distributed unit does not accept the user. There is another implementation where if the indication information of rejecting the user access is included, it means that the distributed unit cannot accept the user access due to some reasons (such as the reasons included in any one or two or three of the connection setup request/connection resume request/connection reestablishment request message) that are predefined. There is another implementation where the indication information of rejecting the user access indicates the reasons triggering the user access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data, delayTolerantAccess, mo-VoiceCall, reconfigurationFailure, handoverFailure, otherFailure. The indication information of rejecting the user access indicates that the distributed unit cannot accept the user access if the reason for the user access is mt-Access or mo-data or delayTolerantAccess or mo-VoiceCall or reconfigurationFailure or handoverFailure or otherFailure.

If the indication information of rejecting the user access is not included, it indicates that the distributed unit can accept the user access Form 5: It indicates user access at the distributed unit by whether including the indication information of accepting the user access or not:

If the indication information of accepting the user access is included, it means that the distributed unit accepts the user. There is another implementation where if the indication information of accepting the user access is included, it means that the distributed unit may accept the user access due to some reasons (such as the reasons included in any one or two or three of the connection setup request/connection resume request/connection reestablishment request message) that are predefined. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit may accept the user. For example, the reasons included in the connection setup request/connection resume request/connection reestablishment request include: emergency, highPriorityAccess, mt-Access, mo-Signalling, mo-data, delayTolerantAccess, mo-VoiceCall, reconfigurationFailure, handoverFailure, otherFailure. The indication information of accepting the user access indicates that the distributed unit may accept the user access if the reason for the user access is mt-Access or mo-data or delayTolerantAccess or mo-VoiceCall or reconfigurationFailure or handoverFailure or otherFailure.

If the indication information of accepting the user access is not included, it indicates that the distributed unit cannot accept the user access Form 6: It indicates user access at the distributed unit by using whether or not the distributed unit allocates the user identification information (such as DU UE F1AP ID) being used on the interface between the central unit and the distributed unit:

If the user identification information is included, it means that the distributed unit accepts the user access If the user identification information is not included, it means that the distributed unit cannot accept the user access After the central unit receives the above message, the central unit determines that the distributed unit does not (cannot or is unwilling to) accept the user access. The subsequent operation of the central unit may be to generate a connection setup rejection message/connection reestablishment rejection message and transmit it to the distributed unit.

Similarly, step 2 may be an independent step as follows:

The central unit transmits a non-UE-associated message (such as a Final DL RRC message transmission message) or a UE-associated message (such as a DL RRC message transmission message) to the distributed unit. If a final DL RRC message transfer is transmitted, the content of the message, the transmission of the message, and operations of the central unit and the distributed unit may refer to the method 1 in the first case above, and the message includes a connection setup rejection message/connection reestablishment rejection message. If a DL RRC message transmission message is transmitted, the content of the message, the transmission of the message, and operations of the central unit and the distributed unit may refer to method 2 in the first case above, and the message includes a connection setup. rejection message/connection reestablishment rejection message;

FIG. 15 shows a sequence diagram of a method of rejecting a user connection request in the situation shown in FIG. 14 according to an embodiment of the present invention. As shown in FIG. 15, the method comprises:

Step 1: The user transmits a connection setup request message/connection resume request message/connection reestablishment request message to the distributed unit;

Step 2: The distributed unit transmits a non-UE-associated message (such as Initial UL RRC message transfer) or a UE-associated message (such as UL RRC message transfer) to the central unit, and the message may include at least one of the following:

a connection setup request message/connection resume request message/connection reestablishment request message received from the user User's identification information, such as C-RNTI, and/or user identification information, such as CU UE F1AP ID, allocated by the central unit to be used on the interface between the central unit and the distributed unit, and/or user identification information, such as DU UE F1AP ID, allocated by the distributed unit to be used on the interface between the central unit and the distributed unit Cell identification information, such as PCI (physical cell identity), NCI (NR cell identity), NCGI (NR Cell Global Identity), etc. The information indicates the cell in which the user transmits the message in step 1

Information related to resource allocation of the distributed unit, which includes at least one of the following:

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331 parameter configuration information related to MAC layer and physical layer

The Information related to resource allocation of the distributed unit may be within an information element (such as radioResourceConfigDedicated in 36.331) or multiple information elements indication information about user access of the distributed unit. Using the indication information, the central unit may determine whether the distributed unit can accept the user or not. It may be one of the following forms:

Form 1: it indicates user access at the distributed unit by whether including the Information related to resource allocation of the distributed unit or not:

If the Information related to resource allocation of the distributed unit is included, it means that the distributed unit can accept the user access, or that the distributed unit can accept the user access due to some reasons, for example, the user access is caused due to the emergency, and/or highpriorityAccess, and/or mo-signaling: mobile originating signaling, or reasons that are predefined or default or indicated by indication information (the indication information indicates the reasons triggering the user access which can be accepted by the distributed unit), or the reasons may be one or more of the reasons included in any one or two or three of the connection setup request/connection resume request/connection reestablishment request;

If the information related to the resource allocation of the distributed unit is not included, it means that the distributed unit does not accept the user access, or that the distributed unit does not accept the user access due to some reasons, for example, the user access is caused due to mt-Access or mo-data (mobile originating data) or delayTolerantAccess or mo-VoiceCall (mobile originating voice call) or reconfigurationFailure or handoverFailure or otherFailure, or reasons that are predefined or default or indicated by indication information (the indication information indicates the reasons triggering the user access which cannot be accepted by the distributed unit), or the reasons may be one or more of the reasons included in any one or two or three of the connection setup request/connection resume request/connection reestablishment request.

Form 2: it indicates user access at the distributed unit by whether including the Information related to resource allocation of the distributed unit and the indication information of rejecting the user access (such as the rejection indication information and the congestion indication information) or not:

If the Information related to resource allocation of the distributed unit is included, it means that the distributed unit can accept the user access If the above information related to resource allocation of the distributed unit and the indication information of rejecting the user access are included, it means that the distributed unit can accept user access due to some reasons. The reasons may be predefined, or one or more of the reasons included in any one or two or three of the connection setup request/connection resume request/connection reestablishment request message. For the above reasons, please refer to TS36.331 and TS38.331. For example, if the Information related to resource allocation of the distributed unit and the indication information of rejecting the user access are included, the distributed unit may accept the user access due to emergency, highpriorityaccess, and mo-signaling (mobile originating signaling), while not accept the user access which is caused by any other reason. There is another implementation where the indication information of rejecting the user access indicates the reasons triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If neither the Information related to resource allocation of the distributed unit nor the indication information of rejecting the user access is included, it indicates that the distributed unit cannot accept the user access Form 3: It Indicates user access at the distributed unit by whether including the Information related to resource allocation of the distributed unit and the indication information of accepting the user access or not:

If the Information related to resource allocation of the distributed unit is included, it means that the distributed unit can accept the user access If the Information related to resource allocation of the distributed unit and the indication information of accepting the user access are included, it means that the distributed unit can accept the user access due to some reasons. The reasons may be predefined, or one or more of the reasons included in any one or two or three of the connection setup request/connection resume request/ connection reestablishment request message. For the above reasons, please refer to TS36.331 and TS38.331. For example, if the Information related to resource allocation of the distributed unit and the indication information of accepting the user access are included, the distributed unit may accept the user access due to emergency, highpriorityaccess, and mo-signaling: mobile originating signaling, while not accept the user access which is caused by any other reason. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit can accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of accepting the user access indicates that the distributed unit can accept the user access if the reason for the user access is mt-Access or mo-data: mobile originating data or delayTolerantAccess or mo-VoiceCall: mobile originating voice call or reconfigurationFailure or handoverFailure or otherFailure. If neither the Information related to resource allocation of the distributed unit nor the indication information of accepting the user access is included, it indicates that the distributed unit cannot accept the user access Form 4: It indicates user access at the distributed unit by whether including the indication information of rejecting the user access or not:

If the indication information of rejecting the user access is included, it means that the distributed unit does not accept the user. There is another implementation where if the indication information of rejecting the user access is included, it means that the distributed unit cannot accept the user access due to some reasons (such as the reasons included in any one or two or three of the connection setup request/connection resume request/ connection reestablishment request message) that are predefined. There is another implementation where the indication information of rejecting the user access indicates the reasons triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of rejecting the user access is not included, it indicates that the distributed unit can accept the user access Form 5: It indicates user access at the distributed unit by whether including the indication information of accepting the user access or not:

If the indication information of accepting the user access is included, it means that the distributed unit accepts the user. There is another implementation where if the indication information of accepting the user access is included, it means that the distributed unit may accept the user access due to some reasons (such as the reasons included in any one or two or three of the connection setup request/connection resume request/connection reestablishment request message) that are predefined. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit may accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of accepting the user access indicates that the distributed unit may accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of accepting the user access is not included, it indicates that the distributed unit cannot accept the user access Form 6: It indicates user access at the distributed unit by using whether or not the distributed unit allocates the user identification information (such as DU UE F1AP ID) being used on the interface between the central unit and the distributed unit:

If the user identification information is included, it means that the distributed unit accepts the user access If the user identification information is not included, it means that the distributed unit cannot accept the user access Step 3: The central unit transmits a Final DL RRC message transmission message or a DL RRC message transmission message to the distributed unit. If a final DL RRC message transfer is transmitted, the content of the message, the transmission of the message, and operations of the central unit and the distributed unit may refer to the method 1 in the first case above, and the message includes a connection setup rejection message/connection reestablishment rejection message. If a DL RRC message transmission message is transmitted, the content of the message, the transmission of the message, and operations of the central unit and the distributed unit may refer to method 2 in the first case above, and the message includes a connection setup. rejection message/connection reestablishment rejection message;

Step 4: The distributed unit transmits the received connection setup rejection message/connection reestablishment rejection message to the user It should be noted that, unless explicitly stated or determined by the inherent logic of the steps, the order of the steps shown in any of FIGS. 6 to 15 need not necessarily be performed in the order shown, but any other suitable order may be used. For example, the order of steps 4 and 5 shown in FIG. 13 may be exchanged, or the two steps may be performed in parallel.

In one embodiment, the difference between the non-UE-associated messages (such as the final DL RRC message transmission message) and the UE-associated messages (the DL RRC message transmission message) is that the UE-associated message includes one or two of the following:

User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit If the UE-associated message includes one of the foregoing information, the non-UE-associated message does not include the foregoing information, and if the UE-associated message includes two of the foregoing information, the non-UE-associated message may include one of the foregoing information.

A specific example of processing the user's request to access the network based on the indication information about user access of the distributed unit will be described in detail below.

Embodiment A

Based on the above description (Case 1 and Case 2), a distributed unit may be specified to transmit non-UE-associated messages (such as Initial UL RRC message transfer) or UE-associated messages (such as UL RRC message transfer) to the central unit. As shown in FIG. 16A, the message may include at least one of the following:

identification information of the user that transmits a connection setup request message/connection resume request message/connection reestablishment request message to the distributed unit, such as C-RNTI, and/or user identification information, such as CU UE F1AP ID, allocated by the central unit to be used on the interface between the central unit and the distributed unit, and/or user identification information, such as DU UE FAP ID, allocated by the distributed unit to be used on the interface between the central unit and the distributed unit Cell identification information, such as PCI (physical cell identity), NCI (NR cell identity), NCGI (NR Cell Global Identity), etc. The information indicates the cell in which the user transmits the message to the distributed unit Information related to resource allocation of the distributed unit, which includes at least one of the following:

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331 parameter configuration information related to MAC layer and physical layer

The Information related to resource allocation of the distributed unit may be within an information element (such as radioResourceConfigDedicated in 36.331) or multiple information elements indication information about user access of the distributed unit. Using the indication information, the central unit may determine whether the distributed unit can accept the user or not. It may be one of the following forms:

Form 1: it indicates user access at the distributed unit by whether including the Information related to resource allocation of the distributed unit or not:

If the Information related to resource allocation of the distributed unit is included, it means that the distributed unit can accept the user access, or that the distributed unit can accept the user access due to some reasons, for example, the user access is caused due to the emergency, and/or highpriorityAccess, and/or mo-signaling: mobile originating signaling, or reasons that are predefined or default or indicated by indication information (the indication information indicates the reasons triggering the user access which can be accepted by the distributed unit), or the reasons may be one or more of the reasons included in any one or two or three of the connection setup request/connection resume request/connection reestablishment request;

If the information related to the resource allocation of the distributed unit is not included, it means that the distributed unit does not accept the user access, or that the distributed unit does not accept the user access due to some reasons, for example, the user access is caused due to mt-Access or mo-data: mobile originating data or delayTolerantAccess or mo-VoiceCall: mobile originating voice call or reconfigurationFailure or handoverFailure or otherFailure, or reasons that are predefined or default or indicated by indication information (the indication information indicates the reasons triggering the user access which cannot be accepted by the distributed unit), or the reasons may be one or more of the reasons included in any one or two or three of the connection setup request/connection resume request/connection reestablishment request.

Form 2: it indicates user access at the distributed unit by whether including the Information related to resource allocation of the distributed unit and the indication information of rejecting the user access (such as the rejection indication information and the congestion indication information) or not:

If the Information related to resource allocation of the distributed unit is included, it means that the distributed unit can accept the user access If the above information related to resource allocation of the distributed unit and the indication information of rejecting the user access are included, it means that the distributed unit can accept user access due to some reasons. The reasons may be predefined, or one or more of the reasons included in any one or two or three of the connection setup request/connection resume request/connection reestablishment request message. For the above reasons, please refer to TS36.331 and TS38.331. For example, if the Information related to resource allocation of the distributed unit and the indication information of rejecting the user access are included, the distributed unit may accept the user access due to emergency, highpriorityaccess, and mo-signaling: mobile originating signaling, while not accept the user access which is caused by any other reason. There is another implementation where the indication information of rejecting the user access indicates the reasons triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If neither the Information related to resource allocation of the distributed unit nor the indication information of rejecting the user access is included, it indicates that the distributed unit cannot accept the user access Form 3: It Indicates user access at the distributed unit by whether including the Information related to resource allocation of the distributed unit and the indication information of accepting the user access or not:

If the Information related to resource allocation of the distributed unit is included, it means that the distributed unit can accept the user access If the Information related to resource allocation of the distributed unit and the indication information of accepting the user access are included, it means that the distributed unit can accept the user access due to some reasons. The reasons may be predefined, or one or more of the reasons included in any one or two or three of the connection setup request/connection resume request/connection reestablishment request message. For the above reasons, please refer to TS36.331 and TS38.331. For example, if the Information related to resource allocation of the distributed unit and the indication information of accepting the user access are included, the distributed unit may accept the user access due to emergency, highpriorityaccess, and mo-signaling: mobile originating signaling, while not accept the user access which is caused by any other reason. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit can accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of accepting the user access indicates that the distributed unit can accept the user access if the reason for the user access is mt-Access or mo-data: mobile originating data or delayTolerantAccess or mo-VoiceCall: mobile originating voice call or reconfigurationFailure or handoverFailure or otherFailure.

If neither the Information related to resource allocation of the distributed unit nor the indication information of accepting the user access is included, it indicates that the distributed unit cannot accept the user access Form 4: It indicates user access at the distributed unit by whether including the indication information of rejecting the user access or not:

If the indication information of rejecting the user access is included, it means that the distributed unit does not accept the user. There is another implementation where if the indication information of rejecting the user access is included, it means that the distributed unit cannot accept the user access due to some reasons (such as the reasons included in any one or two or three of the connection setup request/connection resume request/ connection reestablishment request message) that are predefined. There is another implementation where the indication information of rejecting the user access indicates the reasons triggering the UE access which can be rejected by the distributed unit. The central unit receives the connection setup request/connection resume request/connection reestablishment request message. If the reason included in the message is the reason indicated in the indication information of rejecting the user access, it indicates that the distributed unit cannot accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of rejecting the user access indicates that the distributed unit cannot accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of rejecting the user access is not included, it indicates that the distributed unit can accept the user access Form 5: It indicates user access at the distributed unit by whether including the indication information of accepting the user access or not:

If the indication information of accepting the user access is included, it means that the distributed unit accepts the user. There is another implementation where if the indication information of accepting the user access is included, it means that the distributed unit may accept the user access due to some reasons (such as the reasons included in any one or two or three of the connection setup request/connection resume request/connection reestablishment request message) that are predefined. There is another implementation where the indication information of accepting the user access indicates the reasons triggering the user access which can be accepted by the distributed unit. The central unit receives the connection setup request/connection resume request/connection reestablishment request message. If the reason included in the message is the reason indicated in the indication information of accepting the user access, it indicates that the distributed unit may accept the user. For example, the reasons included in the connection setup request/connection resume request/connection reestablishment request include: emergency, highPriorityAccess, mt-Access, mo-Signalling, mo-data: mobile originating data, delayTolerantAccess, mo-VoiceCall: mobile originating voice call, reconfigurationFailure, handoverFailure, otherFailure. The indication information of accepting the user access indicates that the distributed unit may accept the user access if the reason for the user access is mt-Access or mo-data: mobile originating data or delayTolerantAccess or mo-VoiceCall: mobile originating voice call or reconfigurationFailure or handoverFailure or otherFailure.

If the indication information of accepting the user access is not included, it indicates that the distributed unit cannot accept the user access Form 6: It indicates whether user access at the distributed unit by using whether or not the distributed unit allocates the user identification information (such as DU UE F1AP ID) being used on the interface between the central unit and the distributed unit:

If the user identification information is included, it means that the distributed unit accepts the user access If the user identification information is not included, it means that the distributed unit cannot accept the user access The message may be step 2 of FIG. 7, or step 2 of FIG. 9, or step 2 of FIG. 11, or step 2 of FIG. 13, or the message transmitted by the distributed unit to the central unit in step 2 of FIG. 15.

After receiving the above message, the central unit determines the next action based on the content of the message. Possible actions include:

Action 1: it generates a connection setup message or a connection resume message or a connection reestablishment message and transmits it to the distributed unit;

Action 2: It initiates a user context setup procedure to trigger an allocation of resources to the user equipment by the distributed unit Action 3: It generates a connection rejection or connection reestablishment rejection message and transmits it to the distributed unit.

Based on the information transmitted by the distributed unit to the central unit, as shown in FIG. 16B, the process for the user to establish a connection is as follows Step 1: The user transmits a connection setup request message to the distributed unit Step 2: The distributed unit transmits an initial UL RRC message to the central unit. The information included in the message is as described in Embodiment A.

In Case of Successful Connection Setup:

Step 3a: The central unit determines that it can accept the user access according to the information received in step 2, and transmits a DL RRC message transmission message to the distributed unit, which includes at least the connection setup message.

Step 4a: The distributed unit transmits the received connection setup message to the user Step 5: The user transmits a connection setup completion message to the distributed unit Step 6: The distributed unit transmits a UL RRC message transmission message to the central unit. The message includes at least the connection setup completion message received in step 5.

In Case of Failed Connection Setup:

Step 3b: The central unit determines that it does not accept the user access according to the information received in step 2, and transmits a DL RRC message transmission message to the distributed unit, which includes at least a connection rejection message.

Step 4b: The distributed unit transmits the received connection rejection message to the user.

Based on the information transmitted by the distributed unit to the central unit, as shown in FIG. 16C, the process for the user to resume the connection is as follows:

Step 1: The user transmits a connection resume request message to the distributed unit Step 2: The distributed unit transmits an initial UL RRC message to the central unit. The information included in the message is as described in Embodiment A.

In Case of Successful Connection Resume:

Step 3a: The central unit successfully obtains the context of the user, and the central unit determines that it can accept the user access according to the information received in step 2. If it determines that the central unit needs to further configure the data bearer of the user according to the context of the user, it transmits a user context setup request message to the distributed unit, which includes at least one of the following:

The reason contained in the connection resume request message in step 1 information related data bearer, such as bearer identification, bearer QoS related information, etc.

Step 4a: The distributed unit feeds back a user context setup response message to the central unit to indicate the resource allocation information of the distributed unit, which includes at least one of the following:

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Data Radio Bearer configuration information, such as an identity of a data radio bearer, and/or configuration information of an RLC layer, and/or configuration information of a logical channel, and the like.

data radio bearer information accepted by the distributed unit, such as an identity of the data radio bearer parameter configuration information related to MAC layer and physical layer Step 5a: The central unit transmits a DL RRC message transmission message to the distributed unit, which includes at least a connection resume message Step 6a: The distributed unit transmits the received connection resume message to the user Step 7: The user transmits a connection resume completion message to the distributed unit Step 8: The distributed unit transmits a UL RRC message transmission message to the central unit, which includes at least the connection resume completion message received in step 7.

In Case of Successful Connection Setup:

Step 3b: The central unit fails to obtain the context of the user, but determines that it accepts the user access according to the information received in step 2, and transmits a DL RRC message transmission message to the distributed unit, which includes at least a connection setup message.

Step 4b: The distributed unit transmits the received connection setup message to the user Step 5b: The user transmits a connection setup completion message to the distributed unit Step 6b: The distributed unit transmits a UL RRC message transmission message to the central unit. The message includes at least the connection setup completion message received in step 5b.

In Case of Failed Connection Setup:

Step 3c: The central unit determines not to accept the user access according to the information received in step 2, and transmits a DL RRC message transmission message to the distributed unit, which includes at least a connection rejection message.

Step 4c: The distributed unit transmits the received connection rejection message to the user.

Based on the information transmitted by the distributed unit to the central unit, as shown in FIG. 16D, the process for the user to reestablish the connection is as follows:

Step 1: The user transmits a connection reestablishment request message to the distributed unit Step 2: The distributed unit transmits an initial UL RRC message to the central unit. The information included in the message is as described in Embodiment A.

In Case of Successful Connection Reestablishment 1:

Step 3a: Both the central unit and the distributed unit have user contexts, and determine that the user access can be accepted according to the information received in step 2. A DL RRC message transmission message is transmitted to the distributed unit. The message includes at least one of the following:
- a connection reestablishment message
- information for obtaining the user context, such as the old user identification information (for example, old gNB-DU UE F1AP ID) used by the user on the interface between the central unit and the distributed unit at the distributed unit side, and the old user identification information (such as old gNB-CU UE F1AP ID) used by the user on the interface between the central unit and the distributed unit at the central unit side, the identity information of the cell (such as PCI, NCI, and NCGI) where the user located before the reestablishment, and the identification information used by the user before reestablishment (such as C-RNTI), other information (such as shortMAC-I, refer to TS36.331, TS38.331)
- indication information of updating the resource allocation information of the distributed unit:
- The indication information may indicate to update the resource allocation information of the distributed unit in step 2 (referred to as first resource allocation information) to the resource allocation information of the distributed unit about the user, which is stored in the user context found in the distributed unit (referred to as second resource allocation information); or
- the indication information may indicate to update the resource allocation information of the distributed unit about the user, which is stored in the user context found in the distributed unit (referred to as second resource allocation information) to the resource allocation information of the distributed unit included in step 2 (referred to as first resource allocation information)

The above-mentioned first resource allocation information or second resource allocation information includes at least one of the following:

- Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331
- Data Radio Bearer configuration information, such as an identity of a data radio bearer, and/or configuration information of an RLC layer, and/or configuration information of a logical channel, and the like.
- parameter configuration information related to MAC layer and physical layer The above information update only updates the common information in both the first resource allocation information and the second resource allocation information, and does not update the information that is not common in both the first and second resource allocation information.

The above-mentioned update indication information may be explicit, that is, the information may be represented by an information element, or may be implicit. For example, it is default or predefined that the first resource allocation information is updated to the second resource allocation information, or the second resource allocation information is updated to the first resource allocation information Step 4a: The distributed unit transmits the received connection reestablishment message to the user Step 5a: The user transmits a connection reestablishment completion message to the distributed unit Step 6a: The distributed unit transmits a UL RRC message transmission message to the central unit, which includes at least the connection reestablishment completion message received in step 5a.

In Case of Successful Connection Reestablishment 2:

Step 3b: Only the central unit has the user context, and the central unit determines that the user access can be accepted according to the information received in step 2. If it determines that the central unit needs to further configure the data bearer of the user according to the context of the user, it transmits a user context setup request message to the distributed unit, which includes at least one of the following:
- the reason included in the connection reestablishment request message in step 1
- information related data bearer, such as bearer identification, bearer QoS related information, etc.

Step 4b: The distributed unit feeds back a user context setup response message to the central unit, which optionally includes the resource allocation information of the distributed unit, and which includes at least one of the following:
- Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331
- Data Radio Bearer configuration information, such as an identity of a data radio bearer, and/or configuration information of an RLC layer, and/or configuration information of a logical channel, and the like.
- parameter configuration information related to MAC layer and physical layer
- data radio bearer information accepted by the distributed unit, such as an identity of the data radio bearer Step 5b: The central unit transmits a DL RRC message transmission message to the distributed unit, which includes at least a connection reestablishment message Step 6b: The distributed unit transmits the received connection reestablishment message to the user Step 7b: The user transmits a connection reestablishment completion message to the distributed unit Step 8b: The distributed unit transmits a UL RRC message transmission message to the central unit, which includes at least the connection reestablishment completion message received in step 7b.

In Case of Failed Connection Setup:

Step 3c: The central unit has no context of the user, or it determines that the user access cannot be accepted according to the information received in step 2, and transmits a DL RRC message transmission message to the distributed unit, which includes at least a connection reestablishment rejection message.

Step 4c: The distributed unit transmits the received connection reestablishment rejection message to the user.

In the above embodiment, the central unit may determine whether to start the user context setup procedure (see the defined three actions) based on non-UE-associated messages (such as Initial UL RRC message transfer) or UE-associated messages (such as UL RRC message transfer) transmitted by the distributed unit, which can effectively reduce the user's access delay and reduce the signaling overhead between the distributed unit and the central unit.

A specific example of the processing in the case where an access reason is included in the user access request will be described in detail below.

Embodiment B

According to the above description, a process of establishing a user context between the distributed unit and the central unit is defined, as shown in FIG. 16E, which includes the following steps:

Step 1: The central unit transmits a user context setup request message to the distributed unit. The message includes at least one of the following:

User identification information, such as CU UE F1AP ID, allocated by the central unit to be used on the interface between the central unit and the distributed unit User identification information, such as DU UE F1AP ID, allocated by the distributed unit to be used on the interface between the central unit and the distributed unit an RRC message generated by the central unit, such as a connection setup message and/or a connection rejection message, or a connection resume message (or a connection setup message) and/or a connection rejection message User's identification information, such as C-RNTI Cell identification information, such as PCI (physical cell identity), NCI (NR cell identity), NCGI (NR Cell Global Identity), etc. The cell identity information is the identity of the cell where the user is located.

information related data bearer, such as bearer identification, bearer QoS related information, etc.

The reason(s) for the user to establish a connection or resume the connection or reestablish the connection. The reasons refers to those included in the connection setup request message/connection resume request message/connection reestablishment request message (the message is transmitted to the distributed unit and forwarded by the distributed unit to the central unit) transmitted by the user, such as the reason included in the connection setup request message (such as emergency, high priority Access (highpriorityAccess), data to be transmitted to the user (mo-data), user-initiated signaling (mo-signaling), user-initiated data transmission (mo-data), delay tolerable access (delayToTolerantAccess), user-initiated voice (mo-VoiceCall), etc.), or the reason included in the connection resume request message (such as emergency, high priority Access (highpriorityAccess), data to be transmitted to the user (mo-data), user-initiated signaling (mo-signaling), user-initiated data transmission (mo-data), delay tolerable access (delayToTolerantAccess), user-initiated voice (mo-VoiceCall), etc.), or the reason included in the connection reestablishment request message (such as reconfiguration failure (reconfigurationFailure), handover failure (handoverFailure), other failures (otherFailure), etc.). For the above reasons, please refer to TS36.331 and TS38.331.

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Successful Setup:

Step 2a: If the distributed unit can successfully establish the user context, the distributed unit feeds back to the central unit a corresponding user context setup message. The message may optionally include the following information:

Distributed unit resource allocation information, which includes at least one of the following:

Signaling Radio Bearer configuration information, such as an identity of a signaling radio bearer, and/or configuration information of an RLC layer, and/or configuration information of a logical channel, and the like. The signaling radio bearer may be SRB1 in TS36.331 or TS38.331

Data Radio Bearer configuration information, such as an identity of a data radio bearer, and/or configuration information of an RLC layer, and/or configuration information of a logical channel, and the like.

parameter configuration information related to MAC layer and physical layer data radio bearer information accepted by the distributed unit, such as an identity of the data radio bearer Failed Setup:

Step 2b: If the distributed unit cannot establish the user context, the distributed unit feeds back a user context setup failure message to the central unit The following procedure can be applied to step 3 and step 4 of FIG. 11, or step 4 and step 5 of FIG. 13, and can also be applied to the flow shown in FIG. 16F:

Step 1: The user transmits a connection setup request or connection resume request or connection reestablishment request message to the distributed unit Step 2: The distributed unit transmits an initial UL RRC message to the central unit. The content of the message is as described in Embodiment A.

Successful Situation:

Step 3a: The central unit transmits a user context setup request message to the distributed unit. The content included in the message is as described in step 1 of Embodiment B.

Step 4a: The distributed unit transmits a user context setup response message to the central unit. The content of the message is as described in step 2a of Embodiment B.

Step 5a: The central unit transmits a connection setup or connection resume or connection reestablishment message to the distributed unit.

Step 6a: The distributed unit transmits a connection setup or connection resume or connection reestablishment message to the user.

Step 7: The user transmits a connection setup completion or connection resume completion or connection reestablishment completion message to the distributed unit.

Step 8: The distributed unit transmits a UL RRC message transmission message to the central unit, which includes at least the connection setup completion or connection resume completion or connection reestablishment completion message received in step 7.

Failed Situation:

Step 3b: The central unit transmits a user context setup request message to the distributed unit. The content included in the message is as described in step 1 of Embodiment B.

Step 4b: The distributed unit transmits a user context setup failure message to the central unit. The content included in the message is as described in step 2b of Embodiment B.

Step 5b: The central unit transmits a DL RRC message transmission message to the distributed unit, which includes at least a connection setup failure or connection reestablishment failure message.

Step 6b: The distributed unit transmits the connection setup failure or connection reconfiguration failure message received in step 5b to the user.

In the above solution, user access requests are handled based on the user's intention to access the network (for example, some services are more urgent services, while some services are related to signaling transmissions, and such services do not require high bandwidth, and users of such services can be allowed to access in the case of a limited capacity of the distributed unit), which can help the distributed unit to effectively perform user access control.

The inventors of the present invention further found that in the prior art, if a user is simultaneously connected to two base stations, the two base stations may interact with each other some user context information, i.e., such as RLC mode (AM Mode or UM mode), UL configuration information (used to indicate whether the user's uplink is directed to a base station or two base stations), information related to QoS parameters, etc, for each radio bearer context. The RLC mode information may help the receiving base station set the RLC mode. The UL configuration information may help the receiving base station decide whether to schedule the user's uplink. The information related to the QoS parameter may help the receiving base station decide what QoS parameters need to be accepted. However, there is no agreed method for the transmission of the information on the F1 interface. In addition, in order to obtain radio link state information, the prior art support the distributed unit to send radio link outage/resume information to the concentrating unit, and the information can make the concentrating unit decide whether to place a radio bearer on another distributed unit to send. The information, however, is not enough to provide the central unit with separate uplink and downlink conditions.

For a radio bearer, the prior art does not discuss interaction of context information between the central unit and the distributed unit, such as RLC mode information, UL configuration information, and QoS-related information. After the distributed unit obtains the information, it can help the distributed unit determine the RLC mode, whether to schedule the user's uplink, and what QoS parameters need to be accepted. At the same time, the prior art also does not consider to have the distributed unit report the uplink state and the downlink state to the central unit, and after the uplink and the downlink are distinguished, it can help the central unit decide whether to schedule the user's uplink on the distributed unit.

In order to solve some of the above problems, a technical solution according to an embodiment of the present invention is proposed. It should be noted that the following technical solutions may be implemented in combination with the technical solutions described in FIG. 2-FIG. 15 or implemented independently.

FIG. 17 shows a schematic flow chart of a method for context interaction according to an embodiment of the present disclosure.

As shown in FIG. 17, the method includes an operation S1710 of receiving, by a first device, a first message from a second device, wherein the first message includes context information related to a radio bearer to be used by the user.

In some examples, the context information may include at least one of the following: Radio Link Control (RLC) mode information, uplink configuration information, and information related to Quality of Service (QoS). However, depending on the specific situation, the context information may also include other information, such as radio bearer identification of the radio bearer involved, the type of the radio bearer, the indication information for reporting the RLC mode, the indication information for reporting the UL configuration information, and the like.

In operation S1720, the first device sends a second message to the second device, wherein the second message includes feedback on the context information included in the first message.

Based on whether the first device is a distributed unit or a central unit of a base station, the feedback may be different. For example, when the first device is a distributed unit of a base station, the feedback may be an acceptance of context information by the distributed unit. However, when the first device is a central unit of the base station, the feedback may be a confirmation of the context information by the central unit. Of course, other types of feedback that are easily conceived by those skilled in the art based on embodiments of the present disclosure are also possible and are within the scope of embodiments of the present disclosure.

In some examples, the first device may be a distributed unit of a base station, and the second device may be a central unit of the base station. That is, the context interaction is initiated by the central unit. In this case, the involved radio bearer may be a radio bearer to be newly created or a radio bearer to be modified. The method shown in FIG. 17 may also comprise at least one of the following:

reporting, by the first device, wireless link state related information to the second device;

receiving, by the first device, radio link configuration related information from the second device;

sending, by the first device, wireless link state related information to another base station;

receiving, by the first device, radio link configuration related information from another base station;

sending, by the first device, wireless link state related information to another base station through the second device;

receiving, by the first device, radio link configuration related information from another base station through the second device.

In some examples, the radio link state related information may include uplink outage or resume indication information and/or downlink outage or resume indication information.

In some examples, the radio link configuration related information may include indication information of using uplink resources and/or downlink resources of the first device.

In some examples, the method shown in FIG. 17 may also comprise at least one of the following:
  receiving, by the first device, a request for reporting radio link state related information from the second device;
  receiving, by the first device, a request for reporting radio link state related information from another base station;
  receiving, by the first device, a request for reporting radio link state related information sent from another base station and forwarded by the second device.

In some examples, the first device is a central unit of a base station, and the second device is a distributed unit of the base station. In such case, the radio bearer is a radio bearer to be modified.

In some examples, the method may further comprise: sending, by the first device, a fifth message to another base station, wherein the fifth message includes context information related to a radio bearer served by the base station.

In some examples, the method shown in FIG. 17 may further comprise at least one of the following:
  receiving, by the first device, wireless link state related information reported by the second device;
  sending, by the first device, wireless link configuration related information to the second device;
  forwarding, by the first device, the radio link state related information sent from the second device to another base station;
  forwarding, by the first device, the radio link configuration related information sent from another base station to the second device.

In some examples, the radio link state related information may include uplink outage or resume indication information and/or downlink outage or resume indication information.

In some examples, the radio link configuration related information may include indication information of using uplink resources and/or downlink resources of the second device.

In some examples, the method shown in FIG. 17 may further comprise at least one of the following:
  sending, by the first device, a request for reporting wireless link state related information to the second device;
  forwarding, by the first device, a request for reporting radio link state related information sent from another base station to the second device.

In some examples, the context information includes at least one of the following:
  radio bearer type information;
  Radio Link Control (RLC) mode information;
  indication information for reporting RLC mode;
  uplink configuration information;
  indication information for reporting uplink configuration information;
  information related to Quality of Service (QoS).

FIG. 18 shows a schematic flow chart of another method for context interaction according to an embodiment of the present disclosure. The method shown in FIG. 18 and the method shown in FIG. 17 are corresponding methods performed on the opposite sides.

As shown in FIG. 18, the method includes operation S1810 of sending, by a second device, a first message to a first device. The first message includes context information related to the radio bearer to be used by a user.

In some examples, the context information may include at least one of the following: Radio Link Control (RLC) mode information, uplink configuration information, and information related to Quality of Service (QoS). However, depending on the specific situation, the context information may also include other information, such as radio bearer identification of the radio bearer involved, the type of the radio bearer, the indication information for reporting the RLC mode, the indication information for reporting the UL configuration information, and the like.

In operation S1820, the second device receives a second message from the first device, wherein the second message includes feedback on the context information included in the first message.

Based on whether the first device is a distributed unit or a central unit of a base station, the feedback may be different. For example, when the first device is a distributed unit of a base station, the feedback may be an acceptance of context information by the distributed unit. However, when the first device is a central unit of the base station, the feedback may be a confirmation of the context information by the central unit. Of course, other types of feedback that are easily conceived by those skilled in the art based on embodiments of the present disclosure are also possible and are within the scope of embodiments of the present disclosure.

In some examples, the first device is a distributed unit of a base station, and the second device is a central unit of the base station. The radio bearer is a radio bearer to be newly created or a radio bearer to be modified.

In some examples, the method shown in FIG. 18 may further comprise: receiving, by the second device, a third message from another base station, wherein the third message includes context information provided by the other base station for a radio bearer served by the base station; and/or sending, by the second device, a fourth message to another station, wherein the fourth message containing context information related to the radio bearer served by the base station.

In some examples, the context information may include at least one of the following:
  radio bearer type information;
  Radio Link Control (RLC) mode information;
  indication information for reporting RLC mode;
  uplink configuration information;
  indication information for reporting uplink configuration information;
  information related to Quality of Service (QoS).

FIG. 19 shows a schematic block diagram of an example of a device for context interaction according to an embodiment of the present disclosure.

As shown in FIG. 19, the device includes a third message receiving module 1910 and a third message sending module 1920.

The third message receiving module 1910 is configured to receive a first message from a second device, wherein the first message includes context information related to a radio bearer to be used by a user.

In some examples, the context information may include at least one of the following: Radio Link Control (RLC) mode information, uplink configuration information, and information related to Quality of Service (QoS). However, depending on the specific situation, the context information may also include other information, such as radio bearer identification of the radio bearer involved, the type of the radio bearer, the indication information for reporting the RLC mode, the indication information for reporting the UL configuration information, and the like.

The third message sending module 1920 is configured to send a second message to the second device, wherein the second message includes feedback on the context information included in the first message.

Based on whether the first device is a distributed unit or a central unit of a base station, the feedback may be different. For example, when the first device is a first device of a base station, the feedback may be an acceptance of context information by the distributed unit. However, when the first device is a central unit of the base station, the feedback may be a confirmation of the context information by the central unit. Of course, other types of feedback that are easily conceived by those skilled in the art based on embodiments of the present disclosure are also possible and are within the scope of embodiments of the present disclosure.

FIG. 20 shows a schematic block diagram of another example of a device for context interaction according to an embodiment of the present disclosure.

As shown in FIG. 20, the device includes a third message receiving module 2010 and a third message sending module 2020.

The third message sending module 2020 is configured to send a first message to the first device, wherein the first message includes context information related to a radio bearer to be used by a user.

In some examples, the context information may include at least one of the following: Radio Link Control (RLC) mode information, uplink configuration information, and information related to Quality of Service (QoS). However, depending on the specific situation, the context information may also include other information, such as radio bearer identification of the radio bearer involved, the type of the radio bearer, the indication information for reporting the RLC mode, the indication information for reporting the UL configuration information, and the like.

The third message receiving module 2010 is configured to receive a second message from the first device, wherein the second message includes feedback on the context information included in the first message.

Based on whether the first device is a distributed unit or a central unit of a base station, the feedback may be different. For example, when the first device is a distributed unit of a base station, the feedback may be an acceptance of context information by the distributed unit. However, when the first device is a central unit of the base station, the feedback may be a confirmation of the context information by the central unit. Of course, other types of feedback that are easily conceived by those skilled in the art based on embodiments of the present disclosure are also possible and are within the scope of embodiments of the present disclosure.

In addition to the above-described structure, the device shown in FIG. 19 or FIG. 20 may also have other more modules based on whether the first device is a distributed unit or a central unit.

FIG. 21 shows a schematic block diagram of a central unit for context interaction according to an embodiment of the present disclosure. The third message receiving module 2110 and the third message sending module 2120 shown in FIG. 21 may have similar functions with the third message receiving module 1910 and the third message sending module 1920 shown in FIG. 19 and the third message receiving module 2010 and the third message sending module 2020 shown in FIG. 20, which will not be described here.

The device shown in FIG. 21 may further include a fourth message sending module 2130 configured to send a message to another base station; and a fourth message receiving module 2140 configured to receive a message from the other base station.

The context interaction according to embodiments of the present disclosure may be initiated by a central unit, and may also be initiated by a distributed unit.

In the case that it is initiated by a central unit, the involved radio bearer may be a radio bearer to be newly created or a radio bearer to be modified.

In some examples, the third message sending module 2120 is configured to send a request for reporting wireless link state related information to the distributed unit; and/or the fourth message receiving module 2140 is configured to receive a request for reporting wireless link state related information sent by another base station, and/or in some examples (e.g., without the information at the central unit), the request is forwarded by the third message sending module 2120 to the distributed unit.

In the case that it is initiated by the central unit, the involved radio bearer may be a radio bearer to be modified.

In some examples, the fourth message sending module 2130 is configured to send a fifth message to another base station, wherein the fifth message includes context information related to the radio bearer served by the base station.

In some examples, the third message receiving module 2110 is configured to receive wireless link state related information reported by the distributed unit; and/or the third message sending module 2120 is configured to send wireless link configuration related information to the distributed unit; and/or the fourth message sending module 2130 is configured to forward the radio link state related information sent by the distributed unit to another base station; and/or the third message sending module 2120 is configured to forward the radio link configuration related information sent by another base station to the distributed unit.

In some examples, the radio link state related information includes uplink outage or resume indication information and/or downlink outage or resume indication information.

In some examples, the radio link configuration related information includes indication information of using uplink resources and/or downlink resources of the distributed unit.

The apparatus shown in FIG. 21 may further include a memory 2150 for storing data that needs to be used in or generated from an operation of the above-mentioned modules. The memory 2150 may be implemented by any technology used in the field or used in the future, which will not be described herein.

The device shown in FIG. 21 may further include a module/component for generating feedback on the context information included in the first message, and the feedback may be generated in any manner, which will not be described herein.

FIG. 22 shows a schematic block diagram of a distributed unit for context interaction according to an embodiment of the present disclosure. The third message receiving module 2210 and the third message sending module 2220 shown in FIG. 22 may have similar functions with the third message receiving module 1910 and the third message sending module 1920 shown in FIG. 19 and the third message receiving module 2010 and the third message sending module 2020 shown in FIG. 20, and will not be described here.

The apparatus shown in FIG. 22 may further include a fourth message sending module 2230 configured to send a message to another base station; and a fourth message receiving module 2240 configured to receive a message from another base station.

The context interaction according to the embodiment of the present disclosure may be initiated by a central unit, and may also be initiated by a distributed unit.

In the case that it is initiated by the central unit, the involved radio bearer may be a radio bearer to be newly created or a radio bearer to be modified.

In some examples, the third message sending module 2220 is configured to report wireless link state related information to the central unit; and/or the third message receiving module 2210 is configured to receive wireless link configuration related information from the central unit; and/or the fourth message sending module 2230 is configured to send wireless link state related information to another base station; and/or fourth message receiving module 2240 is configured to receive wireless link configuration related information from another base station; and/or third message sending module 2220 is configured to send wireless link state related information to another base station through a central unit; and/or the third message receiving module 2210 is configured to receive wireless link configuration related information from another base station through the central unit.

In some examples, the third message receiving module 2210 is configured to receive a request for reporting radio link state related information sent by the central unit; and/or the fourth message receiving module 2240 is configured to receive a request for reporting radio link state related information sent by another base station; and/or the third message receiving module 2210 is configured to receive a request for reporting radio link state related information sent from another base station and forwarded by the central unit.

In the case that it is initiated by the central unit, the involved radio bearer may be a radio bearer to be modified.

In some examples, the fourth message sending module 2230 may be configured to send a fifth message to another base station, wherein the fifth message includes context information related to the radio bearer served by the base station.

In some examples, the radio link state related information includes uplink outage or resume indication information and/or downlink outage or resume indication information.

In some examples, the radio link configuration related information includes indication information of using uplink resources and/or downlink resources of the distributed unit.

The apparatus shown in FIG. 22 may further include a memory 2250 for storing data that needs to be used in or generated from an operation of the above-mentioned modules. The memory 2250 may be implemented by any technology used in the field or used in the future, which will not be described herein.

The device shown in FIG. 22 may further include a module/component for generating feedback on the context information included in the first message, and the feedback may be generated in any manner, which will not be described herein.

The technical solutions shown in the foregoing FIG. 17 to FIG. 20 will be described in detail below based on specific embodiments. It should be noted that the following details are only examples provided to explain the technical solutions of the embodiments of the present disclosure, and those skilled in the art can make any modifications within the protection scope of the present invention.

As described above, the context interaction process according to the embodiment of the present invention may be initiated by a central unit or initiated by a distributed unit. These two situations will be described separately in the following first.

Process 1: Process of radio bearer establishment and modification initiated by the central unit FIG. 23 shows a flowchart of a flow of context interaction initiated by a central unit according to an embodiment of the present disclosure. The flow chart shown in FIG. 23 comprises the following:

Step 1: The central unit sends Message 1 to the distributed unit. Message 1 at least includes one of the following information:

information of a radio bearer that is newly created (such as data radio bearer, signaling radio bearer), which includes at least one of the following:

radio bearer identification radio bearer type information, which indicates the location of each protocol layer that serves the radio bearer. The type information includes at least one of the following:

Information 1: Type information of cell groups served by the distributed unit, such as a master cell group (MCG) or a secondary cell group (SCG)

Information 2: Location information of the PDCP that serves the radio bearer, such as in the central unit, or in another base station (or the other base station's central unit)

Information 3: Location information of RLC, MAC, and logical channels that serve the radio bearer, such as only in the distributed unit, or only in another base station (or the other base station's distributed unit), or in the distributed unit and in another base station at the same time (or the other base station's distributed unit)

In another embodiment, the radio bearer type information may be indication information that can represent any one or two or a combination of the above three pieces of information.

RLC mode information, which indicates whether the RLC layer uses an Acknowledged Mode (AM) or an Unacknowledged Mode (UM) when the distributed unit serves the radio bearer. In one embodiment, the central unit receives the RLC mode information from other base station. The central unit sends the received RLC mode information to the distributed unit. In another embodiment, the central unit does not receive the RLC mode information from other base station, and the central unit indicates an RLC mode to be used when the distributed unit serves the radio bearer.

indication information on whether the distributed unit reports an RLC mode. In one embodiment, the indication information is explicit information, and when the distributed unit receives the indication information, it reports the RLC mode information (that is, the AM mode or the UM mode) for the radio bearer to the central unit in step 2. In another embodiment, the indication information is implicitly obtained through the radio bearer type information. For example, the PDCP of the bearer is in a central unit, and the RLC, MAC, and logical channels that serve the radio bearer are in the distributed unit and another base station (or other distributed units), the distributed unit reports the RLC mode information (that is, the AM mode or the UM mode) for the radio bearer to the central unit in step 2. In another example, if the RLC, MAC, and logical channels that serve the radio bearer are in the distributed unit and another base station (or other distributed units), the RLC mode information (that is, AM mode or UM mode) for the radio bearer is reported to the central unit in step 2. In another embodiment, it determines whether to report the RLC mode of the radio bearer in step 2 depending on whether the RLC mode information of the radio bearer is received in step 1. That is, if there is no RLC mode information received in step 1, it is reported in step 2. In another embodiment, it determines whether to report the indication information of the radio bearer in step 2 based on the radio bearer type information and whether the RLC mode information of the radio bearer is received in step 1. For example, if the RLC, MAC, and logical channels that serve the radio bearer are in the distributed unit and another base station (or other distributed units), and there is no RLC mode information received in step 1, the distributed unit reports the RLC mode of the radio bearer.

UL configuration information, which indicates whether the distributed unit will be used to serve the user's uplink. In one embodiment, the information is used to indicate how the user uses the uplink of the distributed unit for the radio bearer, for example to use or not to use; or indicate whether the distributed unit schedules the user's uplink for the radio bearer, for example to schedule or not to schedule. In another embodiment, the information is used to indicate how the user uses the distributed unit's uplink for the radio bearer, for example to use, or not to use, or to use and the user also uses another base station's uplink (or other distributed unit's uplink); or indicate whether the distributed unit schedules the user's uplink for the radio bearer, for example to schedule, or not to schedule, or to co-schedule with another base station (or other distributed units). One way to set the information is to determine the UL configuration information based on information obtained from another base station. In another way, the central unit sets the information itself.

indication information on whether the distributed unit reports UL configuration information. In one embodiment, the indication information is explicit information, and when the distributed unit receives the indication information, it reports the UL configuration information for the radio bearer to the central unit in step 2. In another embodiment, the indication information is implicitly obtained through the radio bearer type information. For example, the PDCP of the bearer is in a central unit, and the RLC, MAC, and logical channels that serve the radio bearer are in the distributed unit and another base station (or other distributed units), the distributed unit reports the UL configuration information for the radio bearer to the central unit in step 2. In another example, if the RLC, MAC, and logical channels that serve the radio bearer are in the distributed unit and another base station (or other distributed units), the UL configuration information for the radio bearer is reported to the central unit in step 2. In another embodiment, it determines whether to report the UL configuration information of the radio bearer in step 2 depending on whether the UL configuration information of the radio bearer is received in step 1. That is, if there is no UL configuration information received in step 1, it is reported in step 2. In another embodiment, it determines whether to report the indication information based on the radio bearer type information and whether the UL configuration information of the radio bearer is received in step 1. For example, if the RLC, MAC, and logical channels that serve the radio bearer are in the distributed unit and another base station (or other distributed units), and there is no UL configuration information received in step 1, the distributed unit reports the UL configuration information of the radio bearer in step 2.

information related to a QoS parameter expected to be accepted. In one embodiment, the information indicates the maximum QoS parameter of the bearer that is accepted by another base station. In another embodiment, the information indicates the minimal QoS parameter of the bearer that is required to be accepted by the distributed unit.

information of a radio bearer to be modified (such as data radio bearer and signaling radio bearer), which includes at least one of the following:

radio bearer identification radio bearer type information. The type information may indicate the location of each protocol layer that serves the radio bearer. The type information includes at least one of the following:
  Information 1: Type information of cell groups served by the distributed unit, such as a MCG or a SCG
  Information 2: Location information of the PDCP that serves the radio bearer, such as in the central unit, or in another base station (or the other base station's central unit)
  Information 3: Location information of RLC, MAC, and logical channels that serve the radio bearer, such as only in the distributed unit, or only in another base station (or the other base station's distributed unit), or in the distributed unit and in another base station at the same time (or the other base station's distributed unit)

In another embodiment, the radio bearer type information may be indication information that can represent any one or two or a combination of the above three pieces of information.

RLC mode information, which indicates whether the RLC layer uses an Acknowledged Mode (AM) or an Unacknowledged Mode (UM) when the distributed unit serves the radio bearer. In one embodiment, the central unit receives the RLC mode information from another base station. The central unit sends the received RLC mode information to the distributed unit. In another embodiment, the central unit does not receive the RLC mode information from another base station, and the central unit indicates an RLC mode to be used when the distributed unit serves the radio bearer.

indication information on whether the distributed unit reports an RLC mode. In one embodiment, the indication information is explicit information, and when the distributed unit receives the indication information, it reports the RLC mode information (that is, the AM mode or the UM mode) for the radio bearer to the central unit in step 2. In another embodiment, the indication information is implicitly obtained through the radio bearer type information. For example, the PDCP of the bearer is in a central unit, and the RLC, MAC, and logical channels that serve the radio bearer are in the distributed unit and another base station (or other distributed units), the distributed unit reports the RLC mode information (that is, the AM mode or the UM mode) for the radio bearer to the central unit in step 2. In another example, if the RLC, MAC, and logical channels that serve the radio bearer are in the distributed unit and another base station (or other distributed units), the RLC mode information (that is, AM mode or UM mode) for the radio bearer is reported to the central unit in step 2. In another embodiment, it determines whether to report the RLC mode of the radio bearer in step 2 depending on whether the RLC mode information of the radio bearer is received in step 1. That is, if there is no RLC mode information received in step 1, it is reported in step 2. In another embodiment, it determines whether to report the indication information of the radio bearer in step 2 based on the radio bearer type information and whether the RLC mode information of the radio bearer is received in step 1. For example, if the RLC, MAC, and logical channels that serve the radio bearer are in the distributed unit and another base station (or other distributed units), and there is no RLC mode information received in step 1, the distributed unit reports the RLC mode of the radio bearer.

UL configuration information, which indicates whether the distributed unit will be used to serve the user's uplink. In one embodiment, the information is used to indicate how the user uses the uplink of the distributed unit for the radio bearer, for example to use or not to use; or indicate whether the distributed unit schedules the user's uplink for the radio bearer, for example to schedule or not to schedule. In another embodiment, the information is used to indicate how the user uses the distributed unit's uplink for the radio bearer, for example to use, or not to use, or to use and the user also uses another base station's uplink (or other distributed unit's uplink); or indicate whether the distributed unit schedules the user's uplink for the radio bearer, for example to schedule, or not to schedule, or to co-schedule with another base station (or other distributed units). One way to set the information is to determine the UL configuration information based on information obtained from another base station. In another way, the central unit sets the information itself.

indication information on whether the distributed unit reports UL configuration information. In one embodiment, the indication information is explicit information, and when the distributed unit receives the indication information, it reports the UL configuration information for the radio bearer to the central unit in step 2. In another embodiment, the indication information is implicitly obtained through the radio bearer type information. For example, the PDCP of the bearer is in a central unit, and the RLC, MAC, and logical channels that serve the radio bearer are in the distributed unit and another base station (or other distributed units), the distributed unit reports the UL configuration information for the radio bearer to the central unit in step 2. In another example, if the RLC, MAC, and logical channels that serve the radio bearer are in the distributed unit and another base station (or other distributed units), the UL configuration information for the radio bearer is reported to the central unit in step 2. In another embodiment, it determines whether to report the UL configuration information of the radio bearer in step 2 depending on whether the UL configuration information of the radio bearer is received in step 1. That is, if there is no UL configuration information received in step 1, it is reported in step 2. In another embodiment, it determines whether to report the indication information based on the radio bearer type information and whether the UL configuration information of the radio bearer is received in step 1. For example, if the RLC, MAC, and logical channels that serve the radio bearer are in the distributed unit and another base station (or other distributed units), and there is no UL configuration information received in step 1, the distributed unit reports the UL configuration information of the radio bearer in step 2.

information related to QoS parameters expected to be accepted. In one embodiment, the information indicates the maximum QoS parameter of the bearer that is accepted by another base station. In another embodiment, the information indicates the minimal QoS parameter of the bearer that is required to be accepted by the distributed unit.

Step 2: The distributed unit sends Message 2 to the central unit. Message 2 includes at least one of the following:

information of accepting a newly created radio bearer (such as data radio bearer, signaling radio bearer), which includes at least one of the following:

radio bearer identification

RLC mode information, which indicates the RLC layer adopts an AM mode or a UM mode when the distributed unit serves the bearer. In an embodiment, the distributed unit always reports RLC mode information of the radio bearer that is served. In another embodiment, if there is no RLC mode information received in step 1, the distributed unit reports RLC mode information of the radio bearer that is served. In another embodiment, if it is specified that the distributed unit needs to report the RLC mode information of the radio bearer in step 1, the distributed unit reports the RLC mode information.

UL configuration information, whose content is as described above. In an embodiment, the distributed unit always reports UL configuration information of the radio bearer. In another embodiment, if there is no UL configuration information received in step 1, the distributed unit reports UL configuration information of the radio bearer. In another embodiment, if it is specified that the distributed unit needs to report the UL configuration information of the radio bearer in step 1, the distributed unit reports the UL configuration information.

information related to a QoS parameter requested to be accepted, which indicates the QoS parameter that another base station is requested to accept for the radio bearer, or indicates the QoS parameter that the distributed unit has accepted for the radio bearer. In one embodiment, if "information related to a QoS parameter requested to be accepted" for the radio bearer is included in step 1, the information for the radio bearer is include in step 2.

information of accepting a modified radio bearer (such as data radio bearer, signaling radio bearer), which includes at least one of the following:

radio bearer identification

RLC mode information, which indicates the RLC layer adopts an AM mode or a UM mode when the distributed unit serves the bearer. Whether to include the information depends on whether or not the information has changed. If there is a change, it may need to be included; otherwise it does not need to be included. In an embodiment, if the RLC mode of the radio bearer changes, the distributed unit always reports the RLC mode information of the radio bearer. In another embodiment, if the RLC mode information is not received in step 1, and if the RLC mode of the radio bearer changes, the distributed unit reports the RLC mode information of the radio bearer. In another embodiment, if the information before step 1 or in step 1 specifies that the distributed unit needs to report the RLC mode of the radio bearer, and the RLC mode of the radio bearer changes, the distributed unit reports the RLC mode information.

UL configuration information, whose content is as described above. Whether to include the information depends on whether or not the information has changed. If there is a change, it may need to be included; otherwise it does not need to be included. In an embodiment, if the UL configuration of the radio bearer changes, the distributed unit always reports the UL configuration information of the radio bearer. In another embodiment, if the UL configuration information is not received in step 1, and if the UL configuration of the radio bearer changes, the distributed unit reports the UL configuration information of the radio bearer. In another embodiment, if the information before step 1 or in step 1 specifies that the distributed unit needs to report the UL configuration information of the radio bearer, and the UL configuration information of the radio bearer changes, the distributed unit reports the UL configuration information.

information related to a QoS parameter requested to be accepted, which indicates the QoS parameter that another base station is requested to accept for the radio bearer, or indicates the QoS parameter that the distributed unit has accepted for the radio bearer. In one embodiment, if "information related to a QoS parameter requested to be accepted" for the radio bearer is included in step 1, the information for the radio bearer is include in step 2.

The above two steps may be conducted through a process of user context management between the central unit and the distributed unit. Message 1 and Message 2 may be UE Context Setup Request message and UE Context Setup Response message, or UE Context Modification Request message and UE Context Modification Response Message respectively. They can also be other messages.

Optionally, before step 1, there may also be step 0 of receiving a message 0 from another base station, where the message 0 includes at least one of the following information related to the radio bearer:

information of a radio bearer that is newly created (such as data radio bearer, signalling radio bearer), which includes at least one of the following:
radio bearer identification
RLC mode information
UL configuration information
information related to a QoS parameter expected to be accepted
information of a radio bearer to be modified (such as data radio bearer and signaling radio bearer), which includes at least one of the following:
radio bearer identification
RLC mode information
UL configuration information
information related to a QoS parameter expected to be accepted Optionally, after step 2, there may also be step 3 of sending Message 3 to another base station. Message 3 includes at least one of the following information related to the radio bearer:

information of a newly created radio bearer (such as data radio bearer, signaling radio bearer) that has been accepted, which includes at least one of the following:
radio bearer identification
RLC mode information
UL configuration information
information related to a QoS parameter requested to be accepted
information of a modified radio bearer (such as data radio bearer and signaling radio bearer) that has been accepted, which includes at least one of the following:
radio bearer identification
RLC mode information
UL configuration information
information related to a QoS parameter requested to be accepted The effect of the solution is that the RLC mode, UL configuration information, and QoS-related information can be interacted between the central unit and the distributed unit. This facilitates obtaining the same RLC mode information between the two units and determining whether the user's uplink is scheduled in the distributed unit, and also determining what QoS parameters the distributed unit needs to accept.

Process 2: Process of radio bearer modification initiated by the distributed unit FIG. 24 shows a flowchart of a flow of context interaction initiated by a distributed unit according to an embodiment of the present disclosure. The flow chart shown in FIG. 24 comprises the following:

Step 1: The distributed unit sends Message 4 to the central unit. Message 4 includes at least one of the following related to the radio bearer to be modified:

radio bearer identification
RLC mode information, which indicates the RLC layer adopts an AM mode or a UM mode when the distributed unit serves the bearer. Whether to include the information depends on whether or not the information has changed. If there is a change, it may need to be included; otherwise it does not need to be included. In an embodiment, if the RLC mode of the radio bearer changes, the distributed unit always reports the RLC mode information of the radio bearer. In another embodiment, if the RLC mode information is not received in step 1, and if the RLC mode of the radio bearer changes, the distributed unit reports the RLC mode information of the radio bearer. In another embodiment, if the information before step 1 or in step 1 specifies that the distributed unit needs to report the RLC mode of the radio bearer, and the RLC mode of the radio bearer changes, the distributed unit reports the RLC mode information.

UL configuration information, whose content is as described above. Whether to include the information depends on whether or not the information has changed. If there is a change, it may need to be included; otherwise it does not need to be included. In an embodiment, if the UL configuration of the radio bearer changes, the distributed unit always reports the UL configuration information of the radio bearer. In another embodiment, if the UL configuration information is not received in step 1, and if the UL configuration of the radio bearer changes, the distributed unit reports the UL configuration information of the radio bearer. In another embodiment, if the information before step 1 or in step 1 specifies that the distributed unit needs to report the UL configuration information of the radio bearer, and the UL configuration information of the radio bearer changes, the distributed unit reports the UL configuration information.

information related to a QoS parameter requested to be accepted, which indicates the QoS parameter that another base station (or the other base station's distributed unit) is requested to accept for the radio bearer, or indicates the QoS parameter that the distributed unit has accepted for the radio bearer.

Step 2: The central unit sends Message 5 to the distributed unit. The message may be used to confirm the information received in step 1. Optionally, Message 5 includes at least the following related to the radio bearer to be modified that has been accepted:

radio bearer identification

The above two steps may be conducted through a process of user context management between the central unit and the distributed unit. Message 4 and Message 5 may be UE Context Modification Required message and UE Context Modification Confirm message, and may also be other messages.

Optionally, before step 1, there may also be step 0 of receiving Message 6 from a central unit, wherein Message 6 includes at least one of the following related to the radio bearer:

radio bearer identification
indication information on whether to report the RLC mode
indication information on whether to report the UL configuration information Optionally, after step 1, there may also be step 1a of sending, by the central unit, Message 7 to another base station. Message 7 contains at least one of the following related to the radio bearer:

radio bearer identification
RLC mode information
UL configuration information
information related to QoS parameter requested to be accepted The effect of the solution is that the RLC mode, UL configuration information, and QoS-related information can be interacted between the central unit and the distributed unit. This facilitates obtaining the same RLC mode information between the two units and determining whether the user's uplink is scheduled in the distributed unit, and also determining what QoS parameters the distributed unit needs to accept.

In some embodiments of the present invention, a technical solution for exchanging radio link states between a distributed unit and a central unit is also provided, as shown in the following Process 3.

Process 3: Wireless Link State Report Process $1^{st}$ Implementation

FIG. 25 shows a flowchart of a flow example of reporting a state of a radio link according to an embodiment of the present disclosure. The flowchart shown in FIG. 25 comprises the following:

Step 1: The distributed unit sends Message 8 to the central unit. The message may be sent on the user plane or sent on the control plane. Message 8 includes at least one of the following:

radio bearer identification
information related to the state of the radio link, which indicates the deterioration or restoration of the radio link state of the radio bearer on the distributed unit, such as UL radio link outage/resume, DL radio link outage/resume, DL+UL radio link outage/resume;

Optionally, step 2: The central unit sends Message 9 to the distributed unit. Message 9 may be sent on the control plane, or may be sent on the user plane, and the message may include at least one of the following:

radio bearer identification
information related to radio link configuration, such as that the bearer uses the uplink and/or downlink resources of the distributed unit, the bearer does not use the uplink and/or downlink resources of the distributed unit Optionally, before step 2, there may also be step 1a that another base station sends Message 10 to the central unit. Message 10 may be sent on the control plane, or may be sent on the user plane, and includes at least one of the following:

radio bearer identification
information related to the state of the radio link, which indicates the deterioration or restoration of the radio link state of the radio bearer at the other base station, such as UL radio link outage/resume, DL radio link outage/resume, DL+UL radio link outage/resume;

Optionally, before Step 1, there may also be Step 0 that the central unit sends Message 11 to the distributed unit. The message may be sent on the control plane or on the user plane. Message 11 includes at least one of the following:

radio bearer identification
indication information that indicates the state of the radio link needs to be reported. Further, the indication information may also indicate that the UL radio link state information, the DL radio link state information, or UL+DL radio link state information are to be reported. If the distributed unit receives the information, the radio link state information sent by the distributed unit in step 1 is reported according to "indication information that indicates the state of the radio link needs to be reported".

$2^{nd}$ Implementation:

FIG. 26 shows a flowchart of another flow example of reporting a state of a radio link according to an embodiment of the present disclosure. The flowchart shown in FIG. 26 comprises the following:

Step 1: The distributed unit sends Message 12 to another base station. The message may be sent on the user plane or sent on the control plane. Message 12 includes at least one of the following:

radio bearer identification
information related to the state of the radio link, which indicates the deterioration or restoration of the radio link state of the radio bearer on the distributed unit, such as UL radio link outage/resume, DL radio link outage/resume, DL+UL radio link outage/resume;

Regarding Message 12, in one embodiment, the message may be sent directly to another base station by the distributed unit. In another embodiment, the message may be sent to the central unit by the distributed unit through the control plane or the user plane, and then the central unit forwards the message on the plane or user plane to the other base station.

Optionally, Step 2: The other base station sends Message 13 to the distributed unit. Message 13 may be sent on the control plane, or may be sent on the user plane. Message 13 may include at least one of the following:

radio bearer identification
information related to radio link configuration, such as that the bearer uses the uplink and/or downlink resources of the distributed unit, the bearer does not use the uplink and/or downlink resources of the distributed unit Regarding Message 13, in one embodiment, the message may be sent directly to the distributed unit by the other base station. In another embodiment, the message may be sent to the central unit by the other base station through the control plane or the user plane, and then the central unit forwards the message on the plane or user plane to the distributed unit.

Optionally, before Step 1, there may be step 0 that the other base station sends Message 14 to the distributed unit. The message may be sent on the control plane or on the user plane. The message may be directly sent to the distributed unit by the other base station. Alternatively, the message may be sent to the distributed unit via the central unit by the other base station. Message 14 includes at least one of the following:

radio bearer identification indication information that indicates the state of the radio link needs to be reported. Further, the indication information may also indicate that the UL radio link state information, the DL radio link state information, or UL+DL radio link state information are to be reported. If the distributed unit receives the information, the radio link state information sent by the distributed unit in step 1 is reported according to "indication information that indicates the state of the radio link needs to be reported".

Regarding Message 14, in one embodiment, the message may be sent directly to the distributed unit by the other base station. In another embodiment, the message may be sent to the central unit by the other base station through the control plane or the user plane, and then the central unit forwards the message on the plane or user plane to the distributed unit.

The effect of the solution is to identify the uplink and downlink link states, respectively, to decide whether to schedule users' uplinks or downlinks in the distributed units.

In the foregoing embodiment of the present disclosure, through the interaction between the central unit and the distributed unit, context information of the user's radio bearer, such as the RLC mode, UL configuration information, and QoS-related information can be interacted between the central unit and the distributed unit. This facilitates obtaining the same RLC mode information between the two units and determining whether the user's uplink is scheduled in the distributed unit, and also determining what QoS parameters the distributed unit needs to accept.

In addition, by reporting the uplink state and/or the downlink state by the distributed unit, the uplink and downlink link states can also be separately identified, so as to determine whether to schedule users' uplink or downlink in the distributed unit.

The technical solution of FIG. 17-FIG. 26 may allow the central unit and the distributed unit to exchange context-related information (for example, RLC mode, UL configuration information, and QoS-related information, etc.), so that a radio bearer can be effectively established for a user.

The inventors of the present invention further found that in the prior art, when the CU modifies a parameter of the DU or when the DU modifies a parameter of the CU, neither the CU or the DU knows a reasonable value range of the parameter. Therefore, it often occurs that a modified value of the parameter is unreasonable thus goes beyond the value range of the parameter. As such, a user cannot access the network, or accesses the network too early or too late, resulting in failure of the parameter update. In this case, the update of the configuration parameter of the CU or the DU is failed. In order to reduce such failure, various examples of the present disclosure propose a method and device for transmitting a configuration parameter, which involve how to update a configuration parameter between the CU and the DU, in particular, notify the other side in advance of a reasonable value range of the configuration parameter, thus avoiding the failure of the parameter update resulting from that the modification of the parameter goes beyond the reasonable range. It should be noted that the following technical solution may be implemented in in combination with or independent of the above described solution.

The problem to be solved is how to send a configuration parameter of the CU between the CU and the DU of the base station, and how to send a configuration parameter of the DU between the CU and the DU of the base station. An exemplary example of the configuration parameter includes but is not limited to the following parameters:

A parameter related to a cell identity, such as a physical cell identity (PCI), a NR cell identity (NCI), a NR Cell Global Identity (NCGI), etc.;

Identity information of a neighbor cell of the cell;

A parameter related to cell selection/reselection, such as information indicating for cell selection/re-selection the required minimum received signal strength (q-RxLevMin), information indicating for cell selection/re-selection the required minimum received signal strength offset (q-RxLevMinOffset) etc.;

Information related to a user transmission power, such as the maximum user transmission power (p-MAX), configuration information of uplink power control (UplinkPowerControlCommon), etc.;

TDD configuration information of the cell, i.e., uplink and downlink subframe/time slot configuration information of the cell, etc.;

Scheduling information of a system message, such as size information of a window for system message scheduling, and information related to system message repetition;

Configuration information of radio resources related to the cell, such as information contained in RadioResourceConfigCommon in an LTE system (e.g., configuration information of a physical channel (e.g., PRACH, PUSCH, PUCCH, PDCCH, PDSCH, PHICH)), etc.;

Configuration information of a reference signal related to the cell (such as CRS, SRS, etc.);

Configuration information of a timer or some constants of the cell (e.g., ue-TimersAndConstants);

. . .

Specific examples and definitions of the above-mentioned parameters may refer to parameters in system messages defined in 3GPP TS36.331 and 3GPP TS38.331, which have at least one of the following characteristics:

1. The parameter may be modified by the CU, or the DU, or both of the CU and the DU.

2. A value range of the parameter is defined in the protocol (3GPP TS36.331, 3GPP TS38.331). The range may be a set of consecutive values, or may be a set of discrete values. These values may be some numerical values, or may be some enumeration values. A value of the parameter may only be set within the value range of the parameter. For example, in the LTE, a parameter of the cell selection included in an SIB1 message is q-RxLevMin, of which a value range defined in TS36.331 includes integers within [−77, −22].

3. The parameter is a parameter related to cell configuration or CU configuration or DU configuration.

The parameter mentioned in the present disclosure is one or more parameters described above. Hereinafter, a configuration parameter represents the one or more parameters described above. The configuration parameter may be a configuration parameter unique to the CU, or may be a configuration parameter unique to the DU, or a configuration parameter shared by the CU and the DU. Hereinafter, the configuration parameter unique to the CU and the configuration parameter shared by the CU and the DU are referred to as a configuration parameter of the CU, and the configuration parameter unique to the DU and the configuration parameter shared by the CU and the DU are referred to as a configuration parameter of the DU. The configuration parameter of the CU and the configuration parameter of the DU may be all of the above-described parameters, or may be a subset of the above-described parameters. The configuration parameter of the CU and the configuration parameter of the DU may be completely different, or may be completely identical, or may be partially same. The message name mentioned in the present disclosure is an example, which may be replaced with other message names.

Various examples of the present disclosure describe a CU and a DU of a base station. The base station may be a base station gNB of the NR, a base station eNB of the LTE, or a base station with other types.

The method for transmitting a configuration parameter described in various examples of the present disclosure includes two types. One is that the CU modifies the configuration parameter of the DU, and the other is that the DU modifies the configuration parameter of the CU, which are introduced below respectively.

1. The CU modifies the configuration parameter of the DU.

A basic method for modifying the configuration parameter of the DU by the CU includes operations as follows:

At step A1, the CU determines a value range of the configuration parameter of the DU.

At step B1, the CU sends a sixth message to the DU, in which the sixth message includes updated configuration information of the configuration parameter of the DU, which indicates an updated configuration value of the configuration parameter of the DU.

In this case, the updated configuration information may be the updated configuration value, or may be an indication of the updated configuration value. For example, values of the configuration parameter include 100, 1000, and 10000. To indicate these three values, the three values including 100, 1000, and 10000 may be directly determined as the updated configuration information of the configuration parameter, or three indications may be defined, i.e., 1, 2, and 3 respectively represent 100, 1000, and 10000, if a current value of the parameter is 100 and the parameter is to be updated to 1000, the update configuration information may be 2, rather than 1000.

At step C1, the DU receives the sixth message sent from the CU, and updates the corresponding configuration parameter according to the message.

In the basic method described above, steps A1 and B1 are processing at the CU side, and step C1 is processing at the DU side. The two sides cooperate with each other to modify the configuration parameter. At step A1, when the CU determines a value range of the configuration parameter of the DU, the DU may notify the CU of the corresponding value range (corresponding to subsequent mode 1 and mode 2), or the value range may be determined based on predetermined setting or system configuration (corresponding to subsequent mode 3). In addition, the value range therein refers to a value range of the corresponding configuration parameter of the DU in an environment and situation at that time, i.e., a current value range of the configuration parameter, which is referred to as the current value range hereinafter so as to distinguish from an updated value range.

Three specific implementation modes of the above-described basic method are introduced below. Of course, in practice, it is not limited to these three modes. In description of the specific implementation modes, for convenience, the description is made from the perspective of interaction between the CU and the DU.

1) Mode 1: the DU sends a parameter configuration message to the CU, and the CU sends a parameter configuration response message to the DU, as shown in FIG. 27:

At step 1: the DU sends the parameter configuration message to the CU; the message at least includes the current value range of the configuration parameter of the DU; in addition, preferably, the message may further include at least one of the following information:

a. Identity information of the DU, such as a DU ID. The identity information is identity information used by the DU when the DU sends the parameter configuration message. Optionally, old identity information of the DU may also be included. The old identity information is identity information used by the DU before but is not used at the current time (for example, new identity information may be reassigned after a hardware failure occurs in the DU or the DU is restarted).

b. Identity information of at least one cell supported by the DU, such as PCI, NCI, NCGI, and the like. The identity information is the identity information of the at least one cell or an updated value of the identity information obtained before the DU sends the parameter configuration message. If the identity information is the updated value, old identity information of the cell may also be included.

c. Information of a neighbor cell of the at least one cell supported by the DU, such as PCI, NCI, NGCI, and the like. The information of the neighbor cell may be the information of the neighbor cell of the at least one cell or update of the neighbor cell obtained before the DU sends the parameter configuration message.

d. Configuration information of at least one configuration parameter, in which the at least one configuration parameter may be configured for a cell or for the DU. In fact, the aforementioned current value range of the configuration parameter of the DU that must be included in the parameter configuration message may be included in the configuration information herein. Meanwhile, the configuration information herein may also include other information, such as current configuration information of the configuration parameter (which indicates a current configuration value of the configuration parameter). Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter (for example, in some specific situations or cells, the value range of the parameter may not be all of values specified in the protocol, but a subset of all of values specified in the protocol). Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration message.

At step 2: the CU sends the parameter configuration response message to the DU. The message acknowledges to the DU that the message sent at step 1 is received. The parameter configuration response message includes at least one of the following information (the information may be optional or mandatory):

a. Identity information of the CU, such as a CU ID.

b. Updated identity information of at least one cell on the DU. The updated identity information is an updated value of the identity information of the at least one cell obtained before the DU receives the parameter configuration response message. In addition, old identity information of the cell may also be included.

c. Updated information of a neighbor cell of the at least one cell on the DU. The updated information of the neighbor cell is an updated value of information of the neighbor cell of the at least one cell obtained before the DU receives the parameter configuration response message. That is to say, a neighbor cell list of a cell of the DU may be updated using the updated information.

d. Configuration information of at least one configuration parameter, in which the at least one configuration parameter may be configured for a cell or for the DU. The configuration information of the at least one configuration parameter is an update of configuration information of the at least one configuration parameter obtained before the DU receives the parameter configuration response message. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration response message.

In addition, the parameter configuration response message at the present step may also include information as follows:

a'. When the parameter configuration message sent at step 1 includes information b and the information b is an updated identity of the corresponding cell, the CU updates the identity information of the corresponding cell, and cell indication information indicating that the update is successful or cell indication information indicating that the update is not successful (for example, when the updated identity in the CU is used by another cell, the update fails) is included in the parameter configuration response message. Optionally, for a cell that is not updated successfully, the message may further include a cell identity suggested by the CU.

b'. When the parameter configuration message sent at step 1 includes information c and the information c is an update of a neighbor cell of the corresponding cell, the CU updates information of the neighbor cell of the corresponding cell, and cell indication information indicating that the update of the neighbor cell is successful or cell indication information indicating that the update of the neighbor cell is not successful is included in the parameter configuration response message. Optionally, for a cell of which a neighbor cell is not updated successfully, the message may further include information of the neighbor cell of the cell suggested by the CU.

In the above two steps, the parameter configuration message/parameter configuration response message is an exemplary example, and may also be other messages, such as an F1 interface setup request message/F1 interface setup response message, or a DU configuration update message/DU configuration update acknowledgement message, or a cell configuration update message/cell configuration update acknowledgement message, etc.

At step 3: the DU sends a parameter configuration acknowledgement message to the CU, in which the message is an acknowledgement of the parameter configuration response message received at step 2. The message includes identity information of the DU, such as a DU ID. Preferably, when the DU ID is included only, it is indicated that the information at step 2 is accepted by the DU. Preferably, the parameter configuration acknowledgement message may further include at least one of the following information:

a. When the parameter configuration response message sent at step 2 includes the information b, the parameter configuration acknowledgement message at the present step may include the cell indication information indicating that the update is successful or the cell indication information indicating that the update is not successful.

b. When the parameter configuration response message sent at step 2 includes the information c, the parameter configuration acknowledgement message at the present step may include the cell indication information indicating that the update of the neighbor cell is successful or the cell indication information indicating that the update of the neighbor cell is not successful.

c. When configuration information and/or value ranges of part of the parameters to be updated at step 2 are not updated successfully, the message may indicate information about a parameter that is not updated successfully in the parameters to be updated at step 2, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 2, e.g., a parameter name, and an indication indicating that the configuration information is updated successfully or an indication indicating that the value range is updated successfully or an indication indicating that the configuration information and the value range are updated successfully. Optionally, for a configuration parameter of which the configuration information and/or the value range is not updated successfully, the message may further indicate appropriate configuration information and/or value range.

d. When none of the parameters to be updated at step 2 are successfully updated, at step 3, the parameter configuration acknowledgement message may indicate that all parameters are not updated successfully. For example, a parameter configuration failure message may be sent to the CU through the DU, in which the parameter configuration failure message includes the identity information of the DU, such as the DU ID, and indicates that none of the parameters to be updated at step 2 are successfully updated. Optionally, the parameter configuration failure message may further indicate appropriate configuration information and/or value range.

The above-described step 3 is an optional step. At the same time, at step 3, the parameter configuration acknowledgement message and the parameter configuration failure message are exemplary examples, and other message names may be used. Optionally, the parameter configuration acknowledgement message and the parameter configuration failure message may include the identity information of the DU.

The update of the cell identity, the update of the neighbor cell of the cell, and the update of the configuration information or value range of the configuration parameter performed in the above steps may be performed independently. For example, the cell identity is updated only, or the neighbor cell of the cell is updated only, or the configuration information of the configuration parameter is updated only, or the value range of the configuration parameter is updated only.

2) Mode 2: the DU sends a parameter configuration message to the CU to notify the CU of a setting value and/or a value range of the configuration parameter; the CU acknowledges the message; the CU sends a parameter modification message to the DU, and the DU returns a parameter modification acknowledgement message, as shown in FIG. 28:

At step 1: the DU sends the parameter configuration message to the CU; the message at least includes the current value range of the configuration parameter of the DU; in addition, preferably, the message may further include at least one of the following information:

a. Identity information of the DU, such as a DU ID. The identity information is identity information used by the DU when the DU sends the parameter configuration message. Optionally, old identity information of the DU may also be included. The old identity information is identity information used by the DU before but is not used at the current time (for example, new identity information may be reassigned after a hardware failure occurs in the DU or the DU is restarted).

b. Identity information of at least one cell supported by the DU, such as PCI, NCI, NCGI, and the like. The identity information is the identity information of the at least one cell or an updated value of the identity information obtained before the DU sends the parameter configuration message. If the identity information is the updated value, old identity information of the cell may also be included.

c. Identity information of a neighbor cell of the at least one cell supported by the DU, such as PCI, NCI, NGCI, and the like. The information of the neighbor cell may be the information of the neighbor cell of the at least one cell or update of the information of the neighbor cell obtained before the DU sends the parameter configuration message.

d. Configuration information of at least one configuration parameter, in which the at least one configuration parameter may be configured for a cell or for the DU. In fact, the aforementioned current value range of the configuration parameter of the DU that must be included in the parameter configuration message may be included in the configuration information herein. Meanwhile, the configuration information herein may also include other information, such as current configuration information of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter (for example, in some specific situations or cells, the value range of the parameter may not be all of values specified in the protocol, but a subset of all of values specified in the protocol). Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration message.

At step 2: the CU sends a parameter configuration response message to the DU. The message acknowledges to the DU that the message sent at step 1 is received. The parameter configuration response message includes the identity information of the CU, and may include at least one of the following information:

a'. When the parameter configuration message sent at step 1 includes information b and the information b is an updated identity of the corresponding cell, the CU updates the identity information of the corresponding cell, and cell indication information indicating that the update is successful or cell indication information indicating that the update is not successful (for example, when the updated identity in the CU is used by another cell, the update fails) is included in the parameter configuration response message. Optionally, for a cell that is not updated successfully, the message may further include a cell identity suggested by the CU.

b'. When the parameter configuration message sent at step 1 includes information c and the information c is an update of a neighbor cell of the corresponding cell, the CU updates the neighbor cell of the corresponding cell, and cell indication information indicating that the update of the neighbor cell is successful or cell indication information indicating that the update of the neighbor cell is not successful is included in the parameter configuration response message. Optionally, for a cell of which a neighbor cell is not updated successfully, the message may further include information of the neighbor cell of the cell suggested by the CU.

In the above two steps, the parameter configuration message/parameter configuration response message is an exemplary example, and may also be other messages, such as an F1 interface setup request message/F1 interface setup response message, or a DU configuration update message/DU configuration update acknowledgement message, or a cell configuration update message/cell configuration update acknowledgement message, etc.

The above-described step 1 and step 2 may only update the cell identity or the neighbor cell of the cell, or may only notify the parameter configuration information of the DU or the value range of the parameter.

At step 3: the CU sends the parameter modification message to the DU, in which the message at least includes update configuration information of the configuration parameter of the DU, which updates a value of the configuration parameter of the DU. Further, the message may include at least one of the following information (the information may be optional or mandatory):

a. Identity information of the CU, such as a CU ID.

b. Updated identity information of at least one cell on the DU. The updated identity information is an updated value of the identity information of the at least one cell obtained before the DU receives the parameter modification message. In addition, old identity information of the cell may also be included.

c. Updated information of a neighbor cell of the at least one cell on the DU. The updated information of the neighbor cell is an updated value of the neighbor cell of the at least one cell obtained before the DU receives the parameter modification message.

d. Configuration information of at least one configuration parameter, in which the at least one configuration parameter may be configured for a cell supported by the DU or for the DU. The configuration information of the at least one configuration parameter is an update of configuration information of the at least one configuration parameter obtained before the DU receives the parameter modification message. In fact, the aforementioned update configuration information of the configuration parameter of the DU that must be included in the parameter modification message may be included in the configuration information herein. Meanwhile, the configuration information herein may also include other information, such as an updated value range of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all of these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the parameter modification message.

At step 4: the DU sends a parameter modification acknowledgement message to the CU, in which the message is an acknowledgement of the parameter modification message received at step 3. The message includes identity information of the DU, such as a DU ID. Preferably, when the DU ID is included only, it is indicated that the information at step 3 is accepted by the DU. Preferably, the parameter modification acknowledgement message may further include at least one of the following information:

a. When the parameter modification message sent at step 3 includes the information b, the parameter modification acknowledgement message at the present step may include the cell indication information indicating that the update is successful or the cell indication information indicating that the update is not successful. Optionally, for a cell that is not updated successfully, the message may further include a cell identity suggested by the DU.

b. When the parameter modification message sent at step 3 includes the information c, the parameter modification acknowledgement message at the present step may include the cell indication information indicating that the update of the neighbor cell is successful or the cell indication information indicating that the update of the neighbor cell is not successful. Optionally, for a cell of which a neighbor cell is not updated successfully, the message may further include a neighbor cell of the cell suggested by the DU.

c. When configuration information and/or value ranges of part of the parameters to be updated at step 3 are not updated successfully, the message may indicate information about a parameter that is not updated successfully in the parameters to be updated at step 3, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 3, e.g., a parameter name, and an indication indicating that the configuration information is updated successfully or an indication indicating that the value range is updated successfully or an indication indicating that the configuration information and the value range are updated successfully. Optionally, for a configuration parameter of which the configuration information and/or the value range is not updated successfully, the message may further indicate appropriate configuration information and/or value range.

d. When none of the parameters to be updated at step 3 are successfully updated, at step 4, the parameter modification acknowledgement message may indicate that all parameters are not updated successfully. For example, a parameter modification failure message may be sent to the CU through the DU, in which the message indicates that none of the parameters to be updated at step 3 are successfully updated.

Optionally, the message may further indicate appropriate configuration information and/or value range.

At the above-described steps 3 and 4, the message names are exemplary examples, and other message names may be used. Optionally, the parameter modification acknowledgement message and the parameter modification failure message may include the identity information of the DU.

At the above-described steps 3 and 4, the cell identity may be updated only, or the neighbor cell of the cell may be updated only, or the configuration information of the parameter of the DU may be modified only, or the value range of the parameter of the DU may be modified only.

3) Mode 3: the CU sends a parameter modification message to the DU, and the DU sends a parameter modification acknowledgement message to the CU, as shown in FIG. 29:

At step 1: the CU sends the parameter modification message to the DU, in which the message at least includes update configuration information of the configuration parameter of the DU, which updates a value of the configuration parameter of the DU.

In this case, the update configuration information sent by the CU is within the current value range of the corresponding configuration parameter determined by the CU. The current value range of the configuration parameter of the DU may be determined by the CU according to predetermined setting or system configuration, for example, determined according to a protocol, or determined according to configuration of the OAM.

Further, the parameter modification message at the present step may include at least one of the following information (the information may be optional or mandatory):

a. Identity information of the CU, such as a CU ID.

b. Updated identity information of at least one cell on the DU. The updated identity information is an update of the identity information of the at least one cell obtained before the DU receives the parameter modification message. In addition, old identity information of the cell may also be included.

c. Updated information of a neighbor cell of the at least one cell on the DU. The updated information of the neighbor cell is an update of the neighbor cell of the at least one cell obtained before the DU receives the parameter modification message.

d. Configuration information of at least one configuration parameter, in which the at least one configuration parameter may be configured for a cell supported by the DU or for the DU. The configuration information of the at least one configuration parameter is an update of configuration information of the at least one configuration parameter obtained before the DU receives the parameter modification message. In fact, the aforementioned update configuration information of the configuration parameter of the DU that must be included in the parameter modification message may be included in the configuration information herein. Meanwhile, the configuration information herein may also include other information, such as an updated value range of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all of these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the parameter modification message.

At step 2: the DU sends a parameter modification acknowledgement message to the CU, in which the message is an acknowledgement of the parameter modification message received at step 1. The message includes identity information of the DU, such as a DU ID. Preferably, when the DU ID is included only, it is indicated that the information at step 1 is accepted by the DU. Preferably, the parameter modification acknowledgement message may further include at least one of the following information:

a. When the parameter modification message sent at step 1 includes the information b, the parameter modification acknowledgement message at the present step may include the cell indication information indicating that the update is successful or the cell indication information indicating that the update is not successful. Optionally, for a cell that is not updated successfully, the message may further include a suggested cell identity.

b. When the parameter modification message sent at step 1 includes the information c, the parameter modification acknowledgement message at the present step may include the cell indication information indicating that the update of the neighbor cell is successful or the cell indication information indicating that the update of the neighbor cell is not successful. Optionally, for a cell of which a neighbor cell is not updated successfully, the message may further include suggested information of a neighbor cell of the cell.

c. When configuration information and/or value ranges of part of the parameters to be updated at step 1 are not updated successfully, the message may indicate information about a parameter that is not updated successfully in the parameters to be updated at step 1, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 1, e.g., a parameter name, and an indication indicating that the configuration information is updated successfully or an indication indicating that the value range is updated successfully or an indication indicating that the configuration information and the value range are updated successfully. Optionally, for a configuration parameter of which the configuration information and/or the value range is not updated successfully, the message may further include suggested configuration information and/or value range.

d. When none of the parameters to be updated at step 1 are successfully updated, at step 2, the parameter modification acknowledgement message may indicate that all parameters are not updated successfully. For example, a parameter modification failure message may be sent to the CU through the DU, in which the message indicates that none of the parameters to be updated at step 1 are successfully updated. Optionally, the message may further include suggested configuration information and/or value range.

At the above-described steps 1 and 2, the message names are exemplary examples, and other message names may be used. Optionally, the parameter modification acknowledgement message and the parameter modification failure message may include the identity information of the DU.

At the above-described steps 1 and 2, the cell identity may be updated only, or the neighbor cell of the cell may be updated only, or the configuration information of the parameter of the DU may be modified only, or the value range of the parameter of the DU may be modified only.

2. The DU modifies the configuration parameter of the CU.

A basic method for modifying the configuration parameter of the CU by the DU includes operations as follows:

At step A2, the DU determines a value range of the configuration parameter of the CU.

At step B2, the DU sends a sixth message to the CU, in which the sixth message includes update configuration information of the configuration parameter of the CU, which indicates an updated configuration value of the configuration parameter of the CU.

In this case, the update configuration information may be the updated configuration value, or may be an indication of the updated configuration value, as described before.

At step C2, the CU receives the sixth message sent from the DU, and updates the corresponding configuration parameter according to the message.

In the basic method described above, steps A2 and B2 are processing at the DU side, and step C2 is processing at the CU side. The two sides cooperate with each other to modify the configuration parameter. At step A2, when the DU determines a current value range of the configuration parameter of the CU, the CU may notify the DU of the corresponding value range (corresponding to subsequent mode 1 and mode 2), or the value range may be determined based on predetermined setting or system configuration (corresponding to subsequent mode 3). In addition, the value range therein refers to a value range of a configuration parameter corresponding to the CU or a cell in an environment and situation at that time, i.e., a current value range of the configuration parameter, which is referred to as the current value range hereinafter so as to distinguish from an updated value range.

Three specific implementation modes of the above-described basic method are introduced below. Of course, in practice, it is not limited to these three modes. In description of the specific implementation modes, for convenience, the description is made from the perspective of interaction between the CU and the DU.

1) Mode 1: the CU sends a parameter configuration message to the DU, and the DU sends a parameter configuration response message to the CU, as shown in FIG. 30:

At step 1: the CU sends the parameter configuration message to the DU; the message at least includes the current value range of the configuration parameter of the CU; in addition, preferably, the message may further include at least one of the following information:

a. Identity information of the CU, such as a CU ID. The identity information is identity information used by the CU when the CU sends the parameter configuration message. Optionally, old identity information of the CU may also be included. The old identity information is identity information used by the CU before but is not used at the current time (for example, new identity information may be reassigned after a hardware failure occurs in the CU or the CU is restarted).

b. Updated identity information of at least one cell supported by the DU, such as PCI, NCI, NCGI, and the like. The identity information is an updated value of the identity information of the at least one cell obtained before the DU receives the parameter configuration message. In addition, old identity information of the cell may also be included.

c. Updated information of a neighbor cell of the at least one cell supported by the DU, such as PCI, NCI, NGCI, and the like. The updated information of the neighbor cell may be an updated value of the information of the neighbor cell of the at least one cell obtained before the DU receives the parameter configuration message.

d. Configuration information of at least one configuration parameter, in which the at least one configuration parameter may be configured for a cell or for the CU. In fact, the aforementioned current value range of the configuration parameter of the CU that must be included in the parameter configuration message may be included in the configuration information herein. Meanwhile, the configuration information herein may also include other information, such as current configuration information of the configuration parameter (which indicates a current configuration value of the configuration parameter). Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter (for example, in some specific situations or cells, the value range of the parameter may not be all of values specified in the protocol, but a subset of all of values specified in the protocol). Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration message.

At step 2: the DU sends the parameter configuration response message to the CU. The message acknowledges to the CU that the message sent at step 1 is received. The parameter configuration response message may include at least one of the following information (the information may be optional or mandatory):

a. Identity information of the DU, such as a DU ID.

b. Identity information of at least one cell supported by the DU, such as PCI, NCI, NCGI, and the like. The identity information is the identity information of the at least one cell or an updated value of the identity information obtained before the DU sends the parameter configuration response message. If the identity information is the updated value, old identity information of the cell may also be included.

c. Information of a neighbor cell of the at least one cell supported by the DU, such as PCI, NCI, NGCI, and the like. The information of the neighbor cell may be the information of the neighbor cell of the at least one cell or an updated value of the information of the neighbor cell obtained before the DU sends the parameter configuration response message.

d. Configuration information of at least one configuration parameter, in which the at least one configuration parameter may be configured for a cell or for the CU. The configuration information of the at least one configuration parameter is an update of configuration information of the at least one configuration parameter obtained before the CU receives the parameter configuration response message. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration response message.

In addition, the parameter configuration response message at the present step may also include information as follows:

a'. When the parameter configuration message sent at step 1 includes the information b, the DU updates the identity information of the corresponding cell, and cell indication information indicating that the update is successful or cell indication information indicating that the update is not successful (for example, when the updated identity in the DU is used by another cell, the update fails) is included in the parameter configuration response message. Optionally, for a cell that is not updated successfully, the message may further include a suggested cell identity.

b'. When the parameter configuration message sent at step 1 includes the information c, the DU updates information of the neighbor cell of the corresponding cell, and cell indication information indicating that the update of the neighbor cell is successful or cell indication information indicating that the update of the neighbor cell is not successful is included in the parameter configuration response message. Optionally, for a cell of which a neighbor cell is not updated successfully, the message may further include a suggested neighbor cell of the cell.

In the above two steps, the parameter configuration message/parameter configuration response message is an exemplary example, and may also be other messages.

At step 3: the CU sends a parameter configuration acknowledgement message to the DU, in which the message is an acknowledgement of the parameter configuration response message received at step 2. The message includes identity information of the CU, such as a CU ID. Preferably, when the CU ID is included only, it is indicated that the information at step 2 is accepted by the CU. Preferably, the parameter configuration acknowledgement message may further include at least one of the following information:

a. When the parameter configuration response message sent at step 2 includes the information b and the information b is an updated identity of the corresponding cell, the parameter configuration acknowledgement message at the present step may include the cell indication information indicating that the update is successful or the cell indication information indicating that the update is not successful. Optionally, for a cell that is not updated successfully, the message may further include a suggested cell identity.

b. When the parameter configuration response message sent at step 2 includes the information c and the information c is an update of the neighbor cell of the corresponding cell, the parameter configuration acknowledgement message at the present step may include the cell indication information indicating that the update of the neighbor cell is successful or the cell indication information indicating that the update of the neighbor cell is not successful. Optionally, for a cell of which a neighbor cell is not updated successfully, the message may further include a suggested neighbor cell.

c. When configuration information and/or value ranges of part of the parameters to be updated at step 2 are not updated successfully, the message may indicate information about a parameter that is not updated successfully in the parameters to be updated at step 2, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 2, e.g., a parameter name, and an indication indicating that the configuration information is updated successfully or an indication indicating that the value range is updated successfully or an indication indicating that the configuration information and the value range are updated successfully. Optionally, for a configuration parameter of which the configuration information and/or the value range is not updated successfully, the message may further indicate appropriate configuration information and/or value range.

d. When none of the parameters to be updated at step 2 are successfully updated, at step 3, the parameter configuration acknowledgement message may indicate that all parameters are not updated successfully. For example, a parameter configuration failure message may be sent to the DU through the CU to indicate that none of the parameters to be updated at step 2 are successfully updated. Optionally, the parameter configuration failure message may further indicate appropriate configuration information and/or value range.

The above-described step 3 is an optional step. At the same time, at step 3, the parameter configuration acknowledgement message and the parameter configuration failure message are exemplary examples, and other message names may be used. Optionally, the parameter configuration acknowledgement message and the parameter configuration failure message may include the identity information of the CU.

In the above steps, the cell identity may be updated only, or the neighbor cell may be updated only, or the configuration information and/or the value range of the configuration parameter may be updated only.

2) Mode 2: the CU sends a parameter configuration message to the DU to notify the DU of a setting value and/or a value range of the configuration parameter; the DU acknowledges the message; the DU sends a parameter modification message to the CU, and the CU returns a parameter modification acknowledgement message, as shown in FIG. 31:

At step 1: the CU sends the parameter configuration message to the DU; the message at least includes the current value range of the configuration parameter of the CU; in addition, preferably, the message may further include at least one of the following information:

a. Identity information of the CU, such as a CU ID. The identity information is identity information used by the CU when the CU sends the parameter configuration message. Optionally, old identity information of the CU may also be included. The old identity information is identity information used by the CU before but is not used at the current time (for example, new identity information may be reassigned after a hardware failure occurs in the CU or the CU is restarted).

b. Updated identity information of at least one cell supported by the DU, such as PCI, NCI, NCGI, and the like. The identity information is an updated value of the identity information of the at least one cell obtained before the DU receives the parameter configuration message. In addition, old identity information of the cell may also be included.

c. Updated information of a neighbor cell of the at least one cell supported by the DU, such as PCI, NCI, NGCI, and the like. The information of the neighbor cell may be an updated value of the information of the neighbor cell of the at least one cell obtained before the DU receives the parameter configuration message.

d. Configuration information of at least one configuration parameter, in which the at least one configuration parameter may be configured for a cell or for the CU. In fact, the aforementioned current value range of the configuration parameter of the CU that must be included in the parameter configuration message may be included in the configuration information herein. Meanwhile, the configuration information herein may also include other information, such as current configuration information of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter (for example, in some specific situations or cells, the value range of the parameter may not be all of values specified in the protocol, but a subset of all of values specified in the protocol). Configuration information and corresponding value ranges of all these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the configuration message.

At step 2: the DU sends a parameter configuration acknowledgement message to the CU. The message acknowledges to the CU that the message sent at step 1 is received. The message includes the identity information of the DU. Optionally, the message may include at least one of the following information:

a'. When the parameter configuration message sent at step 1 includes information b and the information b is an updated identity of the corresponding cell, the DU updates the identity information of the corresponding cell, and cell indication information indicating that the update is successful or cell indication information indicating that the update is not successful (for example, when the updated identity in the DU is used by another cell, the update fails) is included in the parameter configuration acknowledgement message. Optionally, for a cell that is not updated successfully, a suggested cell identity may further be included.

b'. When the parameter configuration message sent at step 1 includes information c and the information c is an update of a neighbor cell of the corresponding cell, the DU updates the information of the neighbor cell of the corresponding cell, and cell indication information indicating that the update of the neighbor cell is successful or cell indication information indicating that the update of the neighbor cell is not successful is included in the parameter configuration acknowledgement message. Optionally, for a cell of which a neighbor cell is not updated successfully, a suggested neighbor cell may be included.

In the above two steps, the parameter configuration message/parameter configuration acknowledgement message is an exemplary example, and may also be other messages.

The above-described two steps may update the cell identity only, or the neighbor cell of the cell only, or the configuration information of the parameter only, or the value range of the parameter only.

At step 3: the DU sends the parameter modification message to the CU, in which the message at least includes update configuration information of the configuration parameter of the CU, which updates a value of the configuration parameter of the CU.

In addition, the parameter modification message may further include at least one of the following information (the information may be optional or mandatory):

a. Identity information of the DU, such as a DU ID.

b. Identity information of at least one cell supported by the DU, such as PCI, NCI, NCGI, and the like. The identity information is the identity information of the at least one cell or an updated value of the identity information obtained before the DU sends the parameter modification message. When the identity information is the updated value, old identity information of the cell may also be included.

c. Information of a neighbor cell of the at least one cell supported by the DU, such as PCI, NCI, NGCI, and the like. The information of the neighbor cell may be the information of the neighbor cell of the at least one cell or an updated value of the information of the neighbor cell obtained before the DU sends the parameter modification message.

d. Configuration information of at least one configuration parameter, in which the at least one configuration parameter may be configured for a cell or for the CU. The configuration information of the at least one configuration parameter is an update of configuration information of the at least one configuration parameter obtained before the CU receives the parameter modification message. In fact, the aforementioned update configuration information of the configuration parameter of the CU that must be included in the parameter modification message may be included in the configuration information herein. Meanwhile, the configuration information herein may also include other information, such as an updated value range of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all of these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the parameter modification message.

At step 4: the CU sends a parameter modification acknowledgement message to the DU, in which the message is an acknowledgement of the parameter modification message received at step 3. Preferably, the parameter modification acknowledgement message may include at least one of the following information:

a. The identity of the CU, such as the CU ID. Preferably, when the CU ID is included only, it is indicated that the information at step 3 is accepted by the CU.

b. When the parameter modification message sent at step 3 includes the information b and the information b is an updated identity of the corresponding cell, the parameter modification acknowledgement message at the present step may include the cell indication information indicating that the update is successful or the cell indication information indicating that the update is not successful. Optionally, for a cell that is not updated successfully, a suggested cell identity may be included.

c. When the parameter modification message sent at step 3 includes the information c and the information c is an update of a neighbor cell of the corresponding cell, the parameter modification acknowledgement message at the present step may include the cell indication information indicating that the update of the neighbor cell is successful or the cell indication information indicating that the update of the neighbor cell is not successful. Optionally, for a cell of which a neighbor cell is not updated successfully, a suggested neighbor cell may be included.

d. When configuration information and/or value ranges of part of the parameters to be updated at step 3 are not updated successfully, the message may indicate information about a parameter that is not updated successfully in the parameters to be updated at step 3, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 3, e.g., a parameter name, and an indication indicating that the configuration information is updated successfully or an indication indicating that the value range is updated successfully or an indication indicating that the configuration information and the value range are updated successfully.

Optionally, for a parameter which is not updated successfully, suggested configuration information and/or value range may be included.

e. When none of the parameters to be updated at step 3 are successfully updated, at step 4, the parameter modification acknowledgement message may indicate that all parameters are not updated successfully. For example, a parameter modification failure message may be sent to the DU through the CU, in which the message indicates that none of the parameters to be updated at step 3 are successfully updated. Optionally, the suggested configuration information and/or value range may be included.

At the above-described steps 3 and 4, the message names are exemplary examples, and other message names may be used. Optionally, the parameter modification acknowledgement message and the parameter modification failure message may include the identity information of the CU.

At the above-described two steps, the cell identity may be modified only, or the neighbor cell of the cell may be modified only, or the configuration information of the parameter may be modified only, or the value range of the parameter may be modified only.

3) Mode 3: the DU sends a parameter modification message to the CU, and the CU sends a parameter modification acknowledgement message to the DU, as shown in FIG. 32:

At step 1: the DU sends the parameter modification message to the CU, in which the message at least includes update configuration information of the configuration parameter of the CU, which updates a value of the configuration parameter of the CU.

In this case, the update configuration information sent by the DU is within the current value range of the corresponding configuration parameter determined by the DU. The current value range of the configuration parameter of the CU may be determined by the DU according to predetermined setting or system configuration, for example, determined according to a protocol, or determined according to configuration of the OAM.

Further, the parameter modification message at the present step may include at least one of the following information (the information may be optional or mandatory):

a. Identity information of the DU, such as a DU ID.

b. Identity information of at least one cell supported by the DU, such as PCI, NCI, NCGI, and the like. The identity information is the identity information of the at least one cell or an updated value of the identity information obtained before the DU sends the parameter modification message. If the identity information is the updated value, old identity information of the cell may also be included.

c. Information of a neighbor cell of the at least one cell supported by the DU, such as PCI, NCI, NGCI, and the like. The information of the neighbor cell may be the information of the neighbor cell of the at least one cell or an updated value of the information of the neighbor cell obtained before the DU sends the parameter modification message.

d. Configuration information of at least one configuration parameter, in which the at least one configuration parameter may be configured for a cell or for the CU. The configuration information of the at least one configuration parameter is an update of configuration information of the at least one configuration parameter obtained before the CU receives the parameter modification message. In fact, the aforementioned update configuration information of the configuration parameter of the CU that must be included in the parameter modification message may be included in the configuration information herein. Meanwhile, the configuration information herein may also include other information, such as an updated value range of the configuration parameter. Specifically, the parameter configuration message may include the configuration information of the at least one configuration parameter in one of the following ways, or may include configuration information of different configuration parameters in different ways as follows:

(IE for configuration value) Configuration information of the at least one parameter. Configuration information of each parameter is an independent information element in the parameter configuration message.

(Container for configuration value) Configuration information of the at least one parameter. Configuration information of all these parameters is encapsulated in an RRC container.

(IE for value range) A value range of the at least one parameter. The value range may be a set of all possible values of the parameter, or a subset of the set of all possible values of the parameter. A value range of each parameter is an independent information element in the parameter configuration message.

(Container for value range) The value range of the at least one parameter. The value range may be a set of all possible values of the parameter, or a subset of the set of all possible values of the parameter. Value ranges of all of these parameters are encapsulated in an RRC container.

(IE for both configuration value and value range) Configuration information and a corresponding value range of the at least one parameter. The value range may be the set of all possible values of the parameter, or a subset of the set of all possible values of the parameter. Configuration information and a corresponding value range of each parameter is an independent information element in the parameter configuration message.

(Container for both configuration value and value range) Configuration information and a corresponding value range of the at least one parameter. The value range may be a set of all possible values of the parameter, or a subset of the set of all possible values of the parameter. Configuration information and corresponding value ranges of all of these parameters are encapsulated in an RRC container in the parameter configuration message.

(Container for configuration value, and IE for value range) Configuration information of the at least one parameter. Configuration information of all these parameters is encapsulated in an RRC container. The value range of each parameter in the above-mentioned at least one parameter is an independent information element in the parameter configuration message. The value range may be a set of all possible values of the parameter, or a subset of the set of all possible values of the parameter.

(Container for value range, and IE for configuration value) The value range of the at least one parameter. The value ranges of all of these parameters are encapsulated in an RRC container. The value range may be a set of all possible values of the parameter, or a subset of the set of all possible values of the parameter. Configuration information of each parameter in the above-mentioned at least one parameter is an independent information element in the parameter configuration message.

In addition, if the DU supports a plurality of cells, the configuration information of the above-mentioned at least one parameter configured for each cell or part of the cells may be included in the parameter modification message.

At step 2: the CU sends a parameter modification acknowledgement message to the DU, in which the message is an acknowledgement of the parameter modification message received at step 1. The message includes identity information of the CU, such as a CU ID. Preferably, when the CU ID is included only, it is indicated that the information at step 1 is accepted by the CU. Preferably, the parameter modification acknowledgement message may further include at least one of the following information:

a. When the parameter modification message sent at step 1 includes the information b and the information b is an updated identity of the corresponding cell, the CU updates the identity information of the corresponding cell, and cell indication information indicating that the update is successful or cell indication information indicating that the update is not successful (for example, when the updated identity in the CU is used by another cell, the update fails) is included in the parameter modification acknowledgement message. Optionally, for a cell that is not updated successfully, a suggested cell identity may be included.

b. When the parameter modification message sent at step 1 includes the information c and the information c is an update of the neighbor cell of the corresponding cell, the CU updates the information of the neighbor cell of the corresponding cell, and the cell indication information indicating that the update of the neighbor cell is successful or the cell indication information indicating that the update of the neighbor cell is not successful may be included in the parameter modification acknowledgement message. Optionally, for a cell of which a neighbor cell is not updated successfully, a suggested neighbor cell may be included.

c. When configuration information and/or value ranges of part of the parameters to be updated at step 1 are not updated successfully, the message may indicate information about a parameter that is not updated successfully in the parameters to be updated at step 1, e.g., a parameter name, and an indication indicating that the configuration information is not updated successfully or an indication indicating that the value range is not updated successfully or an indication indicating that the configuration information and the value range are not updated successfully; or the message may indicate information about a parameter that is updated successfully in the parameters to be updated at step 1, e.g., a parameter name, and an indication indicating that the configuration information is updated successfully or an indication indicating that the value range is updated successfully or an indication indicating that the configuration information and the value range are updated successfully. Optionally, for a parameter which is not updated successfully, a suggested value and/or value range of the parameter may be included.

d. When none of the parameters to be updated at step 1 are successfully updated, at step 2, the parameter modification acknowledgement message may indicate that all parameters are not updated successfully. For example, a parameter modification failure message may be sent to the DU through the CU, in which the message indicates that none of the parameters to be updated at step 1 are successfully updated. Optionally, the suggested value and/or value range of the parameter may be included.

At the above-described steps 1 and 2, the message names are exemplary examples, and other message names may be used. Optionally, the parameter modification acknowledgement message and the parameter modification failure message may include the identity information of the CU.

At the above-described two steps, the cell identity may be modified only, or the neighbor cell of the cell may be modified only, or the configuration information of the parameter may be modified only, or the value range of the parameter may be modified only.

The foregoing description is specific implementations of the method for transmitting a configuration parameter disclosed in the present disclosure. Various examples of the present disclosure also provide a CU device and a DU device for transmitting a configuration parameter, which implement the above-described method.

Corresponding to the above-described method for modifying a configuration parameter of the DU by the CU, various examples of the present disclosure provide a first CU device and a first DU device, which implement the method for modifying the configuration parameter of the DU by the CU.

The first CU device includes a determining unit and a sending unit. The determining unit may determine a current value range of the configuration parameter of the DU. The sending unit may send a sixth message to the first DU device, in which the sixth message includes update configuration information of the configuration parameter of the DU, which may indicate an updated configuration value of the configuration parameter of the DU. The updated configuration value of the configuration parameter of the DU is within the current value range of the corresponding configuration parameter.

Preferably, the determining unit is configured to receive a seventh message sent from the first DU device, in which the seventh message includes a value range of the configuration parameter of the DU. Alternatively, the determining unit is configured to receive predetermined setting or system configuration and determine the value range of the configuration parameter of the DU.

Preferably, the seventh message further includes one or more combinations of the following information: identity information of the DU, identity information of at least one cell supported by the DU, information of a neighbor cell of the at least one cell supported by the DU, and current configuration information of the configuration parameter of the DU.

Preferably, when the seventh message includes the identity information of the at least one cell supported by the DU and the identity information of at least one cell updates the identity information of the corresponding cell within the CU, cell indication information indicating that the update is successful or cell indication information indicating that the update is not successful is included in the sixth message. Alternatively, the sending unit sends a eighth message to the first DU device before the sending unit sends the sixth message to the first DU device, in which the eighth message includes the cell indication information indicating that the update is successful or the cell indication information indicating that the update is not successful.

Preferably, when the seventh message includes the information of the neighbor cell of the at least one cell supported by the DU and the information of the neighbor cell of the at least one cell updates the neighbor cell of the corresponding cell within the CU, cell indication information indicating that the update of the neighbor cell is successful or cell indication information indicating that the update of the neighbor cell is not successful is included in the sixth message. Alternatively, the sending unit sends the eighth message to the DU before the sending unit sends the sixth message to the first DU device, in which the eighth message includes the cell indication information indicating that the update of the neighbor cell is successful or the cell indication information indicating that the update of the neighbor cell is not successful.

Preferably, the seventh message may include one or more configuration parameters of the DU.

A value range of each configuration parameter of the DU included in the seventh message is an independent information element in the seventh message; or, value ranges of all of configuration parameters of the DU included in the seventh message are encapsulated in a RRC container.

And/or, current configuration information of each configuration parameter of the DU included in the seventh message is an independent information element in the seventh message; or, current configuration information of all of configuration parameters of the DU included in the seventh message is encapsulated in a RRC container.

And/or, the value range and current configuration information of each configuration parameter of the DU included in the seventh message is an independent information element in the seventh message; or, value ranges and current configuration information of all of configuration parameters of the DU included in the seventh message are encapsulated in a RRC container.

Preferably, the sixth message further includes one or more combinations of the following information: identity information of the CU, update identity information of at least one cell on the DU, update information of a neighbor cell of the at least one cell on the DU, and an updated value range of the configuration parameter of the DU.

Preferably, the sixth message may include one or more configuration parameters of the DU.

Update configuration information of each configuration parameter of the DU included in the sixth message is an independent information element in the sixth message; or, update configuration information of all of configuration parameters of the DU included in the sixth message is encapsulated in a RRC container.

And/or, an updated value range of each configuration parameter of the DU included in the sixth message is an independent information element in the sixth message; or, updated value ranges of all of configuration parameters of the DU included in the sixth message are encapsulated in a RRC container.

And/or, the updated value range and update configuration information of each configuration parameter included in the sixth message is an independent information element in the sixth message; or, updated value ranges and update configuration information of all of configuration parameters of the DU included in the sixth message are encapsulated in a RRC container.

The first DU device includes a receiving unit and an updating unit. The receiving unit receives the sixth message sent from the first CU device, in which the sixth message includes the update configuration information of the configuration parameter of the DU, which indicates the updated configuration value of the configuration parameter of the DU. The updating unit is configured to update the configuration value of the corresponding configuration parameter in the DU according to the updated configuration value of the configuration parameter of the DU in the sixth message. The updated configuration value of the configuration parameter of the DU is within the current value range of the corresponding configuration parameter determined by the first CU device.

Corresponding to the above-described method for modifying a configuration parameter of the CU by the DU, various examples of the present disclosure provide a second CU device and a second DU device, which implement the method for modifying the configuration parameter of the CU by the DU.

The second DU device includes a determining unit and a sending unit. The determining unit may determine a current value range of the configuration parameter of the CU. The sending unit may send a tenth message to the second CU device, in which the tenth message includes update configuration information of the configuration parameter of the CU, which may indicate an updated configuration value of the configuration parameter of the CU. The updated configuration value of the configuration parameter of the CU is within the current value range of the corresponding configuration parameter.

Preferably, the determining unit is configured to receive a eleventh message sent from the second CU device, in which the eleventh message includes a value range of the configuration parameter of the CU. Alternatively, the determining unit is configured to receive predetermined setting or system configuration and determine the value range of the configuration parameter of the CU.

Preferably, the eleventh message further includes one or more combinations of the following information: identity information of the CU, update identity information of at least one cell supported by the DU, update information of a neighbor cell of the at least one cell supported by the DU, and current configuration information of the configuration parameter of the CU.

Preferably, when the eleventh message includes the update identity information of the at least one cell supported by the DU, cell indication information indicating that the update is successful or cell indication information indicating that the update is not successful is included in the tenth message. Alternatively, the sending unit sends a twelfth message to the second CU device before the sending unit sends the tenth message to the second CU device, in which the twelfth message includes the cell indication information indicating that the update is successful or the cell indication information indicating that the update is not successful.

Preferably, when the eleventh message includes the update information of the neighbor cell of the at least one cell supported by the DU, cell indication information indicating that the update of the neighbor cell is successful or cell indication information indicating that the update of the neighbor cell is not successful is included in the tenth message. Alternatively, the sending unit sends the twelfth message to the second CU device before the sending unit sends the tenth message to the second CU device, in which the twelfth message includes the cell indication information indicating that the update of the neighbor cell is successful or the cell indication information indicating that the update of the neighbor cell is not successful.

Preferably, the eleventh message may include one or more configuration parameters of the CU.

A value range of each configuration parameter of the CU included in the eleventh message is an independent information element in the eleventh message; or, value ranges of all of configuration parameters of the CU included in the eleventh message are encapsulated in a RRC container.

And/or, current configuration information of each configuration parameter of the CU included in the eleventh message is an independent information element in the eleventh message; or, current configuration information of all of configuration parameters of the CU included in the eleventh message is encapsulated in a RRC container.

And/or, the value range and current configuration information of each configuration parameter of the CU included in the eleventh message is an independent information element in the eleventh message; or, value ranges and current configuration information of all of configuration parameters of the CU included in the eleventh message are encapsulated in a RRC container.

Preferably, the tenth message further includes one or more combinations of the following information: identity information of the DU, identity information of at least one cell supported by the DU, information of a neighbor cell of the at least one cell supported by the DU, and an updated value range of the configuration parameter of the CU.

Preferably, the tenth message may include one or more configuration parameters of the CU.

Update configuration information of each configuration parameter of the CU included in the tenth message is an independent information element in the tenth message; or, update configuration information of all of configuration parameters of the CU included in the tenth message is encapsulated in a RRC container.

And/or, an updated value range of each configuration parameter of the CU included in the tenth message is an independent information element in the tenth message; or, updated value ranges of all of configuration parameters of the CU included in the tenth message are encapsulated in a RRC container.

And/or, the updated value range and update configuration information of each configuration parameter of the CU included in the tenth message is an independent information element in the tenth message; or, updated value ranges and update configuration information of all of configuration parameters of the CU included in the tenth message are encapsulated in a RRC container.

The second CU device includes a receiving unit and an updating unit. The receiving unit receives the tenth message sent from the second DU device, in which the tenth message includes the update configuration information of the configuration parameter of the CU, which indicates the updated configuration value of the configuration parameter of the CU. The updating unit is configured to update the configuration value of the corresponding configuration parameter in the CU according to the update configuration information of the configuration parameter of the CU in the tenth message. The updated configuration value of the configuration parameter of the CU is within the current value range of the configuration parameter determined by the second DU device.

In the solutions of FIG. 27-FIG. 32, during an interaction process of parameter configuration between the CU and the DU, one side notifies the other side of a current value range of a local configuration parameter, so as to ensure that the value range of the parameter can be exchanged between the two sides. Modification of a configuration parameter of the other side may be implemented referring to the current value range so as to ensure the success of the parameter adjustment.

FIG. 33 schematically shows a block diagram of a base station 3300 according to an embodiment of the present disclosure. Base station 3300 includes a processor 3310, such as a digital signal processor (DSP). The processor 3310 may be a single device or a plurality of devices for performing different actions according to embodiments of the present invention. The base station 3300 may also include Input/Output (I/O) devices 3330 for receiving signals from other entities or transmitting signals to other entities.

In addition, the base station 3300 includes a memory 3320 that may take the form of a non-volatile or volatile memory, such as an electrically erasable programmable read-only memory (EEPROM), a flash memory, and the like. Memory 3320 stores computer readable instructions that, when executed by processor 3310, cause the processor to perform methods in accordance with embodiments of the present invention.

Those skilled in the art may understand that embodiments of the present invention include devices that are involved in performing one or more of the operations described in the application. These devices may be specially designed and manufactured for the required purposes, or they may include already known devices in general purpose computers. These devices have computer programs stored therein that are selectively activated or reconfigured. Such computer programs may be stored in a device (e.g., a computer) readable medium or in any type of medium suitable for storing electronic instructions and coupled to a bus, respectively, including but not limited to any types of disks (including floppy disk, hard disk, optical disk, CD-ROM, and magneto-optical disk), ROM (Read-Only Memory), RAM (Random Access Memory), and EPROM (Erasable Programmable Read-Only Memory), EEPROM (Electrically Erasable Programmable Read-Only Memory), flash memory, magnetic card, or ray card. That is, a readable medium includes any medium that stores or transmits information in a form readable by a device (e.g., a computer).

Those skilled in the art can understand that each of these structural diagrams and/or block diagrams and/or flow diagrams and combinations of these structural diagrams and/or block diagrams and/or flow diagrams may be implemented by computer program instructions. Those skilled in the art can understand that these computer program instructions can be provided to a processor of a general-purpose computer, a professional computer, or a processor of performing other programmable data processing methods so that the solutions specified in the structural diagrams and/or the block diagrams and/or the flow graphs disclosed in the present invention can be performed by the computer or the processor of performing other programmable data processing methods.

Those skilled in the art can understand that various operations, methods, steps, measures, and schemes that have been discussed in the present invention can be modified, changed, combined, or deleted. Further, various operations, methods, and other steps, measures, and schemes that have been discussed in the present invention may also be alternated, changed, rearranged, decomposed, combined, or deleted. Further, various operations, methods, and other steps, measures, and schemes that have been discussed in the present invention in the prior art can also be alternated, changed, rearranged, decomposed, combined, or deleted.

Only a part of the embodiments of the present invention are described above, and it should be pointed out that those of ordinary skill in the art can also make several improvements and modifications without departing from the principle of the present invention. These improvements and modification should be regarded as fall within the protection scope of the present invention.

The invention claimed is:

1. A method performed by a central unit (CU) node, the method comprising:
    receiving, from a distributed unit (DU) node, an INITIAL UPLINK (UL) RADIO RESOURCE CONTROL (RRC) MESSAGE TRANSFER message over F1 interface, the INITIAL UL RRC MESSAGE TRANSFER message including:
        information on a cell-radio network temporary identifier (C-RNTI) associated with a user equipment (UE), and
        information on UE F1 application identity (UE F1AP ID) of the DU node;
    determining whether the INITIAL UL RRC MESSAGE TRANSFER message includes information related to radio resource configuration or not; and in case that the INITIAL UL RRC MESSAGE TRANSFER message does not include the information related to radio resource configuration, identifying that the DU node is not able to serve the UE and rejecting the UE,
wherein the CU node serves a RRC protocol and packet data convergence protocol (PDCP) protocol, and
wherein the DU node serves a radio link control (RLC) layer, a medium access control (MAC) layer, and a physical (PHY) layer.

2. The method of claim 1, wherein the INITIAL UL RRC MESSAGE TRANSFER message further includes information on new radio cell global identifier (NR CGI).

3. The method of claim 1, wherein the information related to radio resource configuration includes configuration information of first signaling radio bearer (SRB 1).

4. The method of claim 1, wherein the information related to radio resource configuration includes at least one of:
configuration information for the RLC layer,
configuration information for the MAC layer, or
configuration information for the PHY layer.

5. The method of claim 1, further comprising:
in case that the INITIAL UL RRC MESSAGE TRANSFER message includes the information related to radio resource configuration, identifying that the DU node is able to serve the UE;
generating an RRC message for configuring the UE; and
transmitting, to the DU node, a message including the RRC message.

6. The method of claim 1,
wherein the INITIAL UL RRC MESSAGE TRANSFER message is transmitted based on non-UE associated signaling, and
wherein the CU node further serves a service data adaptation protocol (SDAP) protocol.

7. The method of claim 1, wherein the INITIAL UL RRC MESSAGE TRANSFER message further includes information on a reason to establish a connection.

8. The method of claim 1, wherein the information related to radio resource configuration is used to configure, in the RRC protocol, at least one parameter for at least one lower layer including the RLC layer.

9. A method performed by a distributed unit (DU) node, the method comprising:
based on identifying that the DU node is not able to serve a user equipment (UE), generating an INITIAL UPLINK (UL) RADIO RESOURCE CONTROL (RRC) MESSAGE TRANSFER message by not including information related to radio resource configuration; and
transmitting, to a central unit (CU) node, the INITIAL UL RRC MESSAGE TRANSFER message over F1 interface,
wherein the INITIAL UL RRC MESSAGE TRANSFER message includes:
information on a cell-radio network temporary identifier (C-RNTI) associated with the UE, and
information on UE F1 application identity (UE F1AP ID) of the DU node,
wherein the INITIAL UL RRC MESSAGE TRANSFER message is used to reject the UE by the CU node,
wherein the CU node serves a RRC protocol and packet data convergence protocol (PDCP) protocol, and
wherein the DU node serves a radio link control (RLC) layer, a medium access control (MAC) layer, and a physical (PHY) layer.

10. The method of claim 9, wherein the INITIAL UL RRC MESSAGE TRANSFER message further includes information on new radio cell global identifier (NR CGI).

11. The method of claim 9, wherein the information related to radio resource configuration includes configuration information of first signaling radio bearer (SRB 1).

12. The method of claim 9, wherein the information related to radio resource configuration includes at least one of:
configuration information for the RLC layer,
configuration information for the MAC layer, or
configuration information for the PHY layer.

13. The method of claim 9, further comprising:
based on identifying that the DU node is able to serve the UE, generating another INITIAL UL RRC MESSAGE TRANSFER message by including the information related to radio resource configuration in the another INITIAL UL RRC MESSAGE TRANSFER message; and
receiving, from the CU node, a message including an RRC message for configuring the UE.

14. The method of claim 9,
wherein the INITIAL UL RRC MESSAGE TRANSFER message is transmitted based on non-UE associated signaling, and
wherein the CU node further serves a service data adaptation protocol (SDAP) protocol.

15. The method of claim 9, wherein the INITIAL UL RRC MESSAGE TRANSFER message further includes information on a reason to establish a connection.

16. The method of claim 9, wherein the information related to radio resource configuration is used to configure, in the RRC protocol, at least one parameter for at least one lower layer including the RLC layer.

17. An apparatus of a central unit (CU) node, comprising:
at least one transceiver; and
at least one processor configured to:
receive, from a distributed unit (DU) node, an INITIAL UPLINK (UL) RADIO RESOURCE CONTROL (RRC) MESSAGE TRANSFER message over F1 interface, the INITIAL UL RRC MESSAGE TRANSFER message including:
information on a cell-radio network temporary identifier (C-RNTI) associated with a user equipment (UE), and
information on UE F1 application identity (UE F1AP ID) of the DU node,
determine whether the INITIAL UL RRC MESSAGE TRANSFER message includes information related to radio resource configuration or not, and
in case that the INITIAL UL RRC MESSAGE TRANSFER message does not include the information related to radio resource configuration, identify that the DU node is not able to serve the UE and reject the UE,
wherein the CU node serves a RRC protocol and packet data convergence protocol (PDCP) protocol, and
wherein the DU node serves a radio link control (RLC) layer, a medium access control (MAC) laver, and a physical (PHY) laver.

18. The apparatus of claim 17, wherein the INITIAL UL RRC MESSAGE TRANSFER message further includes information on new radio cell global identifier (NR CGI).

19. The apparatus of claim 17, wherein the information related to radio resource configuration includes configuration information of first signaling radio bearer (SRB 1).

20. The apparatus of claim 17, wherein the information related to radio resource configuration includes at least one of:
- configuration information for the RLC layer,
- configuration information for the MAC layer, or
- configuration information for the PHY layer.

21. The apparatus of claim 17, wherein the at least one processor is further configured to:
- in case that the INITIAL UL RRC MESSAGE TRANSFER message includes the information related to radio resource configuration, identify that the DU node is able to serve the UE,
- generate an RRC message for configuring the UE, and
- transmit, to the DU node, a message including the RRC message.

22. The apparatus of claim 17,
- wherein the INITIAL UL RRC MESSAGE TRANSFER message is transmitted based on non-UE associated signaling, and
- wherein the CU node further serves a service data adaptation protocol (SDAP) protocol.

23. The apparatus of claim 17, wherein the INITIAL UL RRC MESSAGE TRANSFER message further includes information on a reason to establish a connection.

24. The apparatus of claim 17, wherein the information related to radio resource configuration is used to configure, in the RRC protocol, at least one parameter for at least one lower layer including the RLC layer.

25. An apparatus of a distributed unit (DU) node, comprising:
- at least one transceiver; and
- at least one processor configured to:
  - based on identifying that the DU node is not able to serve a user equipment (UE), generate, an INITIAL UPLINK (UL) RADIO RESOURCE CONTROL (RRC) MESSAGE TRANSFER message by not including information related to radio resource configuration, and
  - transmit, to a central unit (CU) node, the INITIAL UL RRC MESSAGE TRANSFER message over F1 interface,
- wherein the INITIAL UL RRC MESSAGE TRANSFER message includes:
  - information on a cell-radio network temporary identifier (C-RNTI) associated with the UE, and
  - information on UE F1 application identity (UE F1AP ID) of the DU node,
- wherein the INITIAL UL RRC MESSAGE TRANSFER message is used to reject the UE by the CU node,
- wherein the CU node serves a RRC protocol and packet data convergence protocol (PDCP) protocol, and
- wherein the DU node serves a radio link control (RLC) layer, a medium access control (MAC) layer, and a physical (PHY) layer.

26. The apparatus of claim 25, wherein the INITIAL UL RRC MESSAGE TRANSFER message further includes information on new radio cell global identifier (NR CGI).

27. The apparatus of claim 25, wherein the information related to radio resource configuration includes configuration information of first signaling radio bearer (SRB 1).

28. The apparatus of claim 25, wherein the information related to radio resource configuration includes at least one of:
- configuration information for the RLC layer,
- configuration information for the MAC layer, or
- configuration information for the PHY layer.

29. The apparatus of claim 25, wherein the at least one processor is further configured to:
- based on identifying that the DU node is able to serve the UE, generate another INITIAL UL RRC MESSAGE TRANSFER message by including the information related to radio resource configuration in the another INITIAL UL RRC MESSAGE TRANSFER message.

30. The apparatus of claim 25,
- wherein the INITIAL UL RRC MESSAGE TRANSFER message is transmitted based on non-UE associated signaling, and
- wherein the CU node further serves a service data adaptation protocol (SDAP) protocol.

31. The apparatus of claim 25, wherein the INITIAL UL RRC MESSAGE TRANSFER message further includes information on a reason to establish a connection.

32. The apparatus of claim 25, wherein the information related to radio resource configuration is used to configure, in the RRC protocol, at least one parameter for at least one lower layer including the RLC layer.

* * * * *